(12) United States Patent
Ebihara

(10) Patent No.: US 10,422,389 B2
(45) Date of Patent: Sep. 24, 2019

(54) TRANSMISSION

(71) Applicant: KANZAKI KOKYUKOKI MFG. CO., LTD., Amagasaki-shi, Hyogo (JP)

(72) Inventor: Tomoyuki Ebihara, Amagasaki (JP)

(73) Assignee: KANZAKI KOKYUKOKI MFG. CO., LTD., Amagasaki-Shi, Hyogo (JP)

( * ) Notice: Subject to any disclaimer, the term of this patent is extended or adjusted under 35 U.S.C. 154(b) by 93 days.

(21) Appl. No.: 15/659,046

(22) Filed: Jul. 25, 2017

(65) Prior Publication Data
US 2017/0321760 A1    Nov. 9, 2017

Related U.S. Application Data

(62) Division of application No. 14/818,601, filed on Aug. 5, 2015, now Pat. No. 9,765,826.

(30) Foreign Application Priority Data

| Aug. 5, 2014 | (JP) | ................................ 2014-159397 |
| Aug. 5, 2014 | (JP) | ................................ 2014-159398 |
| Sep. 30, 2014 | (JP) | ................................ 2014-202081 |

(51) Int. Cl.
| B60T 1/06 | (2006.01) |
| F16D 11/14 | (2006.01) |
| B60T 1/00 | (2006.01) |
| F16D 63/00 | (2006.01) |
| B60K 17/344 | (2006.01) |
| B60K 23/08 | (2006.01) |
| F16D 21/04 | (2006.01) |
| B60K 17/08 | (2006.01) |

(Continued)

(52) U.S. Cl.
CPC ............ F16D 11/14 (2013.01); B60K 17/344 (2013.01); B60K 23/08 (2013.01); B60T 1/005 (2013.01);

(Continued)

(58) Field of Classification Search
CPC ......... F16D 11/14; F16H 3/083; B60K 17/10; B60K 17/28; B60K 17/34; B60K 17/105; B60K 23/08; B60T 1/005; B60T 1/062
(Continued)

(56) References Cited

U.S. PATENT DOCUMENTS 3,656,598 A * 4/1972 Goble ..................... F16D 43/02
192/114 R
3,703,941 A * 11/1972 Ohie ....................... B60T 1/005
188/31

(Continued)

FOREIGN PATENT DOCUMENTS

| JP | S6412956 A | 1/1989 |
| JP | 2004082926 A | 3/2004 |

(Continued)

OTHER PUBLICATIONS

USPTO Notice of Allowance, for U.S. Appl. No. 14/818,601 dated Apr. 27, 2017.

*Primary Examiner* — Christopher P Schwartz
(74) *Attorney, Agent, or Firm* — Cantor Colburn LLP

(57) ABSTRACT

A transmission includes a gear train, a transmission shaft driven by the gear train, a transmission casing incorporating the gear train and the transmission shaft, an axle driven by the gear train, a power take-off (PTO) unit attached to the transmission casing, and a parking brake. The transmission shaft and the axle are extended parallel to each other. The PTO unit includes a PTO input shaft, a PTO shaft, and a PTO drive train transmitting power from the PTO input shaft to the PTO shaft. The PTO input shaft is connected coaxially to the transmission shaft so as to receive power from the transmission shaft. The parking brake is provided on the transmission shaft or the PTO input shaft.

4 Claims, 29 Drawing Sheets

(51) Int. Cl.
*B60K 5/00* (2006.01)
*F16D 11/00* (2006.01)

(52) U.S. Cl.
CPC .............. *B60T 1/062* (2013.01); *F16D 21/04* (2013.01); *F16D 63/006* (2013.01); *B60K 17/08* (2013.01); *B60K 2005/003* (2013.01); *B60K 2023/0825* (2013.01); *F16D 2011/006* (2013.01); *F16D 2011/008* (2013.01)

(58) Field of Classification Search
USPC ................. 188/31, 69, 265; 192/215, 217.7, 192/219.4–219.6, 220.2; 74/665 GB
See application file for complete search history.

(56) References Cited

U.S. PATENT DOCUMENTS

| | | | | |
|---|---|---|---|---|
| 3,942,843 | A * | 3/1976 | Tobiasz | B60T 8/17613 303/115.2 |
| 4,369,868 | A * | 1/1983 | Fleitas | B60K 17/34 192/36 |
| 4,499,980 | A * | 2/1985 | Kaminski | F16D 27/102 192/35 |
| 5,388,436 | A * | 2/1995 | Shieh | B62H 5/18 188/69 |
| 8,866,643 | B2 * | 10/2014 | Sano | G05G 1/08 340/542 |
| 2004/0144600 | A1 * | 7/2004 | Ikegami | A61G 5/1027 188/2 F |
| 2013/0192418 | A1 * | 8/2013 | Shigematsu | B60N 2/0296 74/665 GB |
| 2014/0216885 | A1 * | 8/2014 | Heuver | B60T 1/005 192/219.4 |
| 2015/0045184 | A1 | 2/2015 | Nishimoto | |
| 2015/0068824 | A1 | 3/2015 | Matsuura | |
| 2015/0306954 | A1 | 10/2015 | Matsuura | |
| 2016/0281821 | A1 | 9/2016 | Matsuura | |

FOREIGN PATENT DOCUMENTS

| | | |
|---|---|---|
| JP | 2006292144 A | 10/2006 |
| JP | 2010115969 A | 5/2010 |

* cited by examiner

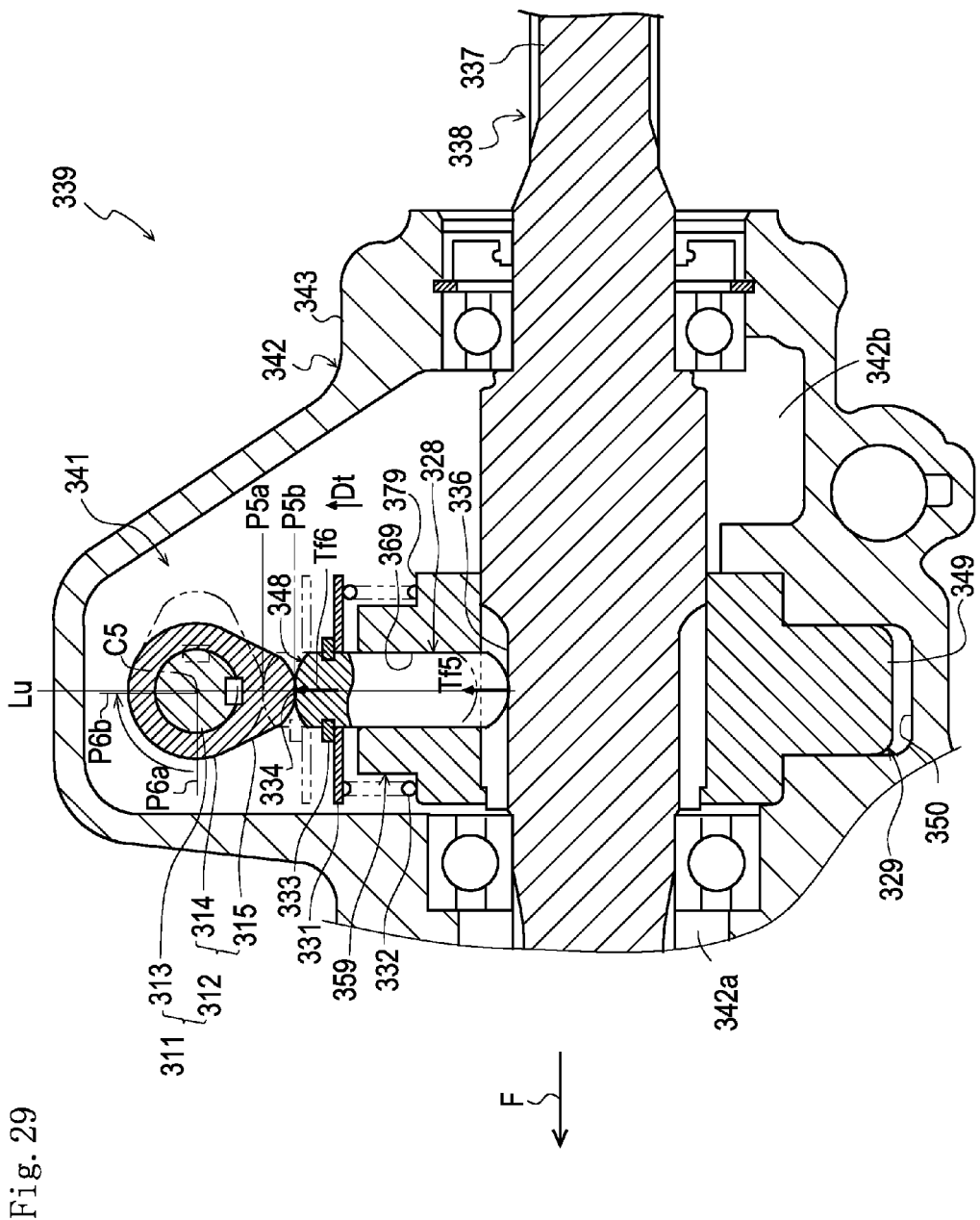

TRANSMISSION

CROSS-REFERENCE TO RELATED APPLICATIONS

The present application is a divisional application of U.S. patent application Ser. No. 14/818,601, filed on Aug. 5, 2015, the entire contents of which are incorporated herein by reference. The Ser. No. 14/818,601 application claimed the benefit of the date of the earlier filed Japanese Patent Applications No. 2014-159397, filed on Aug. 5, 2014; No 2014-159398, filed on Aug. 5, 2014, and No. 2014-202081, filed on Sep. 30, 2014, priority to which is also claimed herein, and the contents of which are also incorporated herein by reference herein.

BACKGROUND OF THE INVENTION

Field of the Invention

The present invention relates to a transmission, especially, a gear transmission.

Related Art

JP 2010-115969 A discloses a conventional four-wheel drive vehicle, e.g., a utility vehicle, including front and rear transaxles. The rear transaxle includes a transaxle casing incorporating a gear transmission that includes at least one gear train and a transmission output shaft driven by the gear train. A power take-off (hereinafter, PTO) unit includes a PTO input shaft, a PTO shaft, and a PTO gear train for transmitting power from the PTO input shaft to the PTO shaft. The PTO unit is attached to the rear transaxle so as to drivingly connect the PTO input shaft coaxially to the transmission output shaft. The PTO shaft is drivingly connected to the front transaxle, so that the rotary power of the transmission output shaft of the rear transaxle is transmitted to the front transaxle.

The vehicle includes a parking brake for braking axles drivingly connected to the gear train. The parking brake is disposed in a middle portion of the transaxle casing and on a transmission shaft of the transmission at the upstream of the transmission output shaft connected coaxially to the PTO input shaft. The parking brake at this position may be hidden by many surrounding parts. To access the parking brake, considerably many parts in the rear transaxle may have to be disassembled. Therefore, this position of the parking brake is inconvenient for accessing the parking brake for maintenance or another purpose.

JP S64-012956A may be considered as teaching an arrangement of a parking brake in a transmission casing of a four-wheel drive vehicle adjacent to a sidewall of the transmission casing. This position of the parking brake is convenient for accessing the parking brake. However, in the transmission casing, a transmission output shaft for driving rear axles is extended in the fore-and-aft direction of the vehicle, the parking brake is disposed at one of right and left sides of the transmission output shaft and includes a brake shaft extended parallel to the transmission output shaft, and a PTO shaft for driving front axles is disposed at the other of right and left sides of the transmission output shaft and is extended parallel to the transmission output shaft. A gear train is interposed between the transmission output shaft and the parking brake, and other speed-change gear trains are interposed between the transmission output shaft and the PTO shaft. Such many gear trains may reduce the brake force before it reaches the PTO shaft. If the vehicle is parked on a slope, the reduced braking force onto the PTO shaft and the front axles may cause the vehicle to unexpectedly descend the slope.

JP 2006-292144 A discloses another conventional transaxle incorporating a gear transmission. The gear transmission includes a transmission shaft on which at least one gear for selecting a driving speed or direction is provided rotatably relative to the transmission shaft. A gearshift clutch is provided on the transmission shaft. The gearshift clutch includes a clutch hub fixed on a transmission shaft, and a sleeve spline-fitted on the clutch hub. The clutch hub and the gear are formed on outer peripheral portions thereof with respective splines. The sleeve is formed on an inner peripheral portion thereof with splines. The sleeve is constantly spline-fitted to the clutch hub, and the sleeve is slidable in the axial direction of the clutch hub so as to be shiftable between a clutch-on position to engage its splines with the splines of the gear and a clutch-off position to disengage its splines from the splines of the gear. The splines of the sleeve and the gear are formed with chamfers for smoothening meshing of the splines.

Such a gearshift clutch is advantageously compact in comparison with a synchromesh system. However, the gearshift clutch still has a problem of a slide lock of the sleeve such that the sleeve is hard to slide to mesh its splines with the splines of the gear because tips of the splines of the sleeve formed with the chamfers abut against those of tips of the splines of the gear formed with the chamfers. In this regard, the pitch of the splines of the clutch hub is the same as that of the splines of the gear, and the space between every adjoining splines of the clutch hub (and the gear) is substantially as wide in the peripheral direction of the transmission shaft as each spline of the sleeve, so that the sleeve cannot rotate relative to the clutch hub. If the difference in rotational position between the clutch hub and the gear causes that the splines of the clutch hub and the splines of the gear are arranged quite alternately in the peripheral direction of the transmission shaft, the spaces among the splines of the gears are hidden behind the splines of the clutch hub from the splines of the sleeve, and each of the splines of the gear blocks the spaces from each of the splines of the sleeve, thereby hindering the sleeve from further sliding toward the gear. This state is defined as the slide lock of the sleeve. The slide lock is kept before the difference in rotational position between the clutch hub and the gear is reduced to a level where the chamfers of the splines start to function properly.

The slide lock of the sleeve may often occur when a vehicle having been stationary with an engine stopped is started by starting the engine. An operator may have to repeat a shift operation of a manipulator for sliding the sleeve between the clutch-off position and the clutch-on position until the gear comes to an appropriate rotational position relative to the sleeve.

It is conceivable that the axial thrusting force for sliding the sleeve in the direction to the gear should be increased to force the slide of the sleeve against the gear. However, such an increased axial thrust force may shorten the life of component members of the gear clutch. Further, the increased force may increase a resistance of the gear when the meshing of the splines of the sleeve with the splines of the gear is completed as well as the resistance of the gear when the slide lock of the sleeve occurs, whereby the operator may feel the double resistances during the clutch-on operation of the sleeve to engage with the gear.

Moreover, JP 2004-082926A discloses another conventional four-wheel drive vehicle, e.g., a utility vehicle, provided with a parking brake. This parking brake is disposed in a rear transaxle drivingly connected to a power unit including an engine and a transmission. This parking brake is a multi-friction disc type brake, which needs a large space for sufficiently lubricating the friction discs. A pawl engaging type brake may be considered as an alternative parking brake adaptable to the vehicle because it is needs no lubrication fluid supply and is compact, however, such a brake having pawls needs a cam which may have to be disposed stably in the vehicle so as to complicate design of the vehicle.

SUMMARY OF THE INVENTION

An object of the invention is to provide a transmission for a four-wheel drive vehicle, wherein a parking brake is disposed at an appropriate position for convenience of accessing the parking brake for maintenance or another purpose, while the braking force of the parking brake can be efficiently and surely transmitted to all the wheels when the vehicle travels by driving four wheels.

To achieve the first object, a transmission according to the invention includes a gear train, a transmission shaft driven by the gear train, a transmission casing, an axle driven by the gear train, a PTO unit, and a parking brake. The transmission casing incorporates the gear train and the transmission shaft. The PTO unit is attached to the transmission casing. The PTO unit includes a PTO input shaft, a PTO shaft, and a PTO drive train transmitting power from the PTO input shaft to the PTO shaft. The transmission shaft and the axle are extended parallel to each other. The PTO input shaft is connected coaxially to the transmission shaft so as to receive power from the transmission shaft. The parking brake is provided on the transmission shaft or the PTO input shaft.

Therefore, the parking brake is located so that it can be easily accessed to enhance the efficiency of its maintenance. The parking brake is interlocked directly (not via other gear trains) to the PTO drive train and the PTO shaft, thereby efficiently and surely transmitting its braking force to drive wheels (e.g., front wheels) drivingly connected to the PTO shaft, whereby a vehicle parked on a slope, while being set in the four-wheel drive mode, is prevented from unexpectedly descending the slope. Further, the parking brake can be disposed in the transmission casing or in a space surrounding the PTO input shaft, thereby needing no additional space for the parking brake.

Preferably, the transmission includes a bearing disposed in the transmission casing to journal the transmission shaft. An end of the transmission shaft projects outward from the bearing to be connected to an end of the PTO input shaft. The parking brake is provided on the PTO input shaft.

Therefore, while the transmission output shaft is left in the transmission casing, the PTO unit with the PTO shaft having the parking brake thereon can be attached or detached to and from the transmission. Further, the PTO unit can be easily exchanged for another PTO unit without a parking brake. Such a type variation of the PTO unit may enhance a design variation of a vehicle equipped with the transmission.

Preferably, the PTO unit includes a PTO unit casing incorporating the PTO input shaft, the PTO shaft, and the PTO drive train. The PTO unit casing is joined to the transmission casing so as to drivingly connect a first end of the PTO input shaft coaxially to an end of the transmission shaft. A second end of the PTO input shaft projects outward from the PTO unit casing so as to be provided thereon with the parking brake.

Therefore, the parking brake outside of the PTO unit casing can be accessed more easily for maintenance or other purposes.

Preferably, the parking brake includes a fixed first pawl member, a second pawl member, a locking member, and a locking operation member. The second pawl member is movable between a braking position to engage with the first pawl member and an unbraking position to disengage from the first pawl member, in axial opposite directions of the transmission shaft or the PTO input shaft, and is unrotatable relative to the transmission shaft or the PTO input shaft. One of the axial opposite directions is defined as a braking direction to locate the second pawl member at the braking position so as to brake the transmission output shaft and the PTO input shaft. The other of the axial opposite directions is defined as an unbraking direction to locate the second pawl member at the unbraking position so as to unbrake the transmission output shaft and the PTO input shaft. The second pawl member has a surface to which a thrusting force in the unbraking direction caused by a counterforce from the first pawl member is applied in a direction perpendicular to the surface when the second pawl member engages with the first pawl member. The locking member is movable between a brake-locking position and a brake-unlocking position in opposite directions perpendicular to the braking and unbraking directions of the second pawl member. The locking member has a first surface parallel to the surface of the second pawl member, and a second surface extended slantwise from the first surface in the unbraking direction. While the second pawl member engages with the first pawl member, by locating the locking operation member at the locking position, the locking member is located at the brake-locking position so that the first surface abuts against the surface of the second pawl member so as to receive the counterforce from the first pawl member, thereby preventing the second pawl member at the braking position from moving in the unbraking direction. By moving the locking operation member from the locking position to the unlocking position, the locking member receives the thrusting force at the first surface and then at the second surface so as to move from the brake-locking position to the brake-unlocking position so as to allow the second pawl member to move the unbraking direction.

Therefore, even if the first and second pawls engage with each other in a high torque condition so as to contain a torque, the thrusting force caused by the counterforce from the first pawl member is applied to the second pawl member so as to lighten the unbraking operation for moving the second pawl member in the unbraking direction to disengage from the first pawl member. Such a parking brake can be configured simply at low cost, and compactly so as to enhance a layout variation of component elements in a vehicle.

A second object of the invention is to provide a transmission equipped with a gearshift clutch solving the problem of the slide lock of a sleeve of the gearshift clutch.

To achieve the second object, a transmission according to the invention includes a rotary shaft, a clutch hub, a gear, and a sleeve. The clutch hub is fitted on the rotary shaft rotatably integrally with the rotary shaft. The clutch hub is formed on an outer peripheral portion thereof with first splines. The gear is fitted on the rotary shaft rotatably relative to the rotary shaft so that the gear and the clutch hub are adjacently aligned in the axial direction of the rotary shaft. The gear is formed on an outer peripheral portion thereof with second splines that continue to the respective first splines when a rotational angle of the gear coincides to a rotational angle of the clutch hub. The sleeve is provided on the clutch hub so as to have an inner peripheral portion facing the outer peripheral portion of the clutch hub. The sleeve is formed on the inner peripheral portion thereof with third splines that are aligned alternately with the first splines of the clutch hub in the peripheral direction of the rotary shaft, so that the sleeve is slidable on the clutch hub in the axial direction of the rotary shaft, and is restricted in rotating relative to the clutch hub. According to slide of the sleeve toward the gear, the third splines come to be aligned alternately with the second splines in the peripheral direction of the rotary shaft so that the sleeve engages with the gear so as to be restricted in rotating relative to the gear, thereby drivingly connecting the gear to the rotary shaft via the sleeve and the clutch hub. The clutch hub, the gear and the sleeve are configured so as to allow the sleeve to rotate relative to the clutch hub so that the third splines diverts to slide against the respective second splines after axial ends of the third splines contact axial ends of the second splines.

Therefore, due to the configuration to divert the third splines to slide against the second splines, the sleeve can smoothly slide to engage its third splines with the second splines of the gear, so as to reduce the repeat of the clutch on and off operation until the sleeve escapes from the slide lock. The gearshift clutch does not need to have a great thrusting force to slide the sleeve against the slide lock, thereby ensuring endurance of its component elements and reducing the double resistances during the clutch-on operation for sliding the sleeve to engage the third splines with the second splines of the gear.

Preferably, the axial ends of at least either the second or third splines are formed with chamfers. Each third spline has first and second guide spaces on opposite sides thereof in the peripheral direction of the rotary shaft between the adjoining first splines. Each of the first and second guide spaces has a width not less than a width of the third spline in the peripheral direction.

Therefore, due to the sufficient width of each of the first and second guide spaces relative to the width of the third spline, the second spline can easily enter each of the first and second guide spaces as the sleeve slides to engage with the gear. As a result, the third splines can easily reach positions adjacent to the respective second splines so as to completely engage the sleeve with the gear, thereby needing no additional large or complicated device for guiding the third splines to the positions.

Further preferably, the transmission includes a spline location device that locates the third splines so that the widths of the first and second guide spaces are equal to each other.

Therefore, both the first and second guide spaces have the above-mentioned advantageous widths for guiding the third splines, so that the above-mentioned effect of guiding the third splines to the positions among the second splines to engage the sleeve with the gear can be obtained in whichever direction the rotational position of the second splines of the gear deviates from the rotational position of the first splines of the clutch hub. Further, due to the equaling of the widths of the first and second guide spaces, the widths of the guide spaces can be minimized so as to minimize the reduction in number of the first, second and third splines, thereby ensuring the required strength of these splines and ensuring the required quietness.

Preferably, the spline location device includes a recess, a pressure member, a biasing device, an angled portion, and guide surfaces. The recess is provided in the clutch hub and having an open end at the outer peripheral portion of the clutch hub. When viewed in the axial direction of the rotary shaft, one of the first splines of the clutch hub is lost so that the open end of the recess is disposed at a position corresponding to the lost first spline. The pressure member is provided in the recess and having an end projecting outward from the open end of the recess. The biasing device biases the pressure member in a radial direction of the rotary shaft toward the inner peripheral portion of the sleeve. The angled portion is formed at the inner peripheral portion of the sleeve between predetermined two of the third splines so that, when the end of the pressure member is located at the angled portion, a space between one of the predetermined third splines and the pressure member corresponding to the first guide space and a space between the other of the predetermined third splines and the pressure member corresponding to the second guide space have respective widths in the peripheral direction of the rotary shaft equal to each other. The guide surfaces are formed at the inner peripheral portion of the sleeve between the angled portion and one of the predetermined third splines and between the angled portion and the other of the predetermined third splines. When the end of the pressure member is pressed against one of the guide surfaces, the biasing device biases the end of the pressure member toward the angled portion.

Therefore, during rotation of the rotary shaft, the rotating rotary shaft causes a centrifugal force that assists the biasing device to bias the pressure member toward the angled portion so as to ensure the effect of diverting the third splines when the sleeve slides to engage the third splines with the second splines of the gear.

Alternatively, preferably, the spline location device includes a recess, a pressure member, a biasing device, an angled portion, and guide surfaces. The recess is provided in sleeve and having an open end at the inner peripheral portion of the sleeve. The pressure member is provided in the recess and having an end projecting outward from the open end of the recess. The biasing device biases the pressure member in a radial direction of the rotary shaft toward the outer peripheral portion of the clutch hub. The angled portion is formed at the outer peripheral portion of the clutch hub between predetermined two of the first splines so that, when the end of the pressure member is located at the angled portion, the first and second guide spaces on the opposite sides of each of the third splines have respective widths equal to each other. The guide surfaces are formed at the outer peripheral portion of the clutch hub between the angled portion and one of the predetermined first splines and between the angled portion and the other of the predetermined first splines. When the end of the pressure member is pressed against one of the guide surfaces, the biasing device biases the end of the pressure member toward the angled portion.

Therefore, the recess, the pressure member, and the biasing device are configured in the sleeve that is more accessible than the clutch hub, thereby improving the maintenanceablility.

These and other objects, features and advantages of the invention will appear more fully from the following detailed description of the invention with reference to the attached drawings.

BRIEF DESCRIPTION OF THE DRAWINGS

FIG. 29 is a cross sectional view of clutch unit 339 taken along XXIX-XXIX line of FIG. 28.

DETAILED DESCRIPTION OF THE INVENTION

Figure 1:
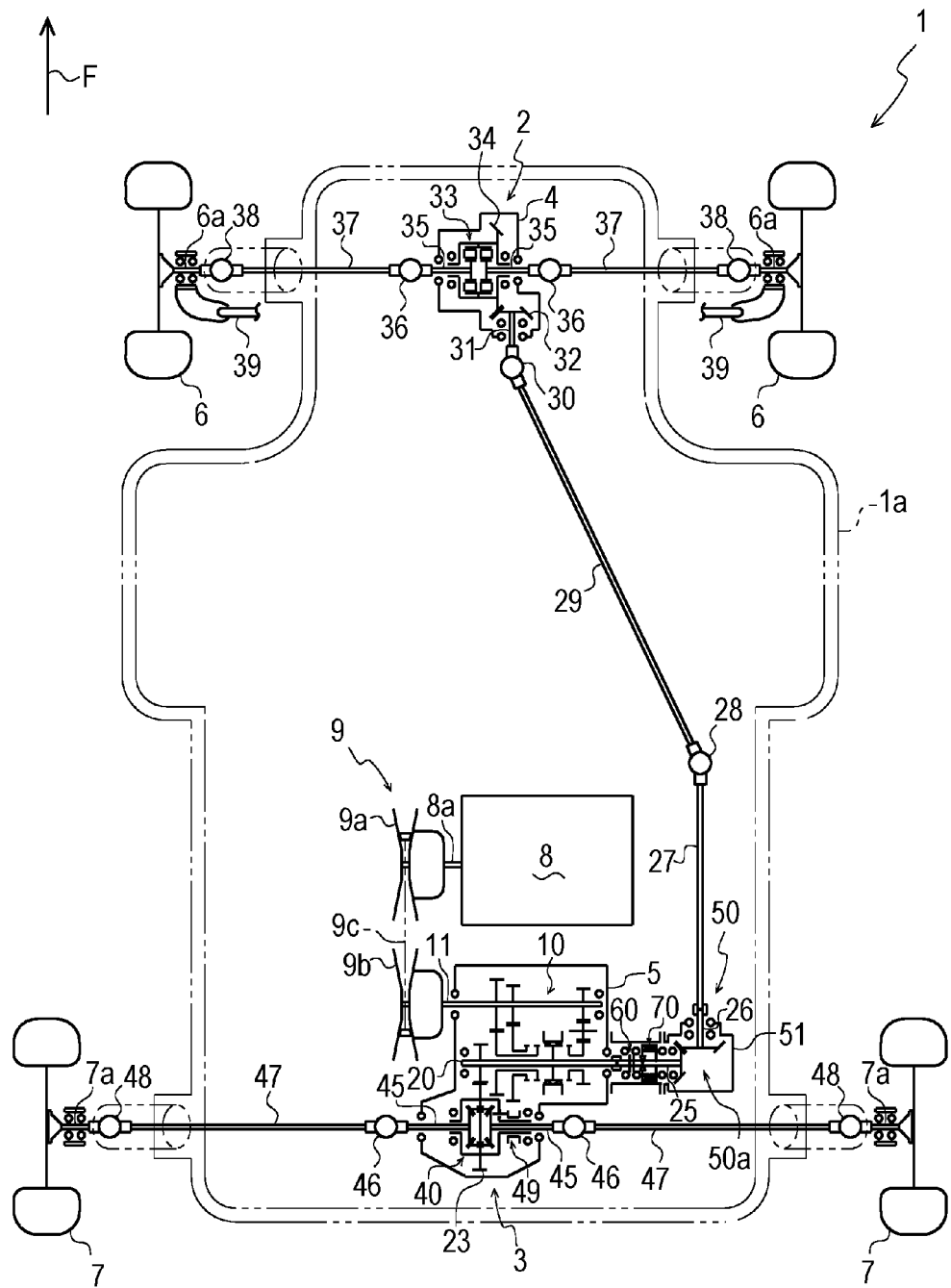
FIG. 1 is a schematic plan view of a four-wheel vehicle 1.

A transmission according to a first embodiment, and a four-wheel drive vehicle 1 equipped with the transmission according to the first embodiment will be described with reference to FIGS. 1 to 11. In this embodiment, directions and positions of component members and portions are defined on an assumption that vehicle 1 faces forward in a direction designated by an arrow F in FIG. 1.

An entire structure of four-wheel driving vehicle 1 will be described with reference to FIGS. 1 and 2. Vehicle 1 includes a vehicle body frame (chassis) 1a, which supports a front transaxle 2 at a front portion thereof, and a rear transaxle 3 at a rear portion thereof.

Right and left front wheels 6 have respective axels 6a as rotary axes thereof. Front transaxle 2 includes a front transaxle casing 4 that incorporates a front differential unit 33, and journals right and left differential output shafts 35 of front differential unit 33. Right and left coaxial differential output shafts 35 are extended rightward and leftward from front transaxle casing 4, and are drivingly connected to respective axles 6a of right and left front wheels 6 via respective propeller shafts 37 with universal joints 36 and 38 at opposite ends of respective propeller shafts 37. Right and left front wheels 6 are steerable wheels such that axles 6a are connected to each other via a tie rod 39 that is operatively connected to a steering operation device, such as a steering wheel (not shown).

Right and left rear wheels 7 have respective axels 7a as rotary axes thereof. Rear transaxle 3 includes a rear transaxle casing 5 having a rear portion, which incorporates a rear differential unit 40 and journals right and left coaxial differential output shafts 45 of rear differential unit 40. Incidentally, rear differential unit 40 is provided with a differential locking device 49 on one of differential output shafts 45 in rear transaxle casing 5. Right and left differential output shafts 45 are extended rightward and leftward from rear transaxle casing 5, and are drivingly connected to respective axles 7a of right and left rear wheels 7 via respective propeller shafts 47 with universal joints 46 and 48 at opposite ends of respective propeller shafts 47.

Vehicle body frame 1a supports an engine 8 serving as a prime mover at a fore-and-aft intermediate portion thereof between front transaxle 2 and rear transaxle 3. Engine 8 has an engine output shaft 8a extended laterally (in this embodiment, leftward). A front portion of rear transaxle casing 5 of rear transaxle 3 incorporating a gear transmission 10 is disposed rearward from engine 8. Gear transmission 10 includes laterally extended transmission shafts, i.e., a transmission input shaft 11 and a transmission output shaft 20 parallel to each other. Therefore, engine output shaft 8a, transmission input shaft 11 and transmission output shaft 20 are extended parallel to each other and parallel to differential output shafts 45 and axles 7a of rear wheels 7.

Transmission input shaft 11 of gear transmission 10 is extended laterally (in this embodiment, leftward) outward from rear transaxle casing 5 and parallel to engine output shaft 8a. A belt-type continuously variable transmission 9 (hereinafter, referred to as CVT 9) is disposed at one of right and left sides (in this embodiment, left side) of engine 8 and the front portion of rear transaxle 3 so as to drivingly connect engine output shaft 8a to transmission input shaft 11. CVT 9 includes a drive pulley 9a on engine output shaft 8a, a driven pulley 9b on transmission input shaft 11, and a belt 9c interposed between pulleys 9a and 9b. CVT 9 serves as a main speed-change transmission, while gear transmission 10 serves as a sub speed-change transmission at the downstream of the main speed-change transmission. Therefore, power of engine 8 is transmitted to rear differential unit 40 for driving rear wheels 7 via CVT 9 and gear transmission 10.

Figure 12:
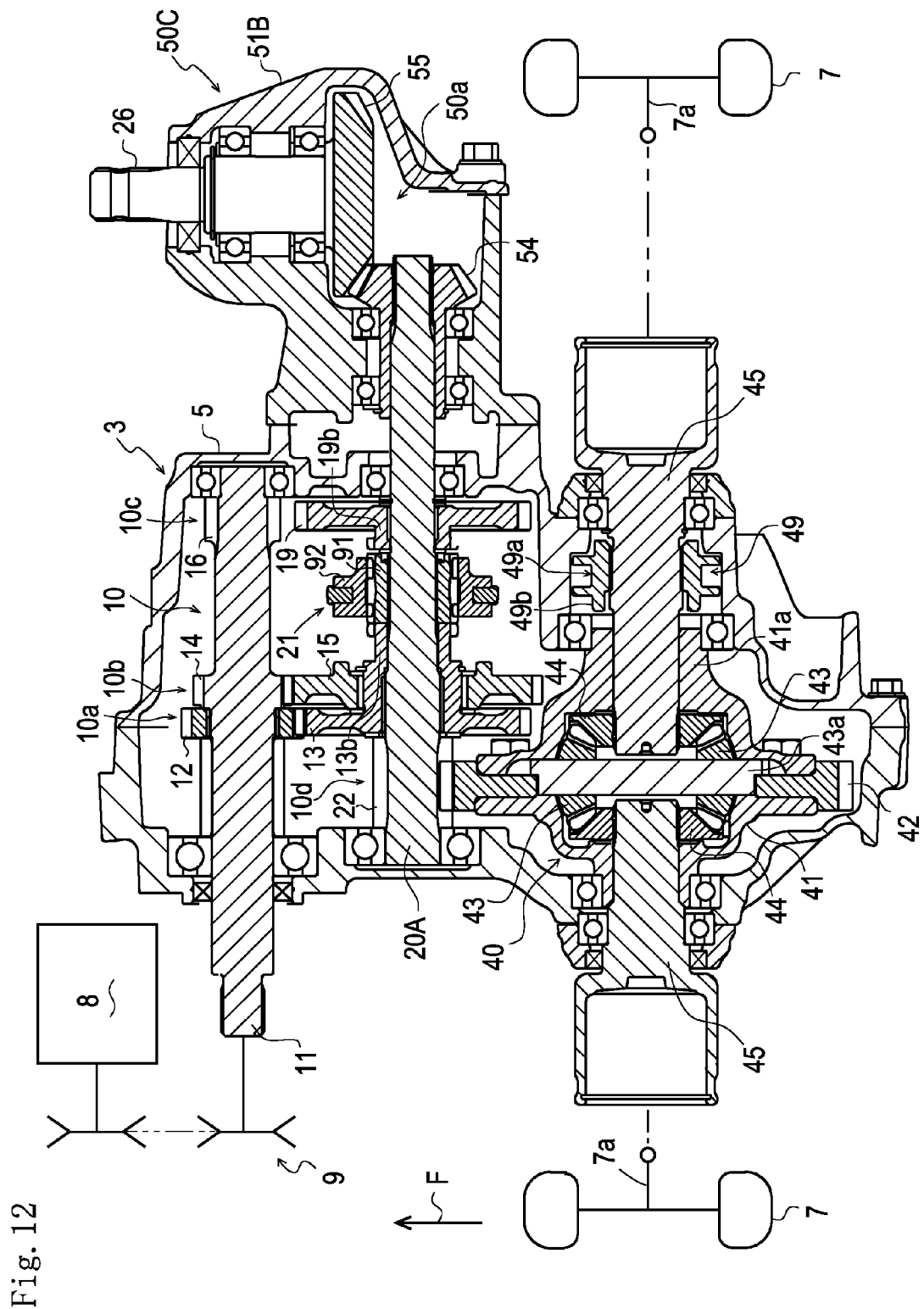
FIG. 12 is a sectional plan view of transaxle 3 provided with an alternative PTO unit 50C.

Rear transaxle 3 will be described with reference to FIG. 2 in view of FIG. 12 illustrating an alternative embodiment of rear transaxle 3. Gear transmission 10 includes a high speed forward gear train 10a, a low speed forward gear train 10b, and a reverse gear train 10c. Gear trains 10a, 10b and 10c are interposed between transmission input shaft 11 and transmission output shaft 20 (or 20A in the embodiment of FIG. 12). More specifically, in this embodiment, drive gears 12, 14 and 16 of respective gear trains 10a, 10b and 10c are fixed (or formed) on transmission input shaft 11, driven gears 13 and 19 of respective gear trains 10a and 10c are fitted on transmission output shaft 20 (or 20A) rotatably relative to transmission output shaft 20 (or 20A), and a driven gear 15 of low speed forward gear train 10b is fitted on driven gear 13 of high speed forward gear train 10a rotatably relative to driven gear 13. An idle gear 18 on an idle shaft 17 meshes with drive and driven gears 16 and 19, so that gears 16, 18 and 19 constitute reverse gear train 10c.

A gearshift clutch 21 is provided on transmission output shaft 20 (or 20A) between driven gears 13 and 19 of gear trains 10a and 10c. Gearshift clutch 21 is configured so as to selectively engage with one or none of driven gears 13, 15 and 19 of respective gear trains 10a, 10b and 10c. Detailed description of the configuration of gearshift clutch 21 and the gearshift pattern by use of gearshift clutch 21 will be discussed later with reference to FIGS. 12 to 19.

Alternatively, gearshift clutch 21 may be provided on transmission input shaft 11, drive gears 12, 14 and 16 of gear trains 10a, 10b and 10c may be provided on transmission input shaft 11 rotatably relative to transmission input shaft 11, and driven gears 13, 15 and 19 of gear trains 10a, 10b and 10c may be fixed on transmission output shaft 20 (or 20A).

In rear transaxle casing 5, a diametrically small gear 22 is fixed (or formed) on transmission output shaft 20 (or 20A), and meshes with a diametrically large gear serving as a differential input gear 42 of rear differential unit 40. Therefore, gears 22 and 42 constitute a reduction gear train 10d that transmits the rotary power of transmission output shaft 20 (or 20A) as the output power of gear transmission 10 to differential unit 40 for driving rear wheels 7.

Rear differential unit 40 includes a differential casing 41, differential input gear 42, at least one differential pinion 43, and right and left differential side gears 44. Differential input gear 42 is fixed on an outer peripheral portion of differential casing 41. Differential casing 41 is fitted on right and left differential output shafts 45 so as to allow each of differential output shafts 45 to rotate relative to differential casing 41. Right and left differential side gears 44 are fixed on respective proximal ends of differential output shafts 45 in differential casing 41. In differential casing 41, at least one differential pinion 43 is pivoted on a differential pinon shaft 43a (see FIG. 12) between right and left differential side gears 44, and meshes with right and left differential side gears 44. Therefore, right and left differential output shafts 45 are enabled by differential pinion 43 meshing with differential side gears 44 to differentially rotate while right and left differential output shafts 45 rotate following differential casing 41.

Differential locking device 49 includes a shift sleeve 49a and at least one lock pin 49b. A right or left (in this embodiment, right) end portion of differential casing 41 is formed as a boss 41a, which is extended along corresponding (in this embodiment, right) differential output shaft 45. Shift sleeve 49a is fitted on boss 41a slidably along boss 41a. Lock pin 49b is fixed to shift sleeve 49a, and is extended to constantly enter the inner space of differential casing 41 so as to be unrotatable relative to differential casing 41. Shift sleeve 49a is formed with an annular groove to engage with a fork operatively connected to a differential locking manipulator, e.g., a pedal or a lever, so that shift sleeve 49a is shiftable between an unlocking position and a locking position.

When shift sleeve 49a is disposed at the unlocking position, lock pin 49b is disposed close to differential side gear 44 fixed on differential output shaft 45 having boss 41a thereon, however, lock pin 49b disengages from this differential side gear 44, thereby allowing the differential rotation of right and left differential output shafts 45 relative to differential casing 41. When shift sleeve 49a is disposed at the locking position, lock pin 49b is inserted into differential side gear 44 so as to lock this differential output shaft 45 with differential casing 41, thereby locking the differential rotation of right and left differential output shafts 45.

Figure 2:
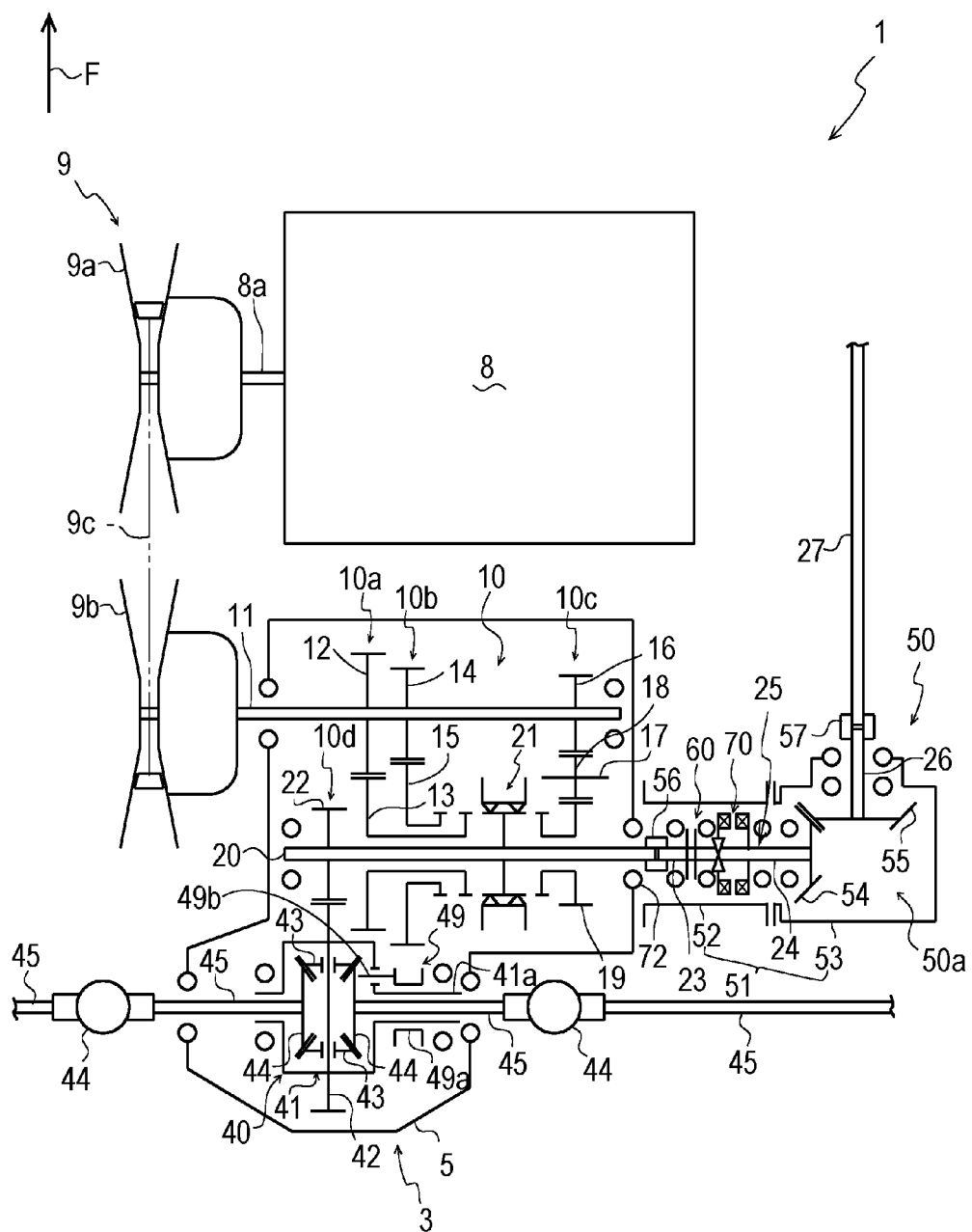
FIG. 2 is a schematic plan view of a principal portion of vehicle 1, showing a transaxle 3 provided with a PTO unit 50.

Referring to FIG. 1, rear transaxle 3 is provided with a PTO unit 50 having a PTO shaft 26, so that PTO unit 50 takes off power from transmission output shaft 20 of gear transmission 10 to PTO shaft 26. PTO unit 50 will be described in detail later. PTO shaft 26 is drivingly connected to an input shaft 31 of front transaxle 2 via propeller shafts 27 and 29. In this regard, propeller shaft 27 is coupled at a rear end thereof to a front end of PTO shaft 26 via a coupling 57 (see FIG. 3), e.g., a spline sleeve, so as to extend forward coaxially to PTO shaft 26. When viewed in plan, PTO shaft 26 and propeller shaft 27 are disposed laterally eccentrically (in this embodiment, rightward) in vehicle 1, and are extended straight in the fore-and-aft direction of vehicle 1 at the right side of engine 8 and rear transaxle 3 laterally opposite CVT 9 at the left side of engine 8 and rear transaxle 3. Input shaft 31 of front transaxle 2 is disposed at a substantially laterally center of vehicle 1, so that, when viewed in plan, propeller shaft 29 is extended slantwise to connect the laterally eccentric propeller shaft 27 to the laterally central input shaft 31. Propeller shaft 29 is coupled at a rear end thereof to a front end of propeller shaft 27 via a universal joint 28, and is coupled at a front end thereof to a rear end of input shaft 31 via a universal joint 30.

Input shaft 31 projects at the rear end thereof rearward from front transaxle casing 4, and is fixedly provided (or formed) on a front end thereof with a bevel pinion 32 in front transaxle casing 4. In front transaxle casing 4, front differential unit 33 is provided with a bevel differential input gear 34 meshing with bevel pinion 32, so that front differential unit 33 distributes the rotary power of bevel differential input gear 34 between right and left differential output shafts 35. Front differential unit 33 is a limited slip differential unit, which limits the differential rotatability of right and left differential output shafts 35. Therefore, if one of right and left front wheels 6 is going to be stuck, this front wheel 6 receives a driving torque from differential output shaft 35 drivingly connected to the other front wheel 6, so that vehicle 1 can be kept from being stuck.

Figure 3:
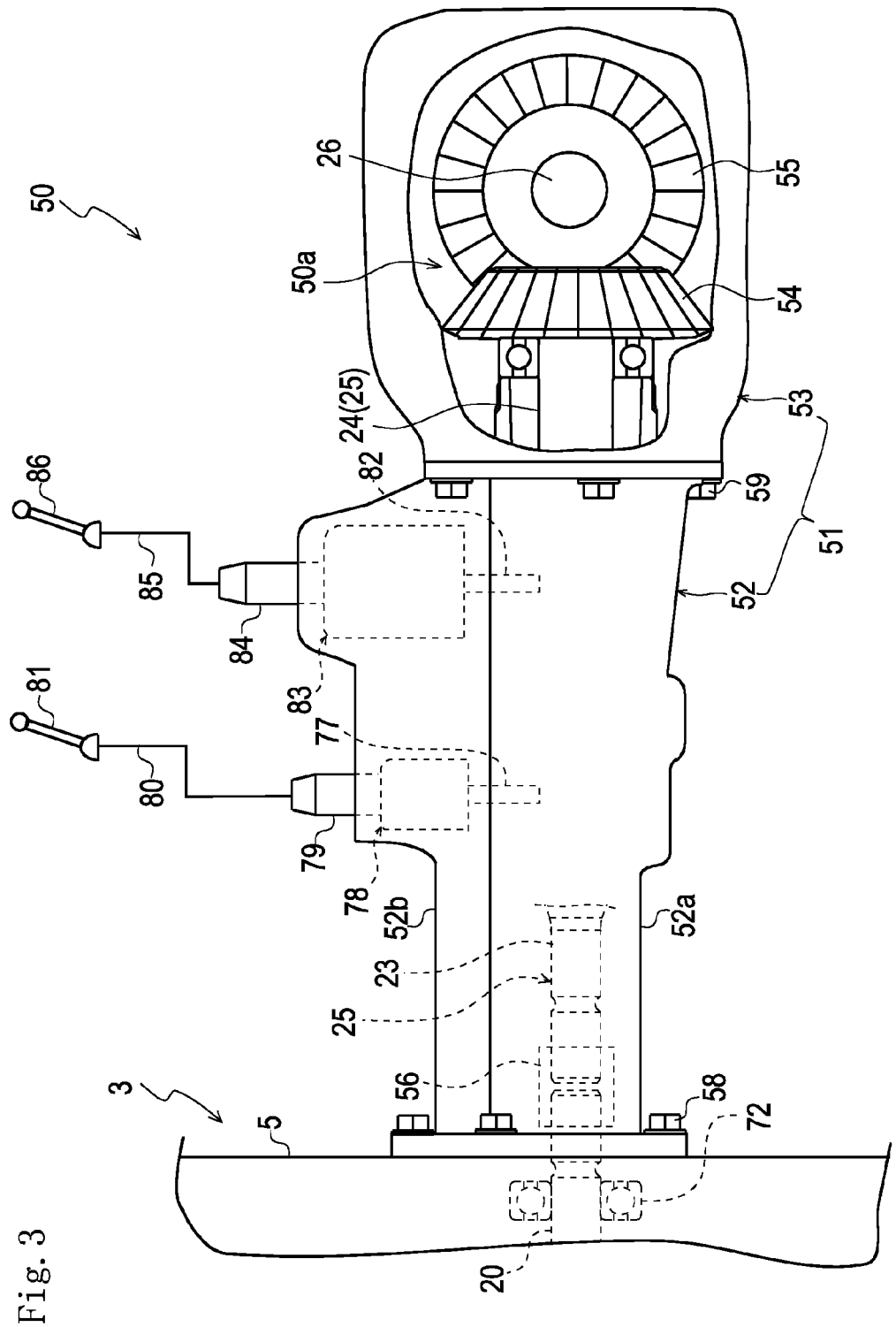
FIG. 3 is a side view of PTO unit 50 attached to transaxle 3.
Figure 4:
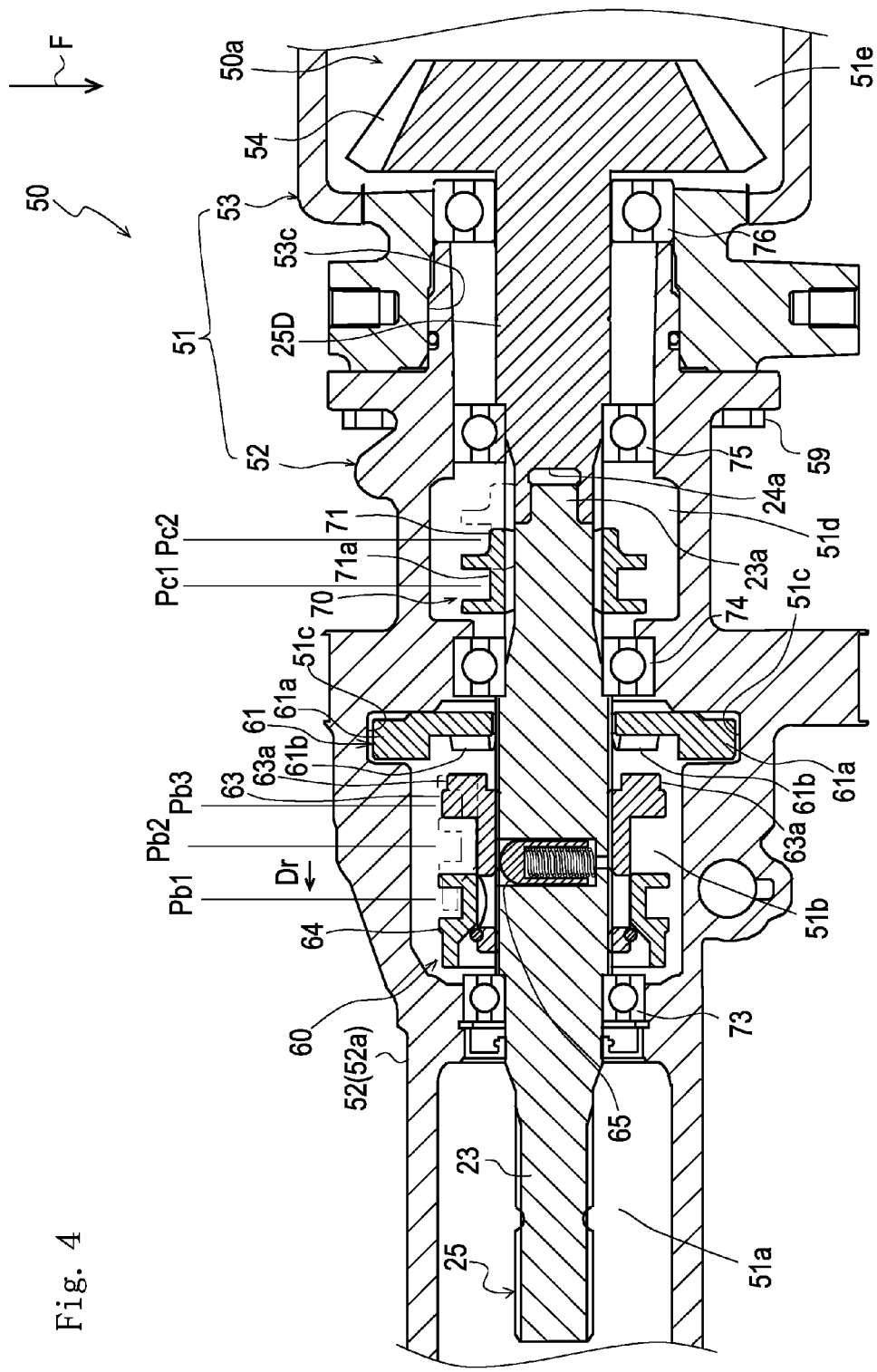
FIG. 4 is a sectional bottom view of a principal portion of PTO unit 50 showing a parking brake 60 and a drive mode selection clutch 70.

PTO unit 50 will now be described in detail with reference to FIGS. 1 to 9, on the assumption that PTO unit 50 is disposed at the right side of rear transaxle 3 while CVT 9 is disposed at the left side of rear transaxle 3. Referring to FIGS. 2, 3 and 4, PTO unit 50 includes a PTO unit casing 51. PTO unit casing 51 includes a clutch housing 52 and a gear housing 53. Clutch housing 52 is fixed to a right side surface of rear transaxle casing 5 so as to extend rightward from rear transmission casing 5. Gear housing 53 is fixed to a right end of clutch housing 52. In this regard, referring to FIGS. 3 and 4, clutch housing 52 is formed with right and left flanges defining right and left open ends thereof. The left flange of clutch housing 52 is fastened to the right end portion of rear transaxle casing 5 by bolts 58, and the right flange of clutch housing 52 is fastened to a left end portion of gear housing 53 by bolts 59. In this regard, gear housing 53 is formed with a left end hole 53c into which a right end portion of clutch housing 52 can easily inserted so as to facilitate assembling of housing 52 and 53. Further, by loosening bolts 58, clutch housing 52 can easily be separated from rear transaxle casing 5 so that entire PTO unit 50 can easily be detached from rear transaxle 3. By loosening bolts 59, gear housing 53 can easily be separated from clutch housing 52, so that PTO unit 50 can easily be disassembled.

Referring to FIGS. 3 and 4, clutch housing 52 includes a lower main housing 52a and an upper operation housing 52b joined to each other. A PTO input shaft 25, a parking brake 60 and a drive mode selection clutch 70 are disposed in main housing 52a. A brake operation mechanism 78 and a clutch operation mechanism 83 are disposed in operation housing 52b.

PTO input shaft 25 is disposed coaxially to transmission output shaft 20 so as to extend rightward from transmission output shaft 20. In this regard, referring to FIG. 3, a right end portion of transmission output shaft 20 is journalled by a bearing 72 in rear transaxle casing 5, and projects rightward from rear transaxle casing 5 into a shaft connection chamber 51a formed in a left end portion of clutch housing 52 so as to be coupled to a left end portion of PTO input shaft 25 via a coupling 56, e.g., a spline sleeve, in shaft connection chamber 51a.

The left end of PTO input shaft 25 can easily be attached or detached to and from coupling 56 (inserted or released into and from coupling 56, if coupling 56 is the spline sleeve) provided on the right end of transmission output shaft 20 simultaneously to the above-mentioned attachment or detachment of the left flange of clutch housing 52 to and from rear transaxle casing 5, thereby facilitating the attachment and detachment of PTO unit 50 having PTO input shaft 25 to and from rear transaxle 3 having transmission output shaft 20.

Referring to FIG. 4, PTO input shaft 25 includes a left clutch input shaft 23 and a right clutch output shaft 24 disposed coaxially to each other. The above-mentioned left end portion of PTO input shaft 25 coupled to the right end portion of transmission output shaft 20 via coupling 56 is a left end portion of clutch input shaft 23. Therefore, by attaching PTO unit 50 to rear transaxle 3, clutch input shaft 23 is drivingly connected to transmission output shaft 20. Moreover, clutch input shaft 23 may be rotatably integrated with transmission output shaft 20.

On the other hand, referring to FIGS. 3 and 4, clutch output shaft 24 is formed (or fixedly provided) on a right end portion thereof with a bevel gear 54 in a gear chamber 51e formed in gear housing 53. Referring to FIGS. 2 and 3, in gear chamber 51e, a bevel gear 55 is formed (or fixed) on a rear end portion of PTO shaft 26, and meshes with bevel gear 54. Therefore, bevel gears 54 and 55 constitute a PTO gear train 50a drivingly connecting clutch output shaft 24 of PTO input shaft 25 to PTO shaft 26. Bevel gears 54 and 55 may have equal diameters so that PTO gear train 50a serves as an even speed ratio gear train. Alternatively, bevel gears 54 and 55 may have different diameters so that PTO gear train 50a serves as a speed-reduction (see the alternative embodiment shown in FIG. 12) or speed-increase gear train.

Clutch input shaft 23 is formed on a right end portion thereof with a projection 23a. Clutch output shaft 24 is formed in a left end portion thereof with a recess 24a. Projection 23a is fitted into recess 24a so as to join the right end portion of clutch input shaft 23 to the left end portion of clutch output shaft 24. However, projection 23a is rotatable in recess 24a so that clutch output shaft 24 is allowed to rotate relative to clutch input shaft 23 unless drive mode selection clutch 70 is engaged.

Referring to FIG. 4, clutch input shaft 23 is journalled by clutch housing 52 via a left bearing 73 and a right bearing 74. Clutch output shaft 24 is journalled by clutch housing 52 via a left bearing 75 and a right bearing 76. Clutch housing 52 is formed therein with a brake chamber 51b between bearings 73 and 74, and with a clutch chamber 51d between bearings 74 and 75. Parking brake 60 is provided on upstream shaft 23 in brake chamber 51b. Drive mode selection clutch 70 is provided on the right end portion of clutch input shaft 23 in clutch chamber 51d. Foresaid shaft connection chamber 51a is formed between the left end of clutch housing 52 and bearing 73.

Referring to FIG. 4, drive mode selection clutch 70 will be described. In clutch chamber 51d, the right end portion of clutch input shaft 23 and the left end portion of clutch output shaft 24 have splined outer peripheral portions. Drive mode selection clutch 70 includes a clutch shift sleeve 71 constantly spline-fitted on the splined outer peripheral portion of the right end portion of clutch input shaft 23. Clutch shift sleeve 71 is slidable along clutch input and output shafts 23 and 24 so as to be shiftable between a two wheel driving (2WD) mode position Pc1 and a four wheel driving (4WD) mode position Pc2.

When clutch shift sleeve 71 is set at 2WD mode position Pc1, clutch shift sleeve 71 is not fitted on the splined outer peripheral portion of the left end portion of clutch output shaft 24, thereby isolating PTO gear train 50a and PTO shaft 26 from the rotary power of transmission output shaft 20 and clutch input shaft 23 of PTO input shaft 25, whereby front transaxle 2 carrying front wheels 6 is isolated from the driving power of gear transmission 10, i.e., vehicle 1 travels in 2WD mode. When clutch shift sleeve 71 is set at 4WD mode position Pc2, clutch shift sleeve 71 is fitted on the splined outer peripheral portion of the left end portion of clutch output shaft 24, thereby transmitting the rotary power of transmission output shaft 20 and clutch input shaft 23 of PTO input shaft 25 to PTO gear train 50a and PTO shaft 26, whereby front transaxle 2 carrying front wheels 6 receives the driving power from gear transmission 10, i.e., vehicle 1 travels in 4WD mode.

Referring to FIG. 3, vehicle 1 is provided with a drive mode selection lever 86 serving as a manipulator for shifting clutch shift sleeve 71. A vertical upper clutch operation shaft 84 is journalled by a right end portion of operation housing 52b, and is operatively connected to drive mode selection lever 86 via a link 85. Link 85 may have any configuration. For example, link 85 may be a mechanical link including a wire or a rod, or may be an electric link including an electronic actuator, e.g., an electric motor, or a hydraulic cylinder controlled by a solenoid valve, which may be connected to a switch which responds to the shift of parking brake lever 81, thereby lightening an operator's operational force. In this regard, an arm may be fixed on a top portion of upper clutch operation shaft 84 projecting upward from operation housing 52b so as to be connected to link 85.

Referring to FIG. 4, an annular groove 71a is formed on clutch shift sleeve 71. Referring to FIG. 3, a vertical lower clutch operation shaft 82 is disposed in clutch housing 52 so as to engage at a bottom end thereof into annular groove 71a. Clutch operation mechanism 83 is disposed in gear housing 52 so as to operatively connect upper clutch operation shaft 84 to lower clutch operation shaft 82 so that, when upper clutch operation shaft 84 is rotated centered on its own axis by operating drive mode selection lever 86, lower clutch operation shaft 82 revolves centered on upper clutch operation shaft 84, whereby the revolution of lower clutch slider operation shaft 82 causes clutch shift sleeve 71 to slide along PTO input shaft 25.

Parking brake 60 will be described with reference to FIGS. 3 to 9. In brake chamber 51b, an outer peripheral portion of clutch input shaft 23 is splined. Parking brake 60 includes a brake flange 61, a brake shifter 62, and a lock pin 65. Brake shifter 62 is disposed in a main portion of brake chamber 51b. Brake shifter 62 includes an inner sleeve 63 and an outer sleeve 64. Inner sleeve 63 is splined-fitted on the splined outer peripheral portion of clutch input shaft 23 so as to be axially slidable and unrotatable relative to clutch input shaft 23. Outer sleeve 64 is fitted on inner sleeve 63 so as to be axially slidable relative to inner sleeve 63.

Figure 28:
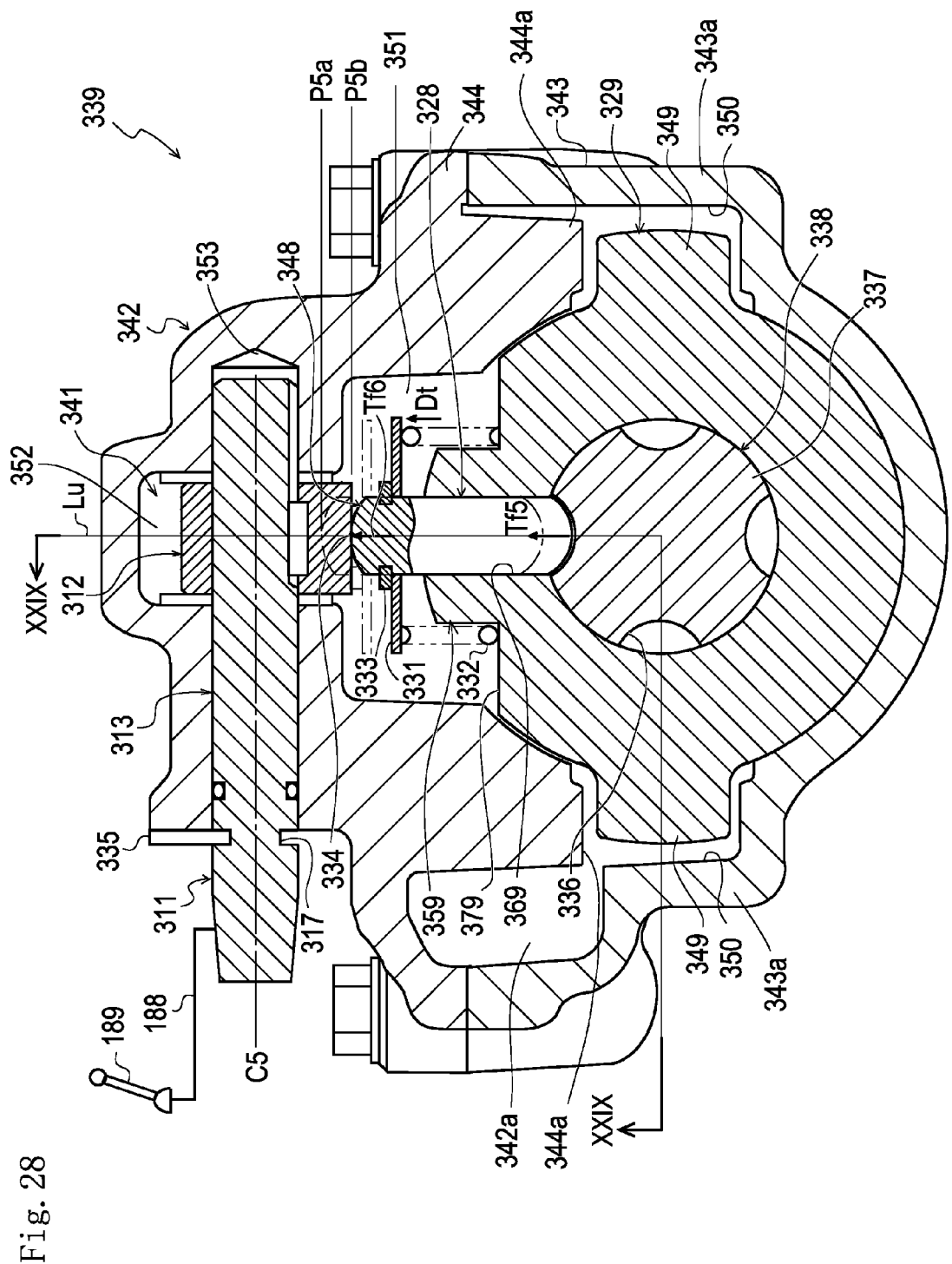
FIG. 28 is a sectional rear view of an alternative clutch unit 339.

In an axial end (in this embodiment, right end) portion of brake chamber 51b, ring-shaped brake flange 61, serving as a first pawl member, is disposed around clutch input shaft 23 so as to allow clutch input shaft 23 passed therethrough to rotate relative to brake flange 61. The axial end portion of brake chamber 51b is formed with recesses 51c, which are expanded centrifugally from the inner peripheral surface of clutch housing 52 defining the main portion of brake chamber 51b. Brake flange 61 is formed with centrifugally expanded engagement projections 61a corresponding to respective recesses 51c. Engagement projections 61a are inserted into respective recesses 51c. Engagement projections 61a of brake flange 61 and recesses 51c may be formed similar to engagement projections 349 of a brake flange 329 and recesses 350 in a later-discussed alternative embodiment as shown in FIG. 28. In this way, brake flange 61 is hindered by clutch housing 52 from moving axially along clutch input shaft 23 and in the peripheral direction of clutch input shaft 23. In other words, brake flange 61 is fixed to clutch unit casing 51.

Figure 7:
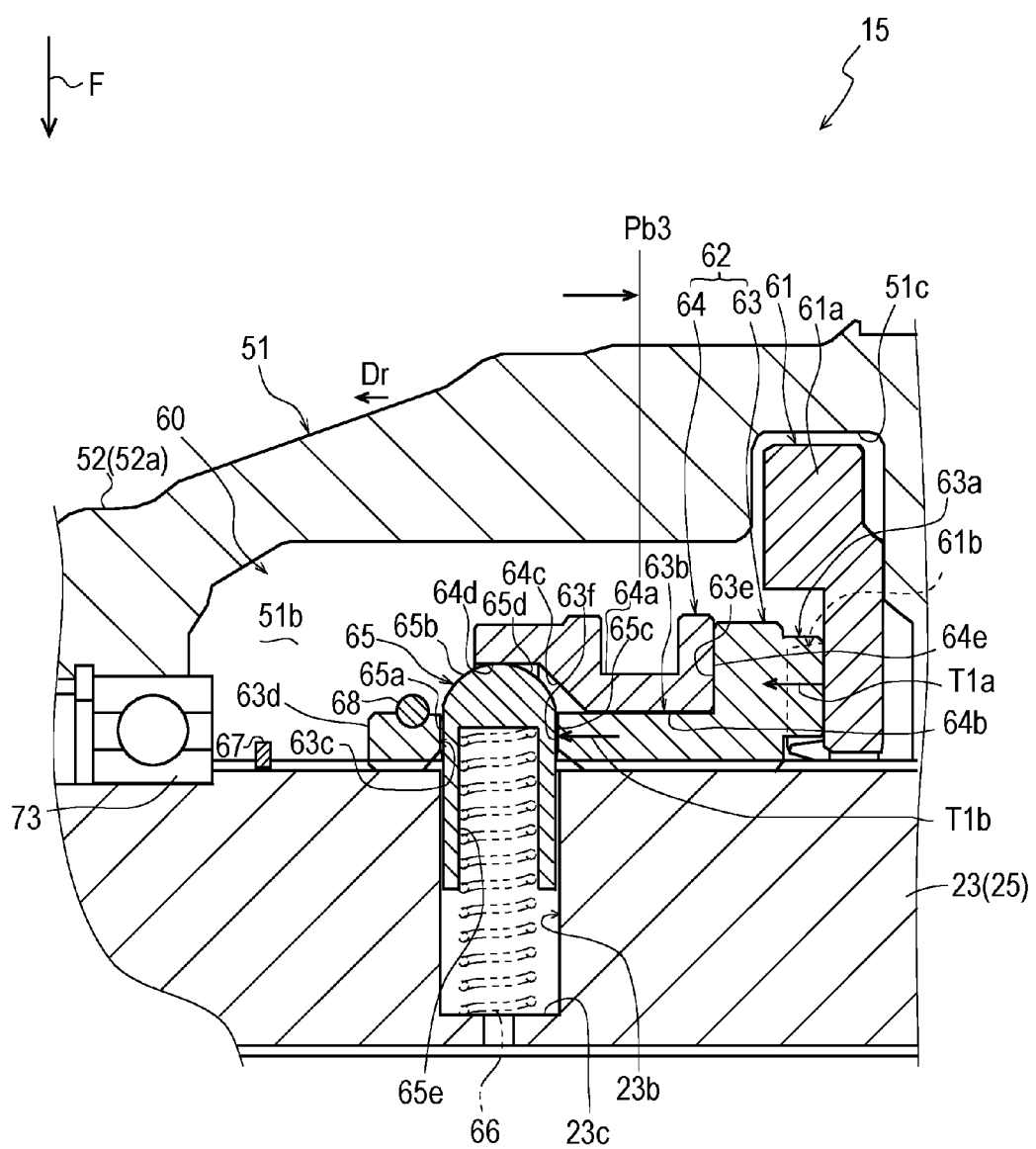
FIG. 7 is a sectional bottom view of the principal portion of parking brake 60 set in the braking state.
Figure 8:
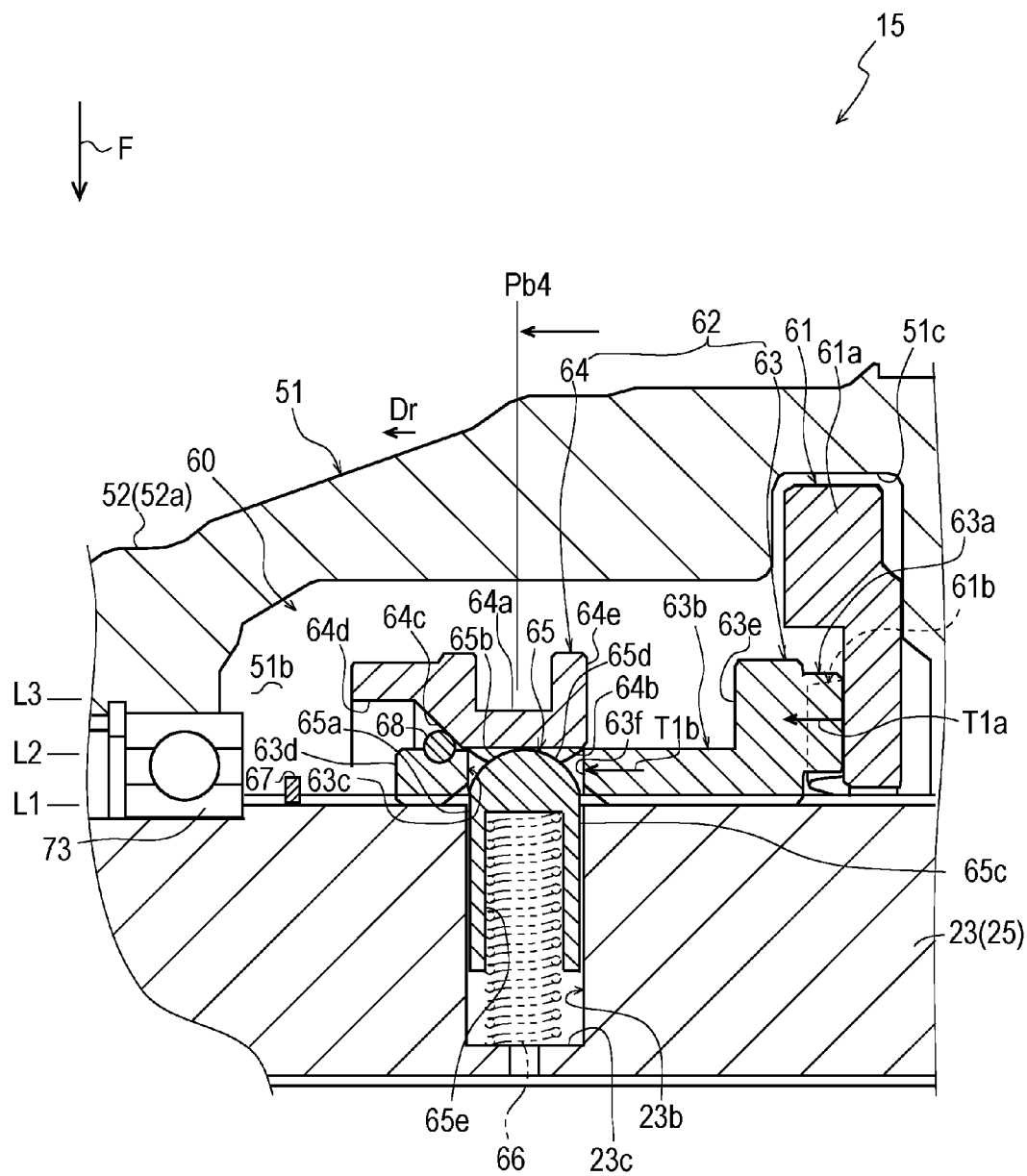
FIG. 8 is a sectional bottom view of the principal portion of parking brake 60 being shifted to the unbraking state.

Inner sleeve 63 spline-fitted on clutch input shaft 23 is formed with a flange at an axial right end thereof facing brake flange 61 so as to serve as a second pawl member. A vertical left end surface of the flange of inner sleeve 63 is defined as a retaining surface 63e which can contact a later-discussed vertical right pressure surface 64e of outer sleeve 64. Further, inner sleeve 63 is formed with pawls 63a extended rightward from a right end surface of the flange having retaining surface 63e at its left end. Brake flange 61 is formed with pawls 61b on an axial left end thereof facing brake shifter 64. By sliding inner sleeve 63 rightward along clutch input shaft 23 to brake flange 61, pawls 63a mesh with pawls 61b so that inner sleeve 63 engages with brake flange 61 so as to hinder clutch input shaft 23 from rotating relative to unit housing 51. Referring to FIGS. 7 and 8, the position of inner sleeve 63, where pawls 63a of inner sleeve 63 mesh with pawls 61b of brake flange 61, is also defined as a right limit position for the slide of inner sleeve 63 relative to clutch input shaft 23. This position is referred to as a braking position of inner sleeve 63.

Figure 5:
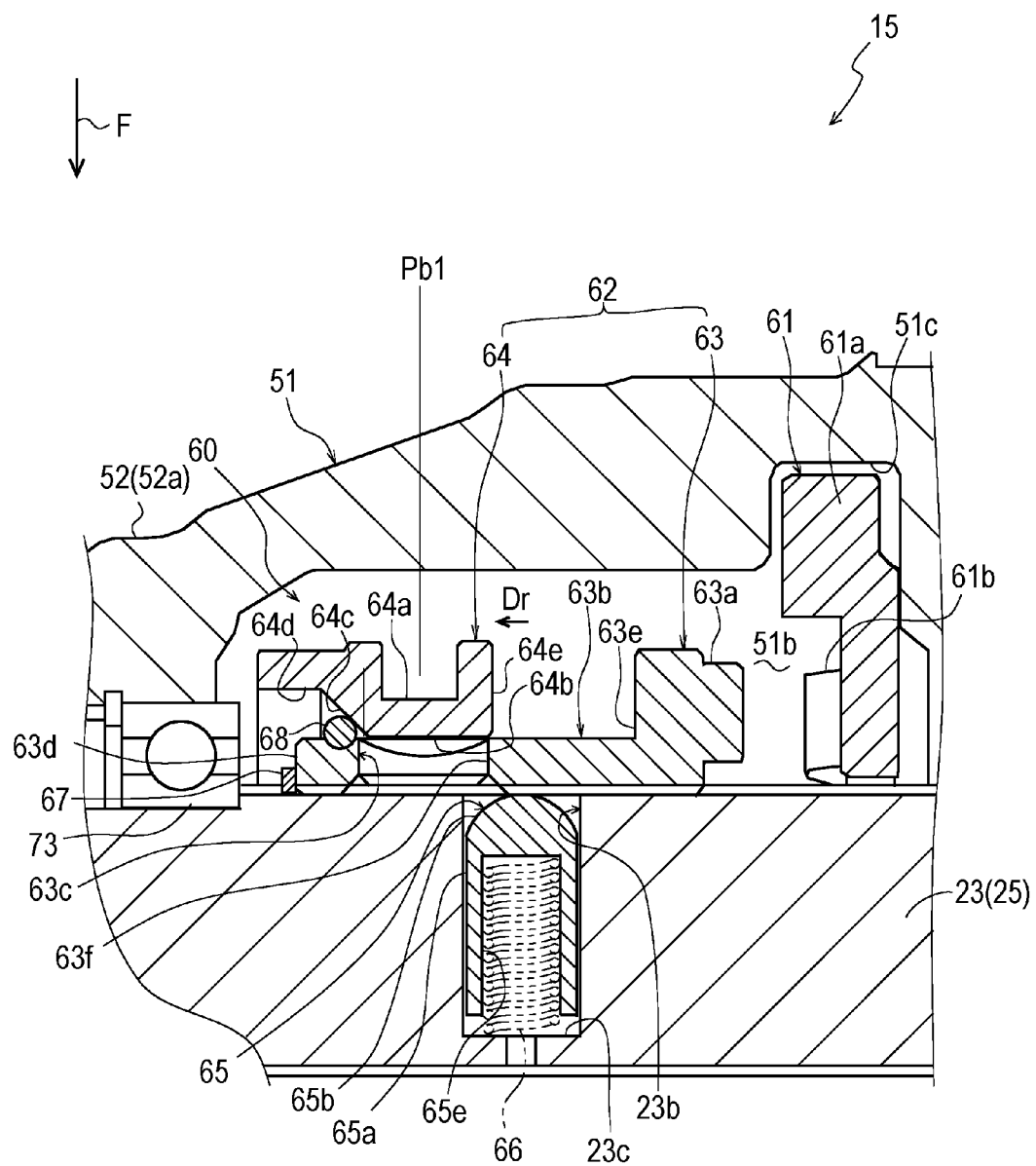
FIG. 5 is a sectional bottom view of a principal portion of parking brake 60 set in an unbraking state.
Figure 6:
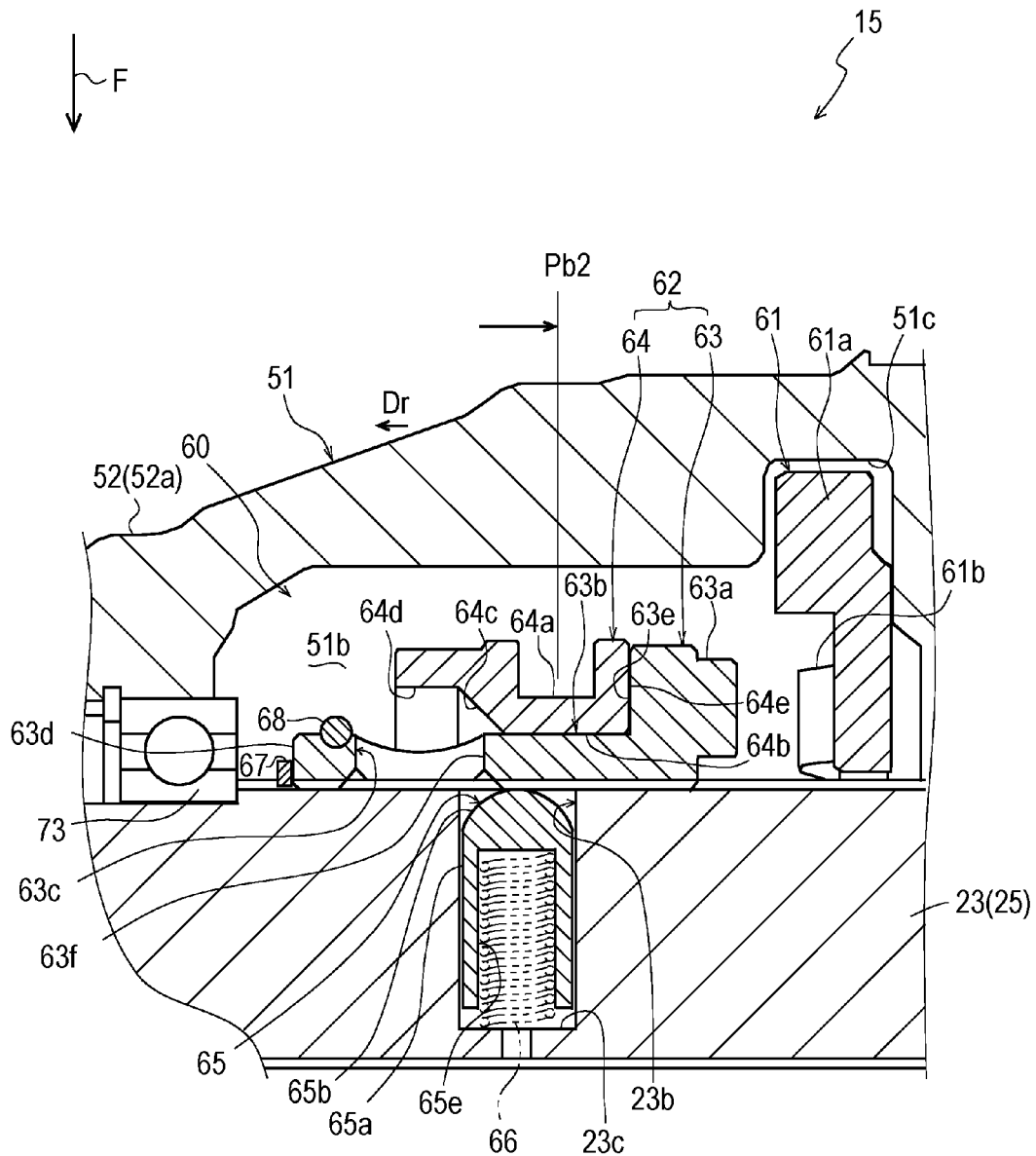
FIG. 6 is a sectional bottom view of the principal portion of parking brake 60 being shifted to a braking state.

A sleeve-shaped lock portion 63b of inner sleeve 63 spline-fitted on clutch input shaft 23 is extended leftward from pawls 63a along clutch input shaft 23. A retaining ring 67 is fixed on clutch input shaft 23 close to bearing 73 defining the left end of brake chamber 51b. Referring to FIGS. 5 and 6, a position of inner sleeve 63, where lock portion 63b of inner sleeve 63 contacts retaining ring 67 at a left end thereof, is defined as a left limit position for the slide of inner sleeve 63 relative to clutch input shaft 23. This position is referred to as an unbraking position of inner sleeve 63.

Clutch input shaft 23 is formed therein with a radial pin recess 23b having an end surface 23c. Lock pin 65, serving as a locking member, is fitted in radial recess 23b slidably in the radial direction of clutch input shaft 23. Lock pin 65 is formed with a sleeve portion 65a having a spring chamber 65e therein, so that spring chamber 65d is open at an end of lock pin 65 facing end surface 23c of pin recess 23b. Lock pin 65 is formed with a hemispheric head 65b at an end of sleeve portion 65a opposite the open end of spring chamber 65e. A spring 66 is interposed between an end surface of spring chamber 65e and end surface 23c of pin recess 23b so as to constantly bias lock pin 65 in the direction for making head 65b of lock pin 65 project outward from pin recess 23b.

Lock portion 63b of inner sleeve 63 is formed through a left portion thereof with a radial pin hole 63c. When inner sleeve 63 is disposed at the braking position, head 65b of lock pin 65 biased by spring 66 enters pin hole 63c. When inner sleeve 63 is disposed at the unbraking position, pin hole 63c is disposed leftward from radial recess 23b of clutch input shaft 23 so that the inner peripheral surface of lock portion 63b of inner sleeve 63 contacts head 65b of lock pin 65 so as to press lock pin 65 in recess 23b against spring 66.

Lock portion 63b is fixedly provided peripherally on a left end portion thereof with a retaining ring 68. Outer sleeve 64, serving as a locking operation member, is axially slidably fitted on an outer peripheral surface of lock portion 63b of inner sleeve 63. Referring to FIGS. 5 and 7, a position of outer sleeve 64 contacting retaining ring 68 on inner sleeve 63 at a left portion thereof is defined as a left limit position for the slide of outer sleeve 64 relative to inner sleeve 63. This position is referred to as an unlocking position of outer sleeve 64 relative to inner sleeve 63. On the other hand, referring to FIGS. 6 and 8, a position of outer sleeve 64 where contacting retaining surface 63e of inner sleeve 63 at a right end thereof is defined as a right limit position for the slide of outer sleeve 64 relative to inner sleeve 63. This position is referred to as a locking position of outer sleeve 64 relative to inner sleeve 63.

More specifically, outer sleeve 64 is formed so that its right portion is diametrically smaller than its left portion. An inner peripheral surface of the diametrically small right portion of outer sleeve 64 is defined as a slidable fitting surface 64b that axially slidably contacts the outer peripheral surface of lock portion 63b of inner sleeve 63. An outer peripheral portion of the diametrically small right portion of outer sleeve 64 is formed with an annular groove 64a, into which a later-discussed lower brake operation shaft 77 is fitted. A right end portion of outer sleeve 64 is defined as a right end of annular groove 64a, and its vertical right end surface is defined as a pressure surface 64e that can contact retaining surface 63e of inner sleeve 63. The above-mentioned locking position of outer sleeve 64 relative to inner sleeve 63 means the position where pressure surface 64e of outer sleeve 64 contacts retaining surface 63e of inner sleeve 63.

An inner peripheral surface of the diametrically large left end portion of outer sleeve 64 is defined as a retaining surface 64d that is spaced from the outer peripheral surface of inner sleeve 63. Therefore, outer sleeve 64 is formed with a tapered inner peripheral surface 64c extended from a left end of slidable fitting surface 64b to a right end of retaining surface 64d. The above-mentioned unlocking position of outer sleeve 64 relative to inner sleeve 63 means the position where tapered inner peripheral surface 64c of outer sleeve 64 contacts retaining ring 68 on inner sleeve 63.

Figure 9:
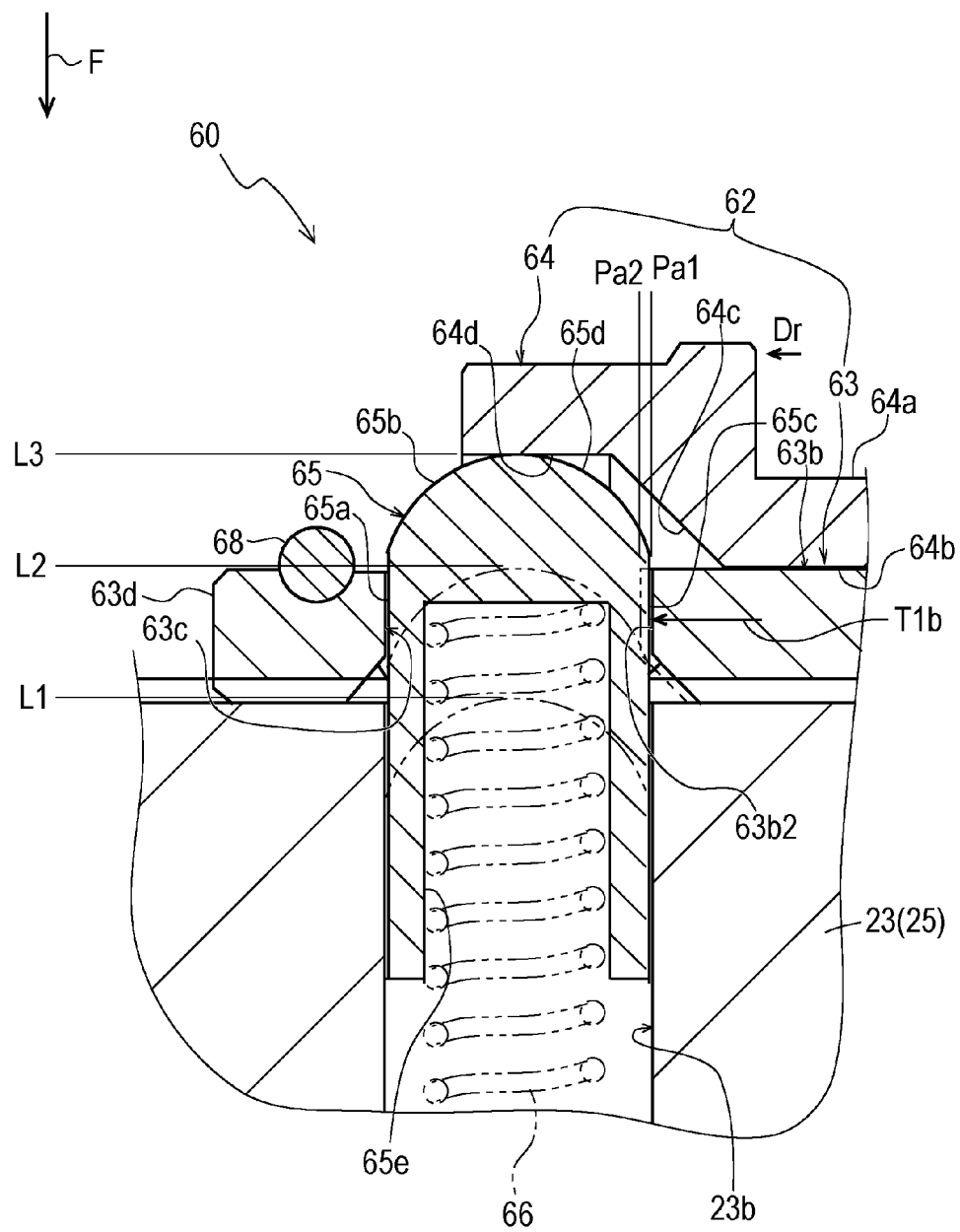
FIG. 9 is a sectional bottom view of the principal portion of parking brake 60 showing activation of a brake shifter 63 to a lock pin 65.

Referring to FIG. 9, while inner sleeve 63 is disposed at the unbraking position where the left end of inner sleeve 63 contacts retaining ring 67 as shown in FIGS. 5 and 6, head 65b of lock pin 65 is kept at a brake-unlocking position L1, where head 65b of lock pin 65 is pressed in pin recess 23b. On the other hand, while inner sleeve 63 is disposed at the braking position where pawls 61b and 63a mesh with each other, head 65b of lock pin 65 enters pin hole 63c, and to how much degree head 65b of lock pin 65 projects outward from the outer peripheral surface of clutch input shaft 23 depends on positions of inner and outer sleeves 63 and 64. If outer sleeve 64 is disposed at the locking position relative to inner sleeve 63 as shown in FIG. 7, head 65b of lock pin 65 greatly projects outward so as to reach a brake-locking position L3 where head 65b abuts against retaining surface 64d of outer sleeve 64. If outer sleeve 64 is disposed at the unlocking position relative to inner sleeve 63 as shown in FIG. 8, head 65b of lock pin 65 projects a little outward so as to reach an inner-sleeve locking position L2 where head 65b abuts against slidable fitting surface 51b of outer sleeve 64.

Referring to FIGS. 5 to 8, four shift positions are defined for the slide of outer sleeve 64 relative to clutch input shaft 23. An unbraking position Pb1, as shown in FIG. 5, is a leftmost shift position of outer sleeve 64 relative to clutch input shaft 23, where tapered inner peripheral surface 64c of outer sleeve 64 abuts against retaining ring 68, and the left end of inner sleeve 63 abuts against retaining ring 67. In other words, outer sleeve 64 set at unbraking position Pb1 is located at the unlocking position relative to inner sleeve 63 located at the unbraking position.

A braking position Pb3, as shown in FIG. 7, is a rightmost shift position of outer sleeve 64 relative to clutch input shaft 23, where pressure surface 64e of outer sleeve 64 abuts against retaining surface 63e of inner sleeve 63, and pawls 61b and 63a mesh with each other. In other words, outer sleeve 64 set at braking position Pb3 is located at the locking position relative to inner sleeve 63 located at the braking position.

There is a first intermediate shift position Pb2, as shown in FIG. 6, on the way of the sliding of outer sleeve 64 from unbraking position Pb1 to braking position Pb3. At first intermediate shift position Pb2, pressure surface 64e of outer sleeve 64 abuts against retaining surface 63e of inner sleeve 63, and the left end of inner sleeve 63 abuts against retaining ring 67. In other words, outer sleeve 64 set at first intermediate shift position Pb2 is located at the locking position relative to inner sleeve 63 located at the unbraking position.

There is a second intermediate shift position Pb4, as shown in FIG. 8, on the way of the sliding of outer sleeve 64 from braking position Pb3 to unbraking position Pb1. At second intermediate shift position Pb4, tapered inner peripheral surface 64c of outer sleeve 64 abuts against retaining ring 68, and pawls 61b and 63a mesh with each other. In other words, outer sleeve 64 set at second intermediate shift position Pb4 is located at the unlocking position relative to inner sleeve 63 located at the braking position.

As discussed later, by shifting the position of outer sleeve 64 relative to clutch input shaft 23, inner sleeve 63 is located at either the unbraking position as its left limit position, where inner sleeve 63 contacts retaining ring 67, or the braking position as its right limit position, where pawls 49b and 50a mesh with each other.

Referring to FIG. 3, vehicle 1 is provided with a parking brake lever 81 serving as a manipulator for shifting outer sleeve 64 of brake shifter 63. Parking brake lever 81 is rotatably shiftable between an unbraking position (not shown) for locating outer sleeve 64 at unbraking position Pb1 to disengage pawls 63a of inner sleeve 63 from pawls 61b of brake flange 61 and a braking position (not shown) for locating outer sleeve 64 at braking position Pb3 to engage pawls 63a with pawls 61b. A vertical upper brake operation shaft 79 is journalled by a laterally intermediate portion of operation housing 52b, and is operatively connected to parking brake lever 81 via a link 80. Link 80 may have any configuration. For example, link 80 may be a mechanical link including a wire or a rod, or may be an electric link including an electronic actuator, e.g., an electric motor, or a hydraulic cylinder controlled by a solenoid valve, which may be connected to a switch which responds to the shift of parking brake lever 81, thereby lightening an operator's operational force. In this regard, an arm may be fixed on a top portion of upper brake operation shaft 79 projecting upward from operation housing 52b so as to be connected to link 80.

Referring to FIG. 3, a vertical lower brake operation shaft 77 is disposed in clutch housing 52 so as to engage at a bottom end thereof into annular groove 64a. Brake operation mechanism 78 is disposed in gear housing 52 so as to operatively connect upper brake operation shaft 79 to lower brake operation shaft 77 so that, when upper brake operation shaft 79 is rotated centered on its own axis by operating parking brake lever 81, lower brake operation shaft 77 revolves centered on upper brake operation shaft 79, whereby the revolution of lower clutch slider operation shaft 77 causes outer sleeve 64 to slide relative to clutch input shaft 23 of PTO input shaft 25.

A breaking operation of parking brake 60 will be described with reference to FIGS. 5 to 7 and 9. When parking brake lever 81 is set at the unbraking position, outer sleeve 64 abuts at tapered inner peripheral surface 64c against retaining ring 68, whereby outer sleeve 64 is retained at unbraking position Pb1 as shown in FIG. 5. The pressure of outer sleeve 64 against retaining ring 68 is applied leftward onto inner sleeve 63, and inner sleeve 63 leftwardly pressed by outer sleeve 64 abuts against retaining ring 67, whereby inner sleeve 63 is retained at its unbraking position, i.e., its left limit position. In this state, pawls 63a of inner sleeve 63 are separated from pawls 61b of brake flange 61, thereby keeping clutch input shaft 23 from being braked by brake flange 61. Therefore, if drive mode selection clutch 70 is engaged to set vehicle 1 in the 4WD mode, the rotary power of transmission output shaft 20 is transmitted to PTO shaft 26 for driving front wheels 6. Further, in this state, head 65b of lock pin 65 is disposed at brake-unlocking position L1 as shown in FIG. 9, so that inner sleeve 63 is allowed to slide rightward to brake flange 61.

By shifting parking brake lever 81 to the braking position, outer sleeve 64 starts to slide at slidable fitting surface 64b thereof on inner sleeve 63 rightward away from retaining ring 68. Inner sleeve 63 is kept at its unbraking position until rightward moving outer sleeve 64 reaches first intermediate shift position Pb2 as shown in FIG. 6. When outer sleeve 64 reaches first intermediate shift position Pb2, pressure surface 64e comes to contact retaining surface 63e of inner sleeve 63. Afterward, as outer sleeve 64 moves rightward, inner sleeve 63 is pushed at retaining surface 63e by pressure surface 64e of outer sleeve 64 moving rightward, so that inner sleeve 63 moves rightward together with outer sleeve 64. Finally, outer sleeve 64 reaches braking position Pb3 as shown in FIG. 7, so that inner sleeve 63 reaches its braking position, i.e., its right limit position, whereby pawls 63a of inner sleeve 63 come to mesh with pawls 61b of brake flange 61, thereby braking clutch input shaft 23 of PTO input shaft 25. The braking force applied on clutch input shaft 23 by parking brake 60 is transmitted to rear wheels 7 via transmission output shaft 20 and differential unit 40. If drive mode selection clutch 70 is engaged, the braking force applied on clutch input shaft 23 is also transmitted to PTO shaft 26 for driving front wheels 6 via clutch output shaft 24 and PTO gear train 50a.

Further, when outer sleeve 64 reaches breaking position Pb3, pin hole 63c of inner sleeve 63 coincides to pin recess 23b of clutch input shaft 23, and slidable fitting surface 64b of outer sleeve 64 is disposed rightward from pin hole 63c, so that lock pin 65 projects through pin hole 63c and head 65b of lock pin 65 reaches brake-locking position L3 as shown in FIG. 9, where head 65b contacts retaining inner peripheral surface 64d of outer sleeve 64. Therefore, lock pin 65 prevents both inner and outer sleeves 63 and 64 from unexpectedly moving leftward, i.e., in an unbraking direction Dr as shown in FIGS. 5 to 8.

While head 65b of lock pin 65 is kept at brake-locking position L3, a right portion of an inner peripheral surface 63b2 of inner sleeve 63 defining pin hole 63b is kept at a position Pa1, where the right portion of inner peripheral surface 63b2 defining pin hole 63b substantially contacts a right outer peripheral surface of sleeve portion 65a of lock pin 65. Pin hole 63b has a constant diameter so that inner peripheral surface 63b2 of inner sleeve 63 defining pin hole 63b is parallel to the outer peripheral surface of sleeve portion 65a of lock pin 65, except that only an open end portion of inner peripheral surface 63b2 defining pin hole 63b facing the outer peripheral surface of clutch input shaft 23 is tapered so as to be able to abut against hemispheric head 65b of lock pin 65 when head 65b is disposed at inner sleeve locking position L2 as discussed later.

In this regard, while pawls 63a mesh with pawls 61b, inner sleeve 63 receives a counterforce T1a from brake flange 61 so as to be thrust leftward in unbraking direction Dr. Due to this counterforce T1a, inner sleeve 63 has a leftward thrusting force T1b. Therefore, the right portion of inner peripheral surface 63b2 of inner sleeve 63 defining pin hole 63b and the right portion of the outer peripheral surface of sleeve portion 65a of lock pin 65 are perpendicular to the direction of thrusting force T1b, so that thrusting force T1b is fully applied perpendicularly to the right portion of the outer peripheral surface of sleeve portion 65a without diverting, whereby lock pin 65 surely keeps inner sleeve 63 at the right limit position (braking position) from unexpectedly moving in unbraking direction Dr.

An unbraking operation of parking brake 60 will be described with reference to FIGS. 7, 8 and 9. By shifting parking brake lever 81 having been set at the braking position to the unbraking position, outer sleeve 64 starts to slide leftward in unbraking direction Dr at slidable fitting surface 51b thereof on inner sleeve 63 so as to separate pressure surface 64e from retaining surface 63e of inner sleeve 63 having pawls 63a meshing with pawls 61b of brake flange 61. At the start of sliding of outer sleeve 64 in unbraking direction Dr, retaining inner peripheral surface 64d of outer sleeve 64 slides against head 65b of lock pin 65 so that head 65b is held at brake-locking position L3 until tapered inner peripheral surface 64c of outer sleeve 64 abuts against head 65b. In this regard, head 65b of lock pin 65 is extended slantwise in unbraking direction Dr from the right portion of the outer peripheral surface of sleeve portion 65a which contacts the right portion of inner peripheral surface 63b2 of inner sleeve 63 defining pin hole 63b.

As outer sleeve 64 slides in unbraking direction Dr after tapered inner peripheral surface 64c abuts against head 65b, tapered inner peripheral surface 64c moving in unbraking direction Dr depresses head 65b. Then, slidable fitting surface 64b of outer sleeve 64 comes to abut against head 65b so that head 65b of lock pin 65 is disposed at inner sleeve locking position L2. Head 65b is held at inner sleeve locking position L2 during the slide of outer sleeve 64 in unbraking direction Dr until outer sleeve 64 reaches second intermediate shift position Pb4, where tapered inner peripheral surface 64c comes to abut against retaining ring 68. Therefore, once the slide of outer sleeve 64 in unbraking position Dr (leftward) from second intermediate shift position Pb4 starts, for example, when outer sleeve 64 reaches a position Pa2, the tapered portion of inner peripheral surface 63b2 of inner sleeve 63 defining pin hole 63c comes to abut against hemispherical head 65b of lock pin 65 disposed at inner sleeve locking position L2 so that inner sleeve 63 applies leftward thrusting force T1b on head 65b. As inner sleeve 63 pushed by outer sleeve 64 via retaining ring 68 slides in unbraking direction Dr, leftward thrusting force T1b of the tapered portion of inner peripheral surface 63b2 of inner sleeve 63 abutting against head 65b functions to depress head 65b. Finally, depressed head 65b of lock pin 65 reaches brake-unlocking position L1 so as to allow inner sleeve 63 to slide in unbraking direction Dr freely from lock pin 65. When outer sleeve 64 reaches unbraking position Pb1, inner sleeve 63 reaches its unbraking position (left limit position) were inner sleeve 63 abuts at the left end thereof against retaining ring 67, whereby pawls 63a of inner sleeve 63 disengage from pawls 61b of brake flange 61.

Figure 10:
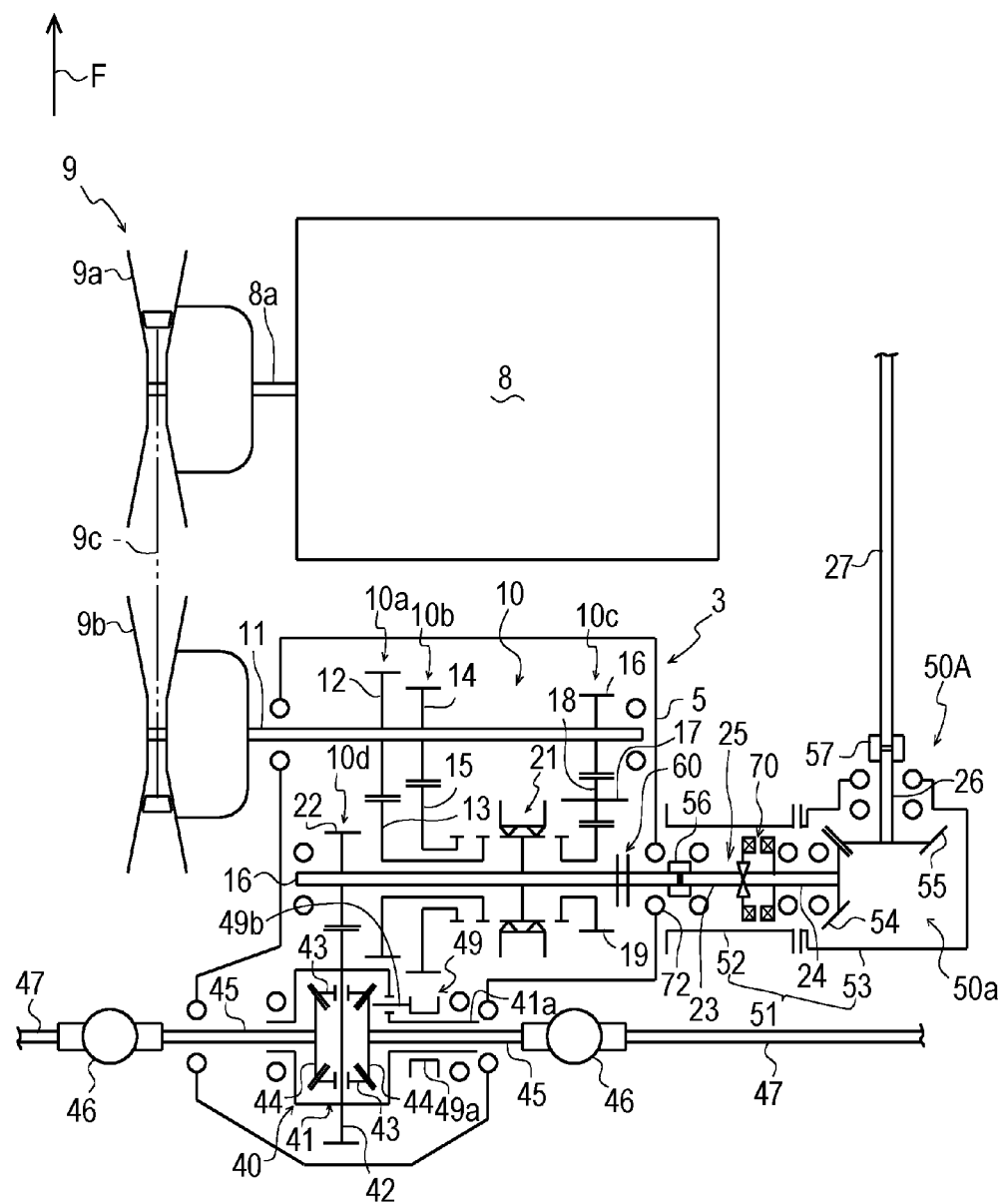
FIG. 10 is a schematic plan view of the principal portion of vehicle 1, showing transaxle 3 provided with an alternative PTO unit 50A.

Referring to FIG. 10, an alternative PTO unit 50A is similar to PTO unit 50 except that parking brake 60 is not provided in PTO unit casing 51 of PTO unit 50A incorporating drive mode selection clutch 70 but is provided on transmission output shaft 20 in rear transaxle casing 5. Parking brake 60 is disposed on the end portion of transmission output shaft 20 adjacent to the opening of rear transaxle casing 5 to which PTO unit casing 51 of PTO unit 50A is joined, thereby being easily be accessed via the opening of rear transaxle casing 5 so as to facilitate its maintenance, although parking brake 50 remains in rear transaxle casing 5 after PTO unit 50 is detached from rear transaxle 3.

Figure 11:
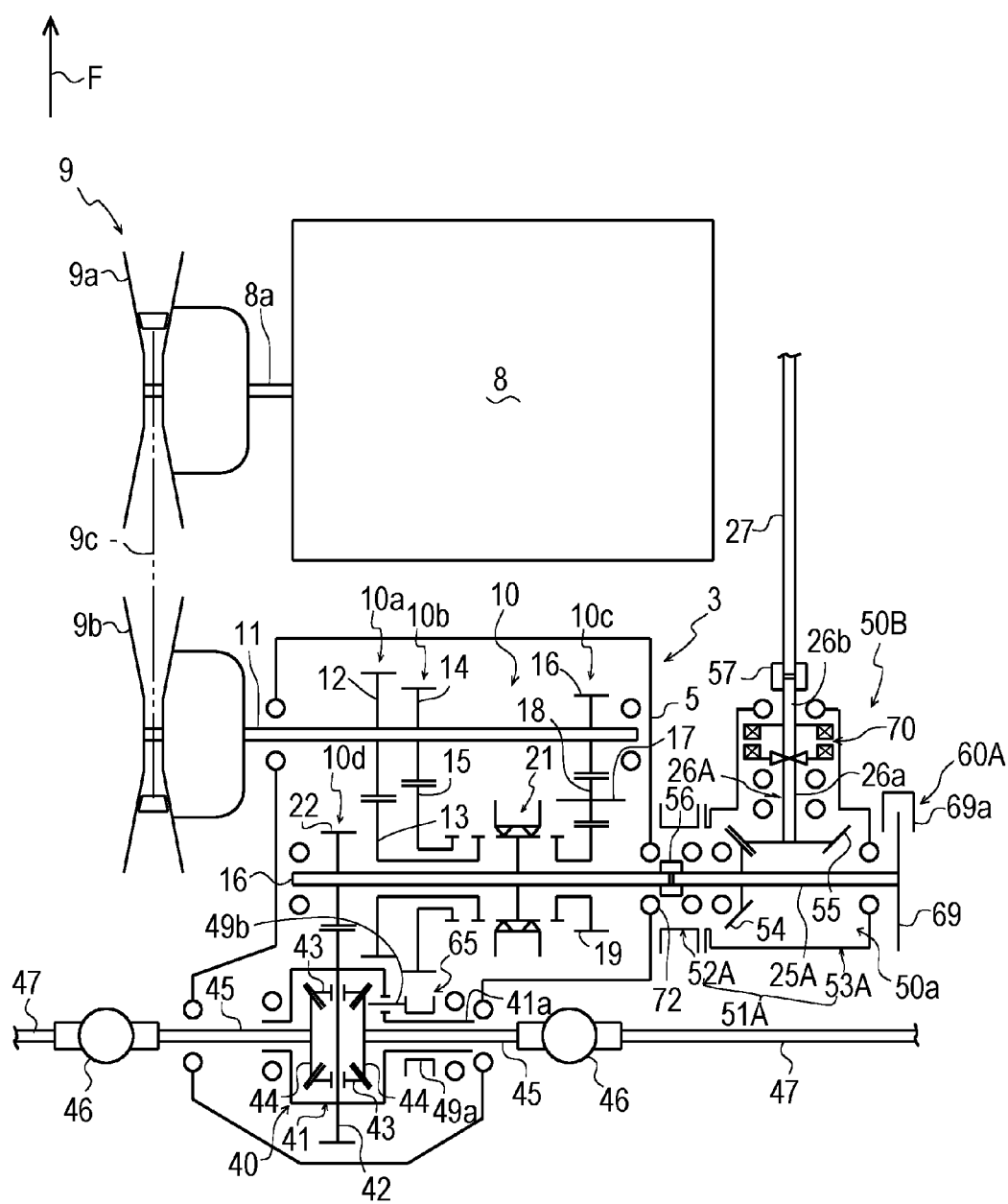
FIG. 11 is a schematic plan view of the principal portion of vehicle 1, showing transaxle 3 provided with an alternative PTO unit 50B.

Referring to FIG. 11, an alternative PTO unit 50B includes an alternative PTO input shaft 25A (more specifically, a clutch output shaft of PTO input shaft 25A, if it is divided into clutch input and output shafts), which is fixedly provided thereon with bevel gear 54, similar to PTO input shaft 25. However, PTO input shaft 25A is further extended rightward from bevel gear 54 and projects outward from an alternative PTO unit casing 51A so as to have an alternative parking brake 60A on an outer end thereof. Parking brake 60A disposed at this position may be further easily accessed for its maintenance. Parking brake 60A is illustrated as a friction disc type brake including a friction disc 69 connected to the right end of PTO input shaft 25A and a brake shoe 69a to nip an outer peripheral edge of friction disc 69. However, parking brake 60A may be configured in any way as far as it is disposed at this position.

Incidentally, PTO unit casing 51A of PTO unit 50B is divided into a first housing 52A and a second housing 53A. First housing 52A journals PTO input shaft 25A, however, does not incorporate a drive mode selection clutch. Second housing 53A incorporates PTO gear train 50a and drive mode selection clutch 70. In this regard, an alternative PTO shaft 26A journalled by second housing 53A is divided into a clutch input shaft 26a and clutch output shaft 26b. Drive mode selection clutch 70 is provided on PTO shaft 26A so that drive mode selection clutch 70 selectively engages clutch output shaft 26b to clutch input shaft 26a for setting the 4WD mode of vehicle 1 or disengages clutch output shaft 26b from clutch input shaft 26a for setting the 2WD mode of vehicle 1.

Referring to FIG. 12, rear transaxle 3 is provided with an alternative PTO unit 50C. PTO unit 50C includes a PTO unit casing 51B that is detachably attached to rear transaxle casing 5. In this embodiment, gear transmission 10 in rear transaxle casing 5 includes an alternative transmission output shaft 20A journaling PTO shaft 26. Transmission output shaft 20A is similar to transmission output shaft 20, except that transmission output shaft 20A is extended rightward from rear transaxle casing 5 into PTO unit casing 51B and is fixedly provided on a right end thereof with bevel gear 54 that meshes with bevel gear 55 on PTO shaft 26 so as to constitute PTO gear train 50a. In other words, PTO unit 50C does not include an additional PTO input shaft but utilizes transmission output shaft 20A of gear transmission 10 in rear transaxle 3 by itself to transmit power from transmission output shaft 20A to PTO shaft 26.

Figure 20:
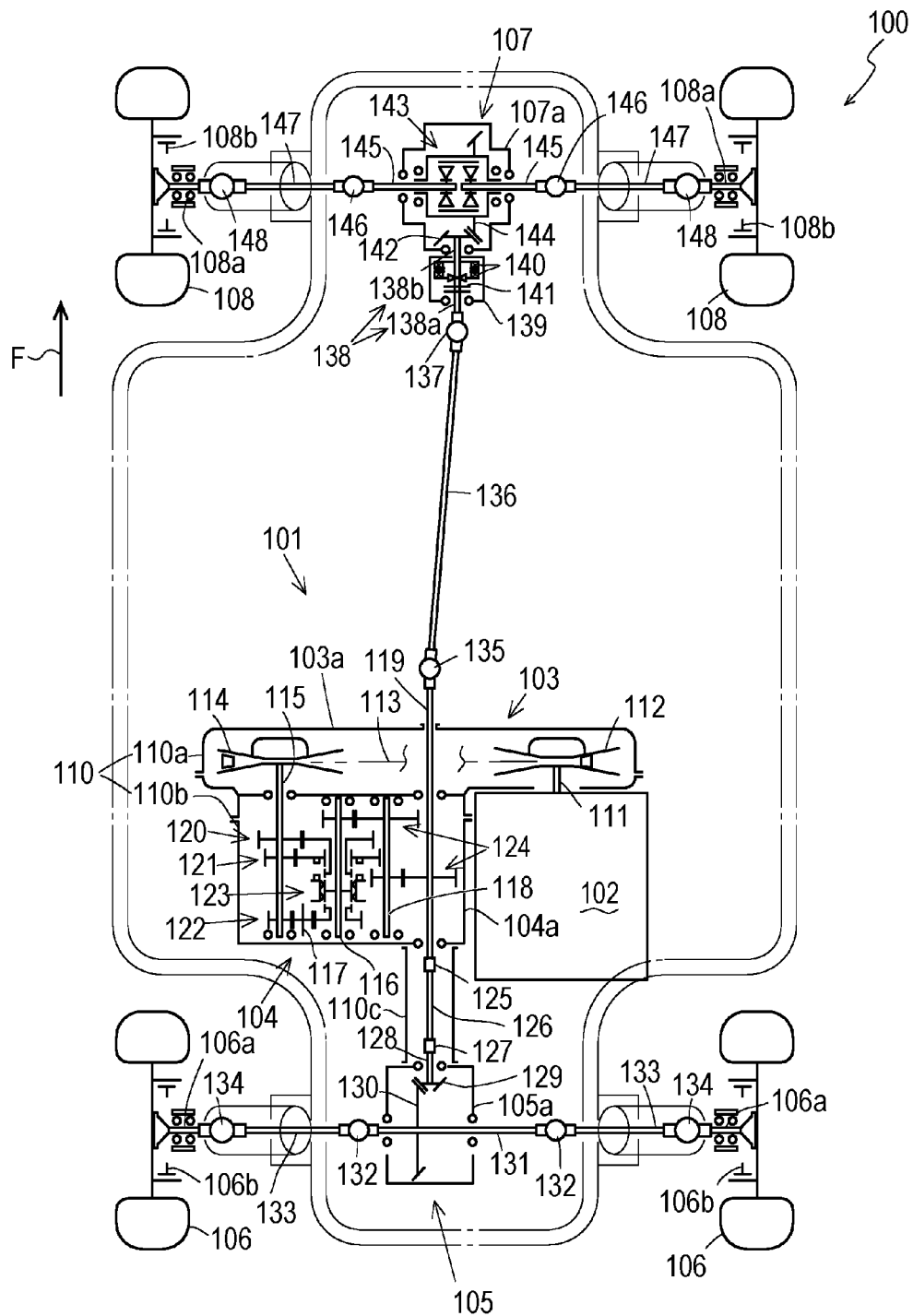
FIG. 20 is a schematic plan view of a four-wheel drive vehicle 100.

Further, referring to FIG. 12, rear transaxle 3 with PTO unit 50C has neither a parking brake, such as parking brake 60, nor a drive mode selection clutch, such as drive mode selection clutch 70. Therefore, preferably, front transaxle 2 (not shown in FIG. 12) includes a parking brake and a drive mode selection clutch, similar to a later-discussed front transaxle 107 as shown in FIG. 20.

Referring to FIG. 12, gearshift clutch 21 is illustrated as including a clutch hub 91 and a gearshift sleeve 92. This illustration of gearshift clutch 21 means that gear transmission 10 in rear transaxle 3 shown in FIG. 12 includes gearshift clutch 21 having a configuration such as shown in FIGS. 13 to 19. Moreover, gearshift clutch 21 of gear transmission 10 in rear transaxle 3 shown in FIGS. 1, 2, 10 and 11 may have the configuration such as shown in FIGS. 13 to 19.

Figure 13:
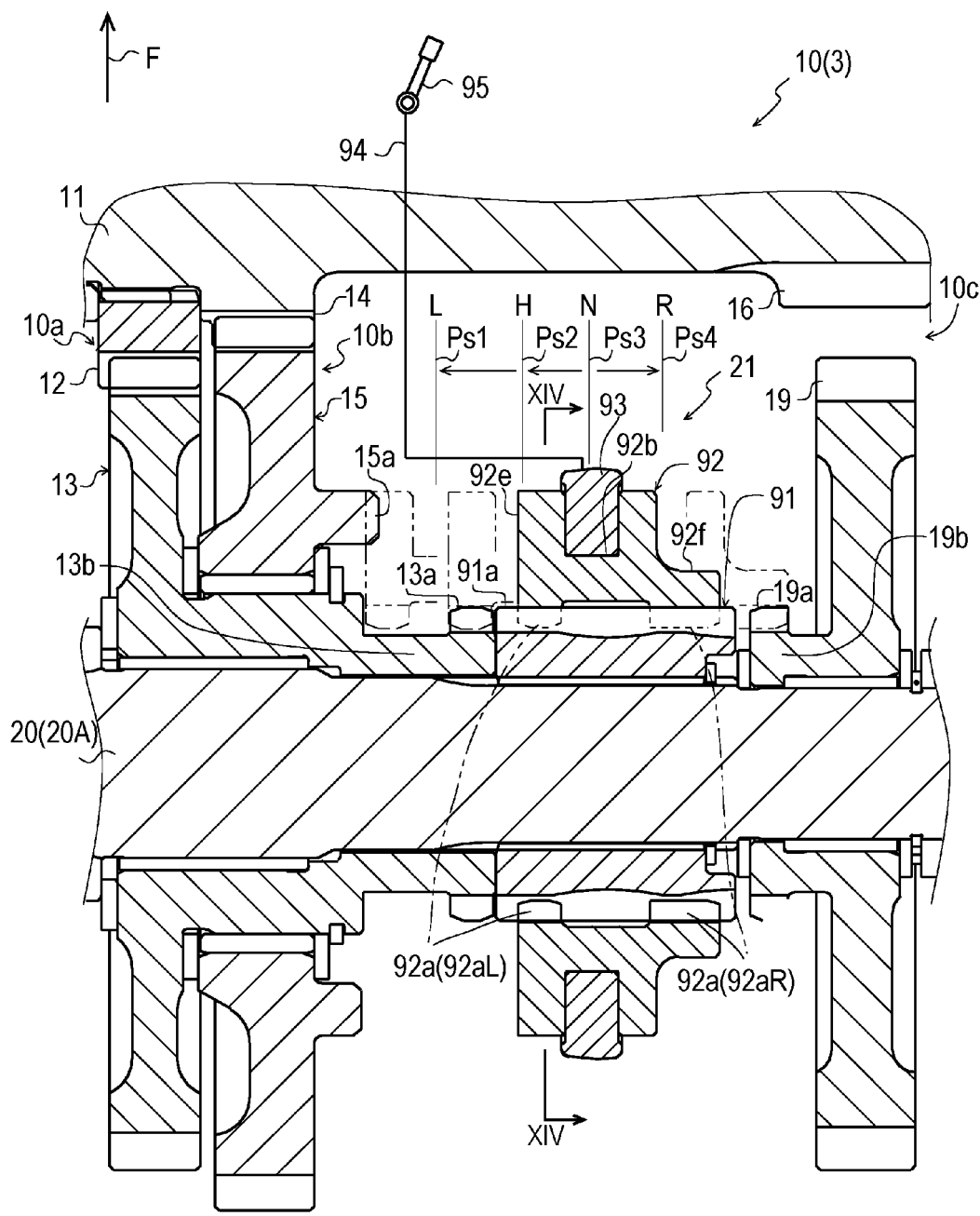
FIG. 13 is a sectional plan view of a principal portion of a gear transmission 10 in transaxle 3 showing a speed shifter 21.

Gearshift clutch 21 having a clutch guide system 90 will be described with reference to FIGS. 13 to 19. Referring to FIG. 13, gearshift clutch 21 includes clutch hub 91 and gearshift sleeve 92. Clutch hub 91 is fixed on transmission output shaft 20 or 20A (hereinafter, "transmission output shaft 20" is referred to as representative of transmission output shafts 20 and 20A) so as to be sandwiched between a right end of axial boss 13b of high speed forward driven gear 13 of high speed forward gear train 10a and a left end of axial boss 19b of reverse driven gear 19 of reverse gear train 10c. Clutch hub 91 is formed on an outer peripheral portion thereof with splines 91a. The right end of axial boss 13b of high speed forward driven gear 13 is formed with splines 13a that can continue leftward from respective splines 91a of clutch hub 91 when the rotational position of gear 13 coincides to that of clutch hub 91. The left end of axial boss 19b of reverse driven gear 19 is formed with splines 19a that can continue rightward from respective splines 91a of clutch hub 91 when the rotational position of gear 13 coincides to that of clutch hub 91.

Gearshift sleeve 92 is formed on right and left inner peripheral portions thereof with right and left splines 92aR and 92aL, respectively. Gearshift sleeve 92 is spline-fitted at the inner peripheral portion thereof onto the outer peripheral portion of clutch hub 91 axially slidably and unrotatably relative to clutch hub 91. In this regard, at least either right or left splines 92aR or 92aL of gearshift sleeve 92 mesh with splines 91a of clutch hub 91 regardless of slide of gearshift sleeve 92. A left end portion of gearshift sleeve 92 is formed with an engagement portion 92e that can mesh with pawls 15a formed on a right end of low speed forward driven gear 15.

Gearshift sleeve 92 is formed with an annular groove 92b into which a fork 93 is fitted. Fork 93 is operatively connected to a gearshift lever 95 via a link 94 that may be configured mechanically or electrically (see the description of link 80 or 85 shown in FIG. 3). Due to rotation of gearshift lever 95, gearshift sleeve 92 is shiftable among four positions, i.e., a low speed forward position Ps1, a high speed forward position Ps2, a neutral position Ps3, and a reverse position Ps4.

When gearshift sleeve 92 is disposed at neutral position Ps3, both right and left splines 92aR and 92aL mesh with splines 91a of clutch hub 91 and engagement portion 92e is separated from pawls 15a, so that all driven gears 13, 15 and 19 disengage from gearshift sleeve 92, whereby transmission output shaft 20 is isolated from the rotary power of transmission input shaft 11. This state is defined as a neutral state N of gear transmission 10.

When gearshift sleeve 92 slides rightward from neutral position Ps3 and is disposed at reverse position Ps4, left splines 92aL mesh with splines 91a, right splines 92aR mesh with splines 19a of reverse driven gear 19, and engagement portion 92e is separated from pawls 15a, thereby drivingly connecting transmission output shaft 20 to transmission input shaft 11 via reverse gear train 10c. This state is defined as a reverse driving state R of gear transmission 10.

On the other hand, when gearshift sleeve 92 slides leftward from neutral position Ps3 and is disposed at high speed forward position Ps2, right splines 92aR mesh with splines 91a, left splines 92aL mesh with splines 13a of high speed forward driven gear 13, and engagement portion 92e is separated from pawls 15a, thereby drivingly connecting transmission output shaft 20 to transmission input shaft 11 via high speed forward gear train 10a. This state is defined as a high speed forward driving state H of gear transmission 10.

When gearshift sleeve 92 slides leftward from high speed forward position Ps2 and is disposed at low speed forward position Ps1, right splines 92aR mesh with splines 91a, left splines 92aL are separated leftward from splines 13a of high speed forward driven gear 13, and engagement portion 92e meshes with pawls 15a of low speed forward driven gear 15, thereby drivingly connecting transmission output shaft 20 to transmission input shaft 11 via low speed forward gear train 10b. This state is defined as a low speed forward driving state L of gear transmission 10.

Figure 14:
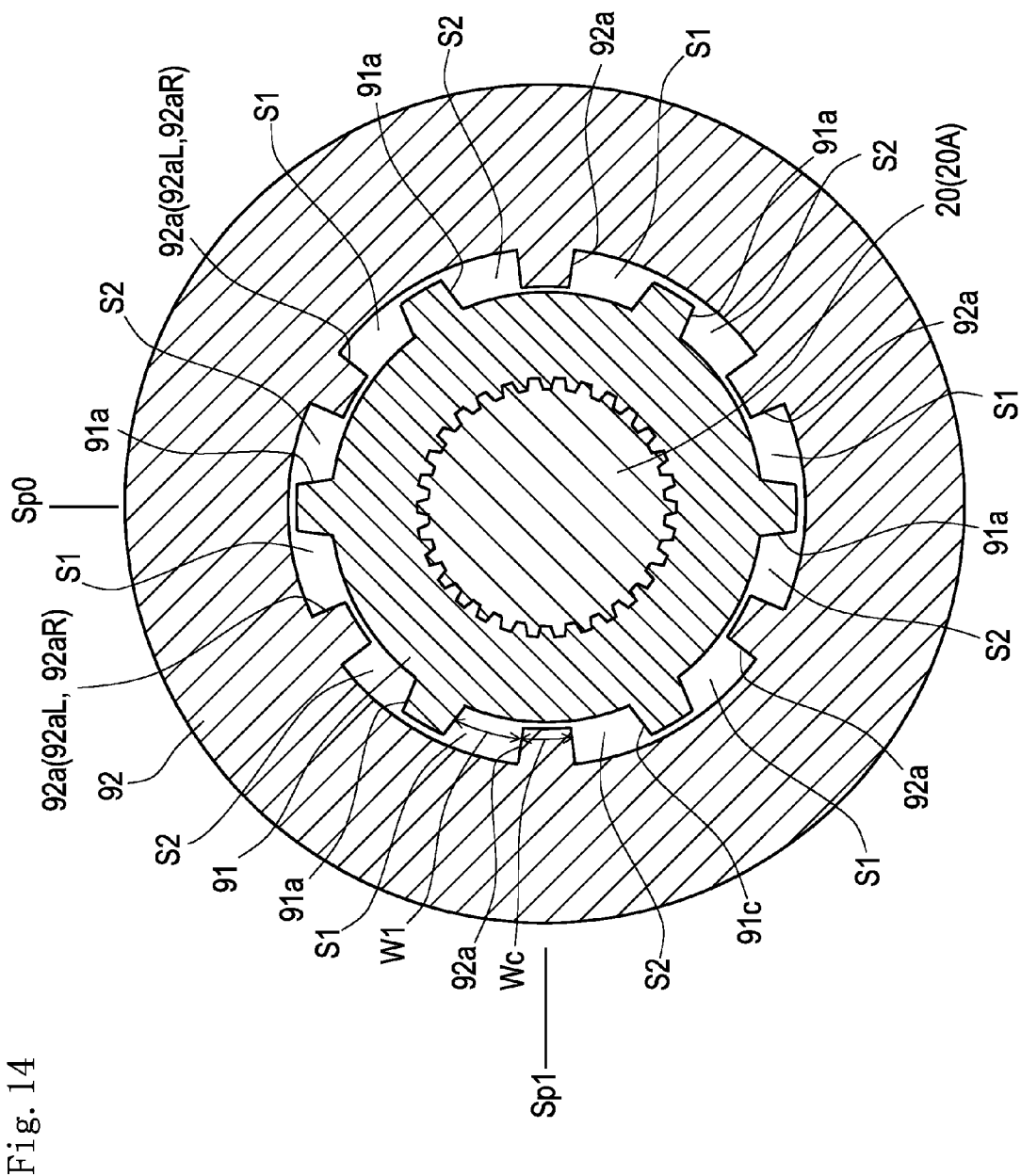
FIG. 14 is a cross sectional view of a transmission output shaft 20(20A) provided with speed shifter 21, taken along XIV-XIV line of FIG. 13.

A configuration to locate gearshift sleeve 92 relative to clutch hub 91 in the peripheral direction of transmission output shaft 20 will be described with reference to FIGS. 14 to 19. Referring to FIG. 14, each spline 92a of gearshift sleeve 92 has a width We in the peripheral direction thereof and is initially disposed at the exactly middle position between every adjoining splines 91a so as to have guide spaces S1 and S2 from adjoining splines 91a on opposite sides thereof in the peripheral direction of gearshift sleeve 92, so that guide spaces S1 and S2 have respective widths W1 and W2 in the peripheral direction of transmission output shaft 20 equal to each other, whereby gearshift sleeve 92 is allowed to rotate relative clutch hub 91 until splines 92a moving from the respective initial positions come to abut against adjoining splines 91a.

Figure 15:
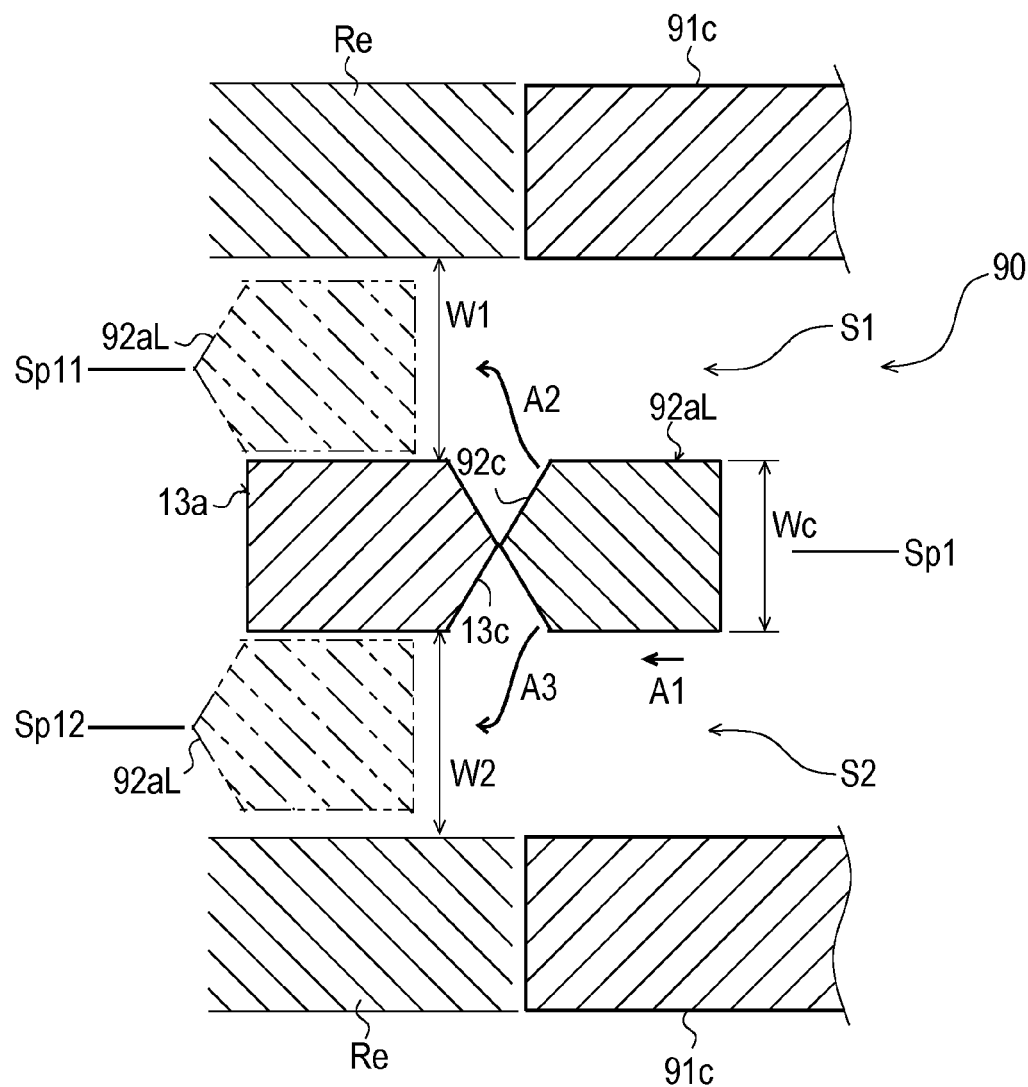
FIG. 15 is a schematic plan view of meshing of a spline of speed shifter 21 with a clutch guide system 90.

Referring to FIG. 15, left splines 92aL are formed at left end portions thereof with chamfers 92c, and correspondingly, right end portions of splines 13a are formed with chamfers 13c. Incidentally, right splines 92aR are formed at right end portions thereof with similar chamfers, and correspondingly, left end portions of splines 19a are formed with similar chamfers, although their illustration is omitted.

FIG. 15 illustrates phantom extension regions Re as defining leftward extended portions of respective splines 91a assumed to extend leftward from their real left ends. Extension regions Re are defined as regions which left splines 92aL can never enter because, even if gearshift sleeve 92 slides leftward to engage with high speed forward driven gear 13, right splines 92aR still mesh with splines 91a of clutch hub 91 so as to be hindered by adjoining splines 91a from moving further in the peripheral direction.

Each clutch tooth 13a has a width in the peripheral direction, which is substantially equal to width We of spline 92a (92aL or 92aR). When gearshift sleeve 92 is located at its initial position relative to clutch hub 91 in the peripheral direction, each spline 92aL is disposed at its initial position Sp1, where spline 92aL is disposed at the middle position between adjoining splines 91a, so that width W1 of guide space S1 between spline 92aL and one of adjoining splines 91a is equal to width W2 of guide space S2 between spline 92aL and the other of adjoining splines 91a.

For convenience of description about clutch guide system 90 of gearshift clutch 21 shown in FIG. 15, guide space S1 illustrated as being above spline 92aL at initial position Sp1 is referred to as "upper guide space S1", and the direction from spline 92aL to guide space S1 is defined as an "upward" direction. Guide space S2 illustrated as being below spline 92aL at initial position Sp1 is referred to as "lower guide space S2", and the direction from spline 92aL to guide space S2 is defined as a "downward" direction. One spline 91a and its extension region Re illustrated as being above upper guide space S1 are referred to as "upper spline 91a" and "upper extension region Re", and another spline 91a and its extension region Re illustrated as being below lower guide space S2 are referred to as "lower spline 91a" and "lower extension region Re".

At the start of leftward slide of gearshift sleeve 92 in a direction A1 to engage gearshift sleeve 92 with high speed forward driven gear 13, chamfer 92c of each left spline 92aL may abut against chamfer 13c of each spline 13a. Once chamfer 92c of spline 92aL slips slightly upward relative to chamfer 13c of spline 13a, chamfer 92c slides upward along chamfer 13c, so that spline 92aL slides upward against spline 13a in a direction A2, as spline 92aL moves leftward in direction A1. Finally, spline 92aL reaches an upward position Sp11 between spline 13a and upper extension region Re. Upper guide space S1 has sufficient width W1 to allow the upward slide of spline 92aL from initial position Sp1 to upward position Sp11.

On the other hand, once chamfer 92c of spline 92aL slips slightly downward relative to chamfer 13c of spline 13a, chamfer 92c slides downward along chamfer 13c, so that spline 92aL slides downward against spline 13a in a direction A3, as spline 92aL moves leftward in direction A1. Finally, spline 92aL reaches a downward position Sp12 between clutch tooth 13a and lower extension region Re. Lower guide space S2 has sufficient width W2 to allow the downward slide of spline 92aL from initial position Sp1 to downward position Sp12.

As mentioned above, clutch guide system 90 is defined as having three features: The first feature is the chamfers formed on the splines. In the above-mentioned embodiment, splines 92a of gearshift sleeve 92 are formed with chamfers 92c, and splines 13a of gear 13 with chamfers 13c. However, either splines 92a of gearshift sleeve 92 or splines 13a of gear 13 may be formed with chamfers, if the required effect can be obtained. Due to the splines provided with chamfers, splines 92a of gearshift sleeve 92 can be smoothly diverted from the direct axial slide direction of gearshift sleeve 92 so as to be guided along splines 13a of gear 13 to positions adjacent to respective splines 13a of gear 13, even if splines 92a of gearshift sleeve 92 abut against splines 13a of gear 13.

The second feature is the dimension of splines 92a of gearshift sleeve 92 relative to splines 91a of clutch hub 91 in the peripheral direction of transmission output shaft 20, such that each spline 92a of gearshift sleeve 92 having width We is comparative narrow to have a sufficient guide space S1 or S2 having a width W1 or W2 between spline 92a and spline 91a of clutch hub 91, into which each spline 13a of gear 13 can be guided.

The third feature is the arrangement of splines 92a of gearshift sleeve 92 relative to splines 91a of clutch hub 91 in the peripheral direction of transmission output shaft 20, such that each spline 92a of gearshift sleeve 92 dimensioned as mentioned above has sufficient guide spaces S1 and S2 on both opposite sides thereof between adjoining splines 91a of clutch hub 91. Therefore, splines 92a of gearshift sleeve 92 can divert in each of opposite directions relative to splines 13a of gear 13 in the peripheral direction so as to obtain the first and second features. The above-mentioned location of each spline 92a at the middle position between adjoining splines 91a is one of methods for ensuring sufficient guide spaces S1 and S2 on both opposite sides of each spline 92a.

Figure 16A:
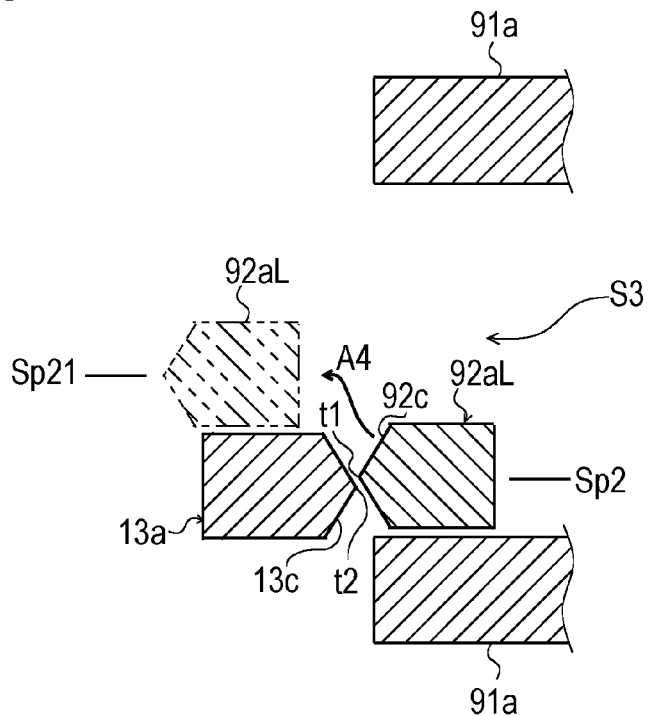
FIG. 16A is a schematic plan view of meshing of the spline of speed shifter 21 that does not be provided with clutch guide system 90.
Figure 16B:
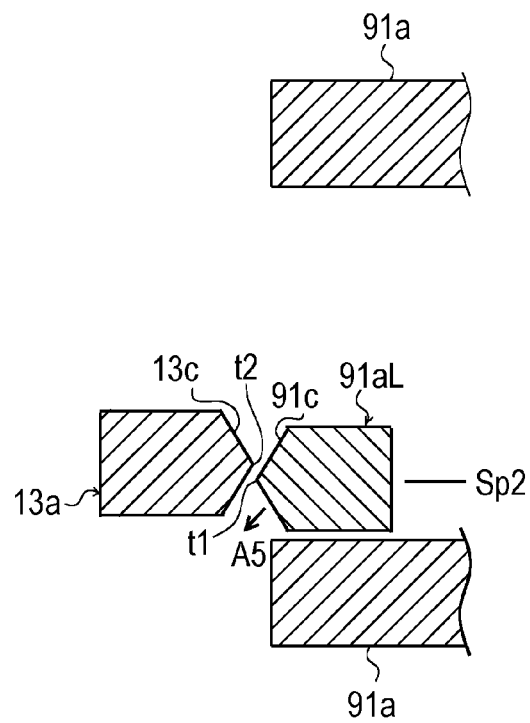
FIG. 16B is a schematic plan view of meshing of the spline of speed shifter 21 that does not be provided with clutch guide system 90.

To clarify the reason why gear guide system 90 should have the third feature, i.e., why initial position Sp1 of spline 92a should be at the middle position between adjoining upper and lower splines 91a so as to have upper and lower guide spaces S1 and S2 having equal widths W1 and W2, an eccentric arrangement of spline 92aL between adjoining upper and lower splines 91a as shown in FIGS. 16A and 16B will be described. In this case, an initial position Sp2 of spline 92aL is eccentric so as to be adjacent to lower spline 91a. Therefore, spline 92aL at initial position Sp3 and upper spline 91a have a large space S3 therebetween.

Referring to FIG. 16A, if the position of spline 13a of gear 13 in the peripheral direction is slightly lower than initial position Sp2 of spline 92aL, and once chamfer 92c of spline 92a of gearshift sleeve 92 abuts against chamfer 13c of spline 13a of gear 13 and slips at a tip t1 of spline 92a slightly upward relative to tip t2 of spline 13a, chamfer 92c slides upward along chamfer 13c according to the leftward slide of gearshift sleeve 92, so that spline 92aL slides upward against spline 13a in a direction A4. Finally, spline 92aL reaches a position Sp21 adjacently above spline 13a. In other words, such a downwardly eccentric initial position Sp2 of spline 92aL allows gearshift sleeve 92 to rotate upward relative to spline sleeve 91a so as to complete the meshing of left splines 92aL of gearshift sleeve 92 with splines 13a of gear 13.

On the contrary, referring to FIG. 16B, if the position of spline 13a in the peripheral direction is slightly higher than initial position Sp2 of spline 92aL, and even if chamfer 92c of spline 92 abuts against chamfer 13c of spline 13a and slips slightly downward relative to spline 13a in a direction A5, lower spline 91a hinders chamfer 92c from sliding further downward along chamfer 13c according to the leftward slide of gearshift sleeve 92. As a result, spline 92aL is unexpectedly held substantially at initial position Sp2, i.e., the slide lock of gearshift sleeve 92 occurs, so that gearshift sleeve 92 cannot slide to engage with gear 13.

As mentioned above, such an eccentric initial position of spline 55a between adjoining splines 91a may cause the slide lock of gearshift sleeve 92 depending on whether the chamfer of spline 13a or 19a slipping relative to chamfer 92c of spline 92a is directed to distant spline 91a as upper spline 91a shown in FIG. 16A or adjacent spline 91a as lower spline 91a shown in FIG. 16B. The initial location of spline 92a at middle position Sp1 between adjoining splines 91a is advantageous to prevent such unexpected slide lock of gearshift sleeve 92 regardless of the direction of slipping of the chamfer of spline 13a or 19a slipping relative to chamfer 92c of spline 92a.

Figure 17:
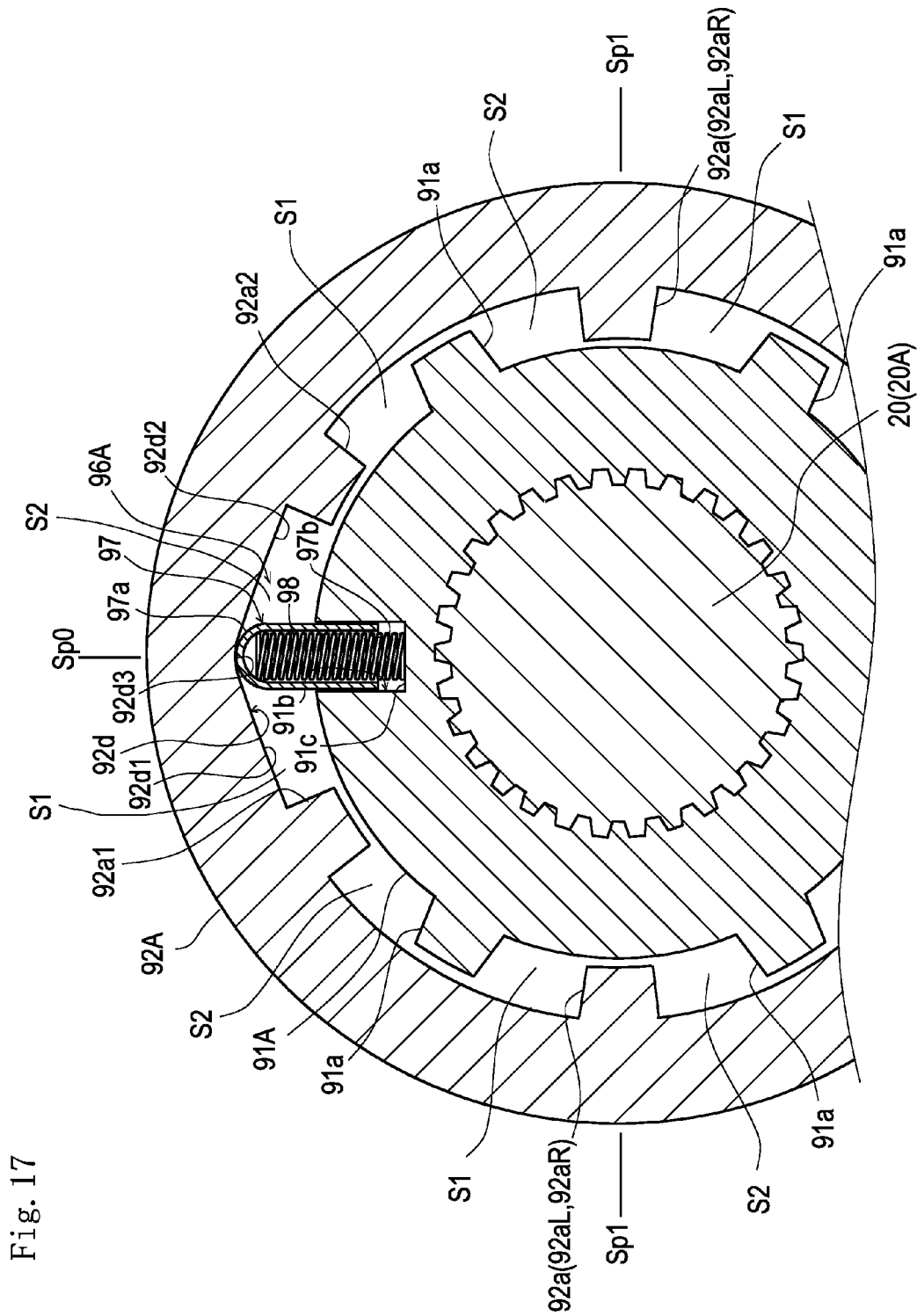
FIG. 17 is a sectional side view of PTO input shaft 25 provided with speed shifter 21 and a sleeve location device 96A.
Figure 18:
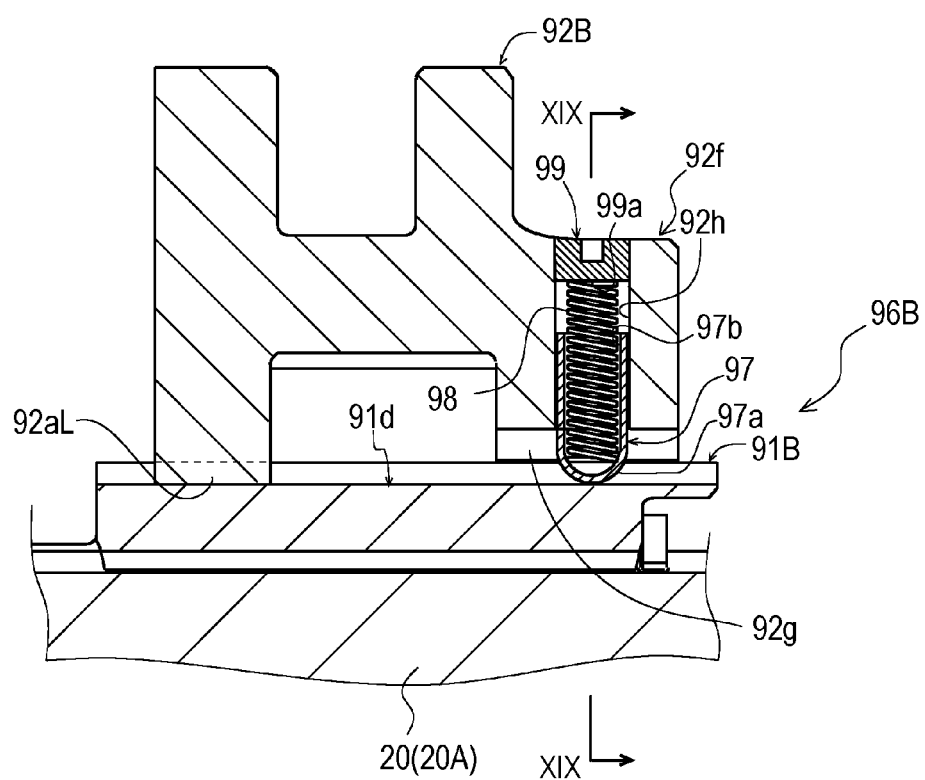
FIG. 18 is a sectional plan view of speed shifter 21 and a sleeve location device 96B.
Figure 19:
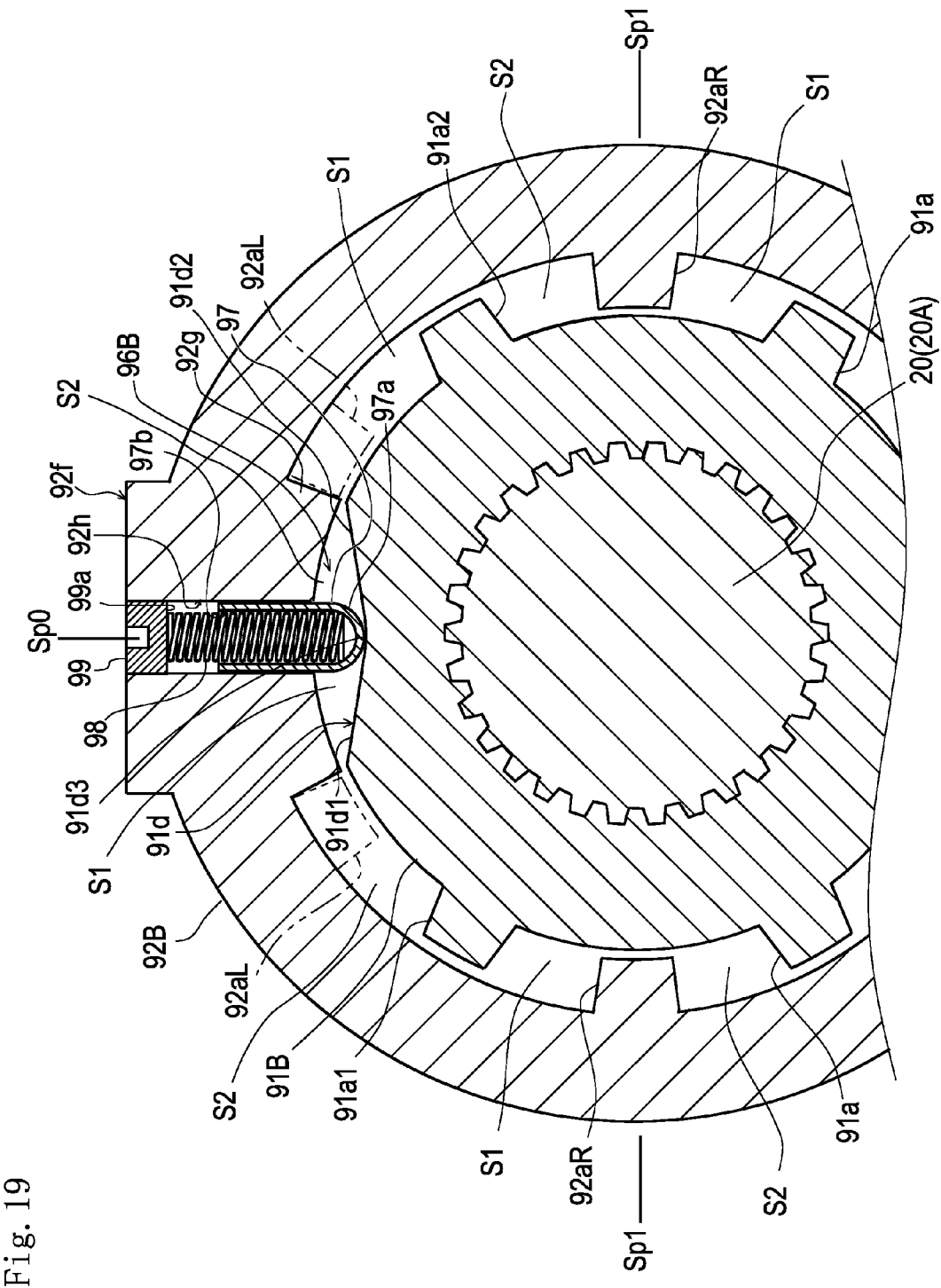
FIG. 19 is a sectional side view of PTO input shaft 25 provided with speed shifter 21 and sleeve location device 96B.

Spline location systems 96A and 96B for initially locating gearshift sleeve 92 relative to clutch hub 91 in the peripheral direction so as to locate each spline 92a at the middle position between every adjoining splines 91a will now be described with reference to FIGS. 17 to 19.

Spline location system 96A will be described with reference to FIG. 17. To constitute spline location system 96A, clutch hub 91 is formed with a radial recess 91b centripetally from the outer peripheral surface thereof at a position corresponding to one of splines 91a. In other words, when viewed in the axial direction of transmission output shaft 20, all splines 91a are aligned on the outer peripheral surface of clutch hub 91 with a constant pitch, however, one of splines 91a with the constant pitch is lost, and radial recess 91b is formed in clutch hub 91 to have its open end at the outer peripheral surface of clutch hub 91 so as to correspond to the lost spline 91a. In this way, splines 91a and radial recess 91b are aligned in the peripheral direction of clutch hub 91 at regular intervals. Recess 91b has an end surface 91c toward the axis of transmission output shaft 20.

Spline location system 96A includes detent pin 97 slidably fitted into radial recess 91b. Detent pin 97 is a sleeve having an open end 91b facing end surface 91c of radial hole 91b, and having a closed end facing an inner peripheral portion of gearshift sleeve 92. The closed end of detent pin 97 is a hemispheric head 97a that projects centrifugally from the outer peripheral surface of clutch hub 91 so as to replace the lost spline 91a. A coiled spring 98 is fitted at an end thereof into detent pin 97 via open end 97b, and abuts at the other end thereof against end surface 91c of radial hole 91b, so as to centrifugally bias detent pin 97. Therefore, in spline location system 96A, spring 98 serves as a biasing device that biases detent pin 97 toward the inner peripheral portion of gearshift sleeve 92, so that detent pin 97 serves as a pressure member pressed against the inner peripheral portion of gearshift sleeve 92.

When viewed in the axial direction of transmission output shaft 20, the inner peripheral surface of gearshift sleeve 92 among splines 92a is formed in a circular shape, except that an inner peripheral portion 92d of gearshift sleeve 92 between predetermined two adjoining splines 92a (hereinafter, splines 92a1 and 91a2) having head 97a of detent pin 97 therebetween is formed in a V-shape. More specifically, inner peripheral portion 92d of gearshift sleeve 92 is formed with a V-angled detent recess 92d3 at the middle position between splines 92a1 and 92a2. Inner peripheral portion 92d of gearshift sleeve 92 is formed with a guide surface 92d1 that is extended straight from angled detent recess 92d3 to spline 92a1 so as to define guide space S1 on one side of detent pin 97 in the peripheral direction. Inner peripheral portion 92d of gearshift sleeve 92 is also formed with a guide surface 92d2 that is extended straight from detent recess 92d3 to spline 92a2 so as to define guide space S2 on the other side of detent pin 97 in the peripheral direction.

Head 97a of detent pin 97 is initially located at a position Sp0 where head 97a of detent pin 97 is pressed onto detent recess 92d3 at the middle position between splines 92a1 and 92a2. This rotational angle of gearshift sleeve 92 relative to clutch hub 91, where head 97a of detent pin 97 contacts detent recess 92d3, is defined as an initial rotational angle Sp1 of gearshift sleeve 92 relative to clutch hub 91. Even if gearshift sleeve 92 rotates relative to clutch hub 91 so as to deviate from its initial rotational angle Sp1 relative to clutch hub 91 so that head 97a of detent pin 97 is pressed against either guide surface 92d1 or 92d2, gearshift sleeve 92 can return to initial rotational angle Sp1 relative to clutch hub 91 due to the centrifugal force of spring 98 biasing head 97a of detent pin 97 toward detent recess 92d3. Guide surface 92d1 or 92d2 functions to guide head 97a toward detent recess 92d3. Incidentally, this centrifugal force of spring 98 is enhanced by rotating transmission output shaft 20, so that the effect of spline location system 98A for biasing gearshift sleeve 92 to initial rotational angle Sp1 relative to clutch hub 91 is enhanced during traveling of the vehicle.

Spline location system 96B will be described with reference to FIGS. 18 and 19. In this regard, an outer peripheral portion of a right or left (in this embodiment, right) end boss portion of gearshift sleeve 92 is partly expanded tangently with respect to the axis of transmission output shaft 20 so as to form a support portion 92f having a through hole 92h extended in the radial direction of transmission output shaft 20. Through hole 92h has inner and outer open ends. A cap 99 is fitted into through hole 92h so as to close the outer open end of through hole 92h, so that through hole 92h closed at the outer open end by cap 99 serves as a recess having an open end at the inner peripheral portion of gearshift sleeve 92. Detent pin 97 is fitted into through hole 92h so as to have head 97a projecting toward clutch hub 91 via the inner open end of through hole 92h. Spring 98 is interposed between detent pin 97 and an inner end surface 99a of cap 99 in hole 97b so as to centripetally bias head 97a of detent pin 97 toward the axis of transmission output shaft 20. An inner peripheral portion 92g of gearshift sleeve 92 having hole 92h at the middle portion thereof in the peripheral direction is expanded centripetally toward the outer peripheral surface of clutch hub 91.

Since gearshift sleeve 92 is formed with support portion 92f and expanded inner peripheral portion 92d at the right end boss portion thereof, the open end of hole 92h are aligned with right splines 92aR of gearshift sleeve 92. When viewed in the axial direction of transmission output shaft 20, all right splines 92aR are aligned on the outer peripheral surface of clutch hub 91 with a constant pitch, however, two of right splines 92aR with the constant pitch are lost, and opposite ends of expanded inner peripheral portion 92g in the peripheral direction of transmission output shaft 20 are defined by two lost right splines 92aR or two corresponding left splines 92aL (as drawn in phantom lines in FIG. 19).

Therefore, detent pin 97 is disposed at the middle position between the lost two of right splines 92aR with the constant pitch.

When viewed in the axial direction of transmission output shaft 20, the outer peripheral surface of clutch hub 91 among splines 91a is formed in a circular shape, except that the outer peripheral portion of clutch hub 91 is partly scooped out to form a shallow V-shape recessed outer peripheral portion 91d. A deepest portion of recess 91d is curved or obtusely angled so as to serve as an angled detent recess 91d3. In the axial view, all splines 91a are aligned on the outer peripheral surface of clutch hub 91 with a constant pitch, however, one of splines 91a with the constant pitch is lost, and detent recess 91d3 is disposed at the position corresponding to the lost spline 91a. Therefore, two splines 91a1 and 91a2 having detent recess 91d3 therebetween are predetermined as neighboring the lost spline 91a corresponding to detent recess 91d3 on opposite sides of detent recess 91d3 in the peripheral direction of transmission output shaft 20, and these splines 91a1 and 91a2 have equal distances from detent recess 91d3, equaling the above-mentioned constant pitch of splines 91a. In other words, detent recess 91d3 is disposed at the middle position between adjoining splines 91a1 and 91a2 in the peripheral direction of transmission output shaft 20.

Shallow V-shape recessed outer peripheral portion 91d of clutch hub 91 has opposite ends in the peripheral direction of transmission output shaft 20 between detent recess 91d3 and one adjoining spline 91a1, and between detent recess 91d3 and the other adjoining spline 91a2, respectively. When head 97a of detent pin 97 is located at detent recess 91d3, the opposite ends of recessed outer peripheral portion 91d are located to correspond to the opposite ends of expanded inner peripheral portion 92g in the peripheral direction of transmission output shaft 20. One half of recessed outer peripheral portion 91d between detent recess 91d3 and one end of recessed outer peripheral portion 91d close to spline 91a1 is formed as a guide surface 91d1, and the other half of recessed outer peripheral portion 91d between detent recess 91d3 and the other end of recessed outer peripheral portion 91d close to spline 91a2 is formed as a guide surface 91d2. In other words, guide surfaces 91d1 and 91d2 are formed at the outer peripheral portion of clutch hub 91 between angled detent recess 91d3 and one predetermined spline 91a1, and between angled detent recess 91d3 and the other predetermined spline 91a2.

Head 97a of detent pin 97 is initially located at a position Sp0 where head 97a of detent pin 97 is pressed onto detent recess 91d3 at the middle position between adjoining splines 91a1 and 91a2. This rotational angle of gearshift sleeve 92 relative to clutch hub 91, where head 97a of detent pin 97 contacts detent recess 91d3, is defined as initial rotational angle Sp1 of gearshift sleeve 92 relative to clutch hub 91. Even if gearshift sleeve 92 rotates relative to clutch hub 91 so as to deviate from initial rotational angle Sp1 relative to clutch hub 91 so that head 97a of detent pin 97 is pressed against guide surface 91d1 or 91d2, gearshift sleeve 92 can return to initial rotational angle Sp1 relative to clutch hub 91 due to the centripetal force of spring 98 biasing head 97a of detent pin 97 toward detent recess 91d3. Guide surface 91d1 or 91d2 functions to guide head 97a toward detent recess 91d3.

In comparison with spline location system 96A, spline location system 96B is advantageous for maintenance of detent pin 97 and spring 98 because detent pin 97 and spring 98 can easily accessed only by removing cap 99 outward from through hole 92h in gearshift sleeve 92 disposed outside of clutch hub 91.

An alternative four-wheel drive vehicle 100 equipped with an alternative transmission system will be described with reference to FIGS. 20 to 29. Vehicle 100 is equipped with a power unit 101 that is an assembly including an engine 102, a belt-type continuously variable transmission (hereinafter, referred to as "CVT") 103 serving as a main speed-changing transmission, and a gear transmission 104 serving as a sub speed-changing transmission and a reverser, i.e., a device for selecting either forward or backward traveling direction of vehicle 100.

A rear transaxle 105 for driving right and left rear wheels 106 is supported at a rear portion of vehicle 100. A front transaxle 107 for driving right and left front wheels 108 is supported at a rear portion of vehicle 100. An output power of power unit 101 is distributed between rear and front transaxles 105 and 107 so as to drive four wheels, i.e., rear wheels 206 and front wheels 108. Each rear wheel 106 is provided with a brake 106b, and each front wheel 108 is provided with a brake 108b.

Referring to FIG. 20, power unit 101 will be described in detail. Power unit 101 includes a transmission casing 110. A front portion of transmission casing 110 is formed as a CVT housing 110a of CVT 103, and a rear portion of transmission casing 110 is formed as a gear transmission housing 110b of gear transmission 104. Gear transmission housing 110b is disposed rightward or leftward (in this embodiment, leftward) from engine 102. A right portion of CVT housing 103 is extended rightward in front of engine 102. A fore-and-aft horizontal engine output shaft 111 is extended forward from engine 102 into the right portion of CVT housing 110a. The portion of engine output shaft 111 in the right portion of CVT housing 110a serves as a drive pulley shaft having a drive pulley 112 thereon.

Gear transmission 104 includes four fore-and-aft horizontal rotary shafts, i.e., a transmission input shaft 115, a transmission counter shaft 116, an idle shaft 117, a reduction shaft 118, and a transmission output shaft 119. These rotary shafts 115, 116, 117, 118, and 119 are extended parallel to one another, and are journalled in gear transmission casing 110b. Transmission input shaft 115 is extended forward from gear transmission housing 110a into a left portion of CVT housing 110a. The portion of transmission input shaft 115 in the left portion of CVT housing 110a serves as a driven pulley shaft having a driven pulley 114 thereon. A belt 113 is looped over drive pulley 112 and driven pulley 114, thereby constituting belt-type CVT 103.

In gear transmission housing 110b, gear transmission 104 includes a high speed forward gear train 120, a low speed forward gear train 121, and a reverse gear train 122, which are interposed parallel to each other between transmission input shaft 115 and transmission counter shaft 116. Gear trains 120, 121 and 122 have respective drive gears fixed on transmission input shaft 115, and respective driven gears provided on transmission output shaft 116 rotatably relative to transmission output shaft 116. More specifically, the driven gear of low speed forward gear train 121 is fitted on an axial boss portion of the driven gear of high speed forward gear train 120 so as to be rotatable relative to the driven gear of high speed forward gear train 120. The drive gears of forward gear trains 120 and 121 directly mesh with the respective driven gears, and the drive gear of reverse gear train 122 meshes with the corresponding driven gear via an idle gear on idle shaft 117.

A shifter 123 is provided on transmission counter shaft 116 so as to selectively engage with one of the driven gears to transmit power from transmission input shaft 115 to transmission counter shaft 116 via selected one of gear trains 120, 121 and 122. Shifter 123 may be a clutch shifter like gearshift clutch 21, or a synchromesh shifter.

Alternatively, shifter 123 may be provided on transmission input shaft 115, drive gears of gear trains 120, 121 and 122 may be provided on transmission input shaft 115 rotatably relative to transmission input shaft 115, and driven gears of gear trains 120, 121 and 122 may be fixed on transmission counter shaft 118.

A reduction gear train 124 is interposed between transmission counter shaft 116 and transmission output shaft 119 via reduction shaft 118. More specifically, reduction gear train 124 includes four gears, i.e., a diametrically small gear fixed on transmission counter shaft 116, a diametrically large gear fixed on reduction shaft 118, a diametrically small gear fixed on reduction gear 118, and a diametrically large gear fixed on transmission output shaft 119. The diametrically small gear on transmission counter shaft 116 directly meshes with the diametrically large gear on reduction shaft 118, and the diametrically large gear on reduction shaft 118 directly meshes with diametrically large gear on transmission output shaft 119.

Rear transaxle 105 includes a rear transaxle casing 105*a*, an input shaft 128, a bevel pinion 129, a bevel bull gear 130, and an output shaft 130. Rear transaxle casing 105*a* journals fore-and-aft horizontal input shaft 128 and laterally horizontal output shaft 131 therein. In rear transaxle casing 105*a*, bevel pinion 129 is fixed (or formed) on a rear end of input shaft 128, and bevel bull gear 130 is fixed on a laterally intermediate portion of output shaft 131. Right and left end portions of output shaft 131 project rightward and leftward from rear transaxle casing 105*a*, and are drivingly connected to axles 106*a* of right and left rear wheels 106 via respective proximal universal joints 132, propeller shafts 133 and distal universal joints 134.

A connection shaft housing 110*c* is interposed between a rear end of gear transmission housing 110*b* and a front end of rear transaxle casing 105*a*. Transmission output shaft 119 of gear transmission 104 of power unit 101 is extended rearward from the rear end of gear transmission housing 110*b* so as to have its rear end in shaft housing 110*c*. Input shaft 128 of rear transaxle 105 is extended forward from the front end of rear transaxle casing 105*a* so as to have its front end in shaft housing 110*c*. In shaft housing 110*c*, a fore-and-aft horizontal connection shaft 126 is coaxially extended between transmission output shaft 119 and input shaft 128. Connection shaft 126 is connected at front and rear ends thereof to the rear end of transmission output shaft 119 and the front end of input shaft 128 via respective couplings 125 and 127, e.g., spline sleeves.

Transmission output shaft 119 of gear transmission 104 is extended forward from gear transmission housing 110*b* and is passed through CVT housing 110*a* so as to have its front end forward from a front end of CVT housing 110*a*. A propeller shaft 136 is drivingly connected at a rear end thereof to the front end of transmission output shaft 119 via a universal joint 135, and at a front end thereof to a rear end of a later-discussed input shaft 138 (more specifically, a later-discussed clutch input shaft 138*a*) via a universal joint 137.

Front transaxle 107 includes a front transaxle casing 107*a*. Front transaxle casing 107*a* incorporates a differential unit 143, and journals right and left differential output shafts 145 of differential unit 143. Differential unit 143 includes a bevel input gear 144 meshing with a bevel pinion 142 fixed (or formed) on a front end of input shaft 138 (more specifically, a later-discussed clutch output shaft 138*b*), so that differential unit 143 distributes the rotary power bevel input gear 144 driven by input shaft 138 between right and left differential output shafts 145.

Right and left differential output shafts 145 project rightward and leftward from front transaxle casing 107*a*, and are drivingly connected to axles 108*a* of right and left front wheels 108 via respective proximal universal joints 146, propeller shafts 147 and distal universal joints 148. Differential unit 143 is a limited slip differential unit that limits a differential rotatability of right and left differential output shafts 145. Therefore, if one of right and left front wheels 108 is going to be stuck, differential unit 143 distributes a part of driving torque of the other front wheel 108 to front wheel 108 being stuck, thereby preventing vehicle 100 from being stuck.

Front transaxle 107 is provided with a clutch unit 139 including a drive mode selection clutch 140 and a parking brake 141. Clutch unit 139 will now be described with reference to FIGS. 21 to 25. Clutch unit 139 includes a clutch unit casing 139*a*. Clutch unit casing 139*a* includes a main housing 139*b*, a clutch operation system housing 139*c*, and a brake operation system housing 139*d*. Clutch operation system housing 139*c* is joined to an upper front portion of main housing 139*b*, and brake operation system housing 139*d* is joined to a lower front portion of main housing 139*b*, so that housings 139*b*, 139*c* and 139*d* are joined together to constitute clutch unit casing 139*a*.

Main housing 139*b* is formed at a front end thereof with a flange. This flange is fastened to a rear end of front transaxle casing 107*a* via bolts 179 so that clutch unit casing 139*a* is extended rearward from front transaxle casing 107*a*. Main housing 139*b* journals input shaft 138. Input shaft 138 includes rear clutch input shaft 138*a* and front clutch output shaft 138*b* extended coaxially to each other. The rear end portion of clutch input shaft 138*a* projects rearward from a rear end of main housing 139*b* of clutch unit casing 139*a* so as to be drivingly connected to transmission output shaft 119 of power unit 101 via propeller shaft 136 with universal joints 135 and 137 as mentioned above. The front end portion of clutch output shaft 138*b* projects forward from the front end of main housing 139*b* into front transaxle casing 107*a* so that bevel pinion 142 on the front end of clutch output shaft 138*b* meshes with bevel bull gear 144 of differential unit 143.

Figure 23:
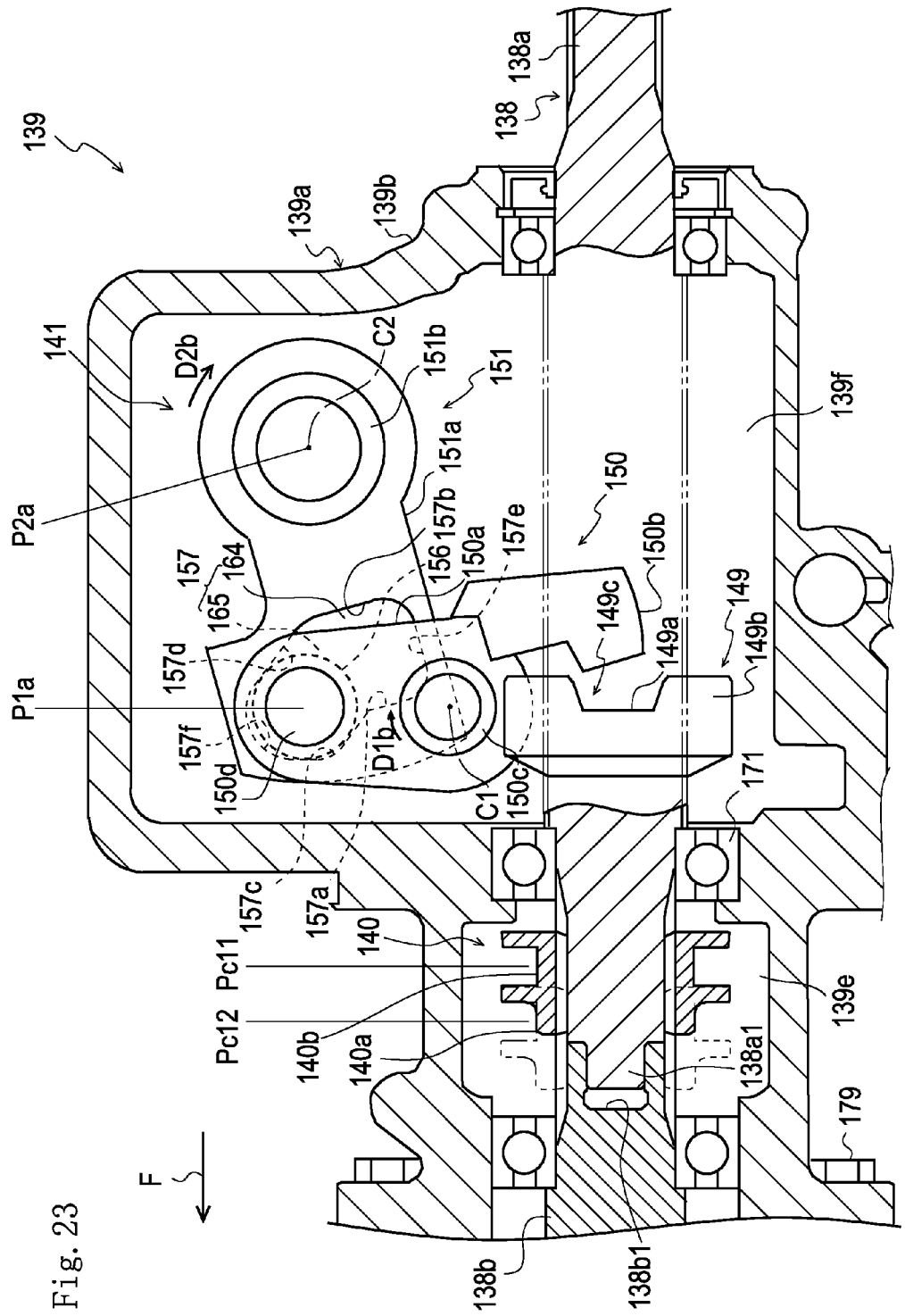
FIG. 23 is a bottom sectional view of a principal portion of clutch unit 139 showing a parking brake 141 set in an unbraking state.

Referring to FIG. 23, the inside space of main housing 139*b* is divided into a front clutch chamber 139*e* incorporating drive mode selection clutch 140 and a rear brake chamber 139*f* incorporating parking brake 141. In clutch chamber 139*e*, a projection 138*a*1 formed on a front end of clutch input shaft 138*a* is fitted into a recess 138*b*1 formed in a rear end portion of clutch output shaft 138*b* so that the front end portion of clutch input shaft 138*a* and the rear end portion of clutch output shaft 138*b* are joined to each other so as to allow clutch input and output shafts 138*a* and 138*b* to rotate relative to each other.

In clutch chamber 139*e*, the front end portion of clutch input shaft 138*a* and the rear end portion of clutch output shaft 138*b* are formed on outer peripheral surfaces thereof with splines, and a clutch sleeve 140*a* is formed on an inner peripheral surface thereof with splines. Clutch sleeve 140*a* is constantly spline-fitted on the front end portion of clutch input shaft 138*a* so as to be axially slidable along clutch input shaft 138*a* between a clutch-off position Pc12 and a clutch-on position Pc12.

When clutch sleeve 138a is disposed at clutch-off position Pc11, a front end portion of clutch sleeve 140a is disposed on the front end portion of clutch input shaft 138a so as to be separated from the rear end portion of clutch output shaft 138b, thereby keeping clutch output shaft 138b free from a rotary power of clutch input shaft 138a. Therefore, the output power of power unit 101 is transmitted to rear wheels 106 but is not transmitted to front wheels 108, so that vehicle 100 travels in 2WD mode. When clutch sleeve 138a slides forward from clutch off position 301 and is disposed at clutch-on position Pc12, the front end portion of clutch sleeve 138a is also spline-fitted onto the rear end portion of clutch output shaft 138b so as to rotatably integrate clutch output shaft 138b with clutch input shaft 138a. Therefore, the output power of power unit 101 is distributed to all four wheels 106 and 108 so that vehicle 100 travels in 4WD mode.

Figure 21:
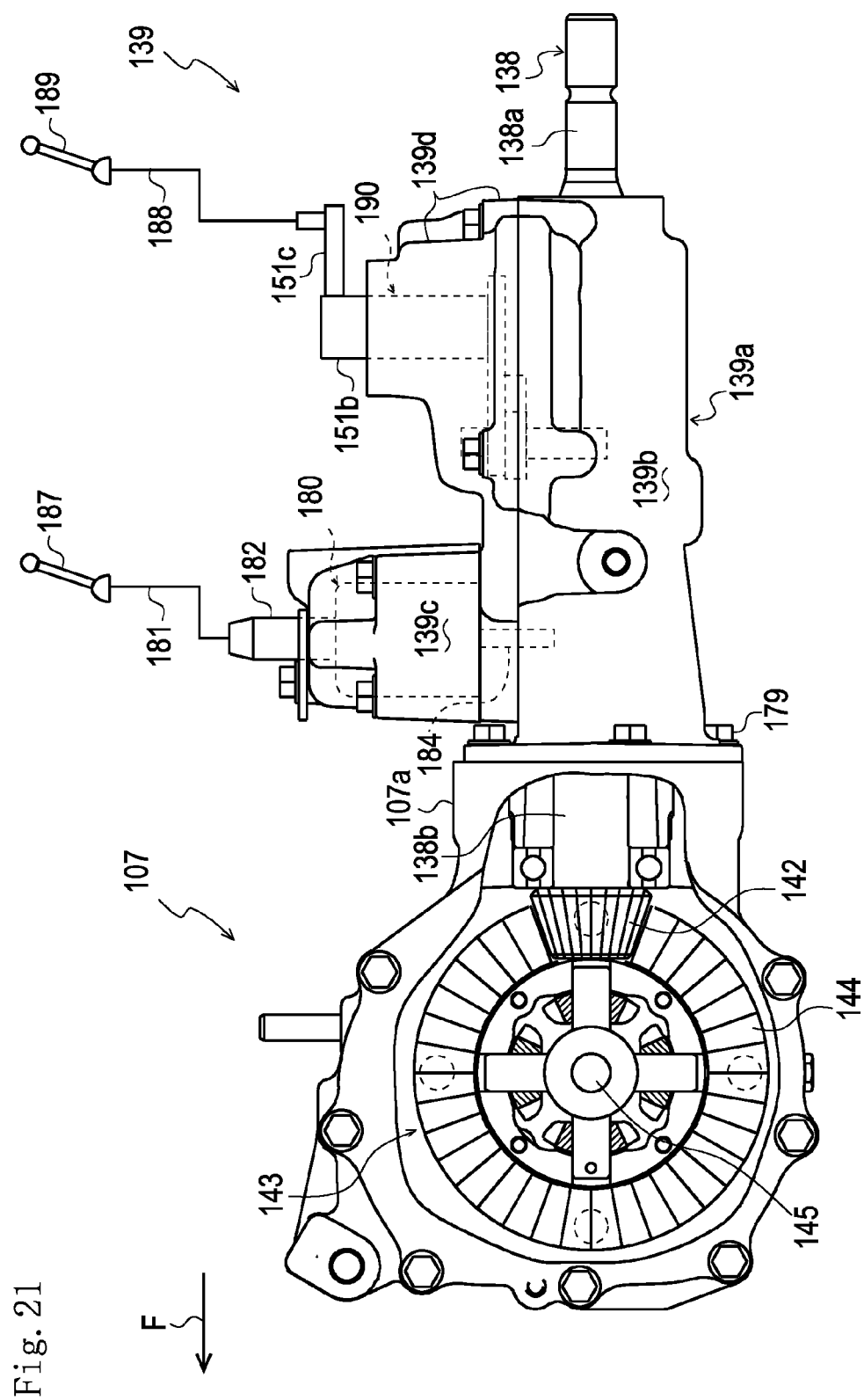
FIG. 21 is a side view partly in section of a front transaxle 107 with a clutch unit 139 for vehicle 100.
Figure 22B:
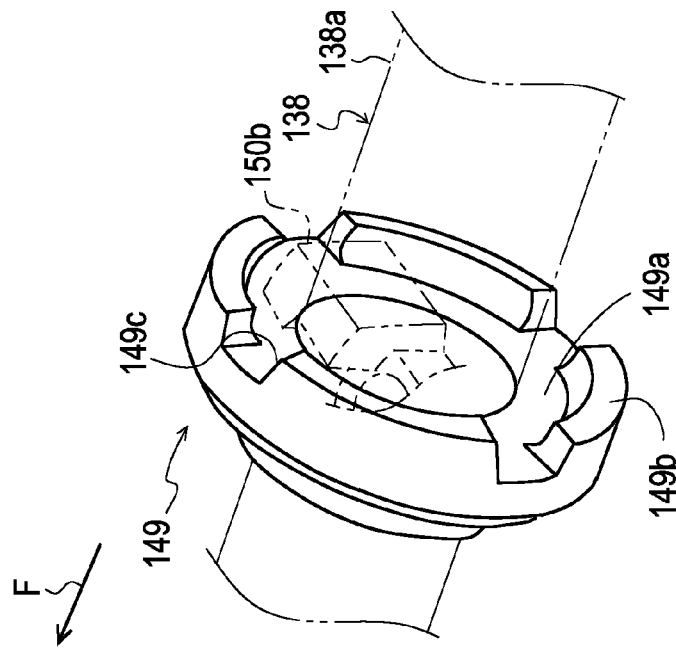
FIG. 22B is a perspective view of a brake flange 149.
Figure 22A:
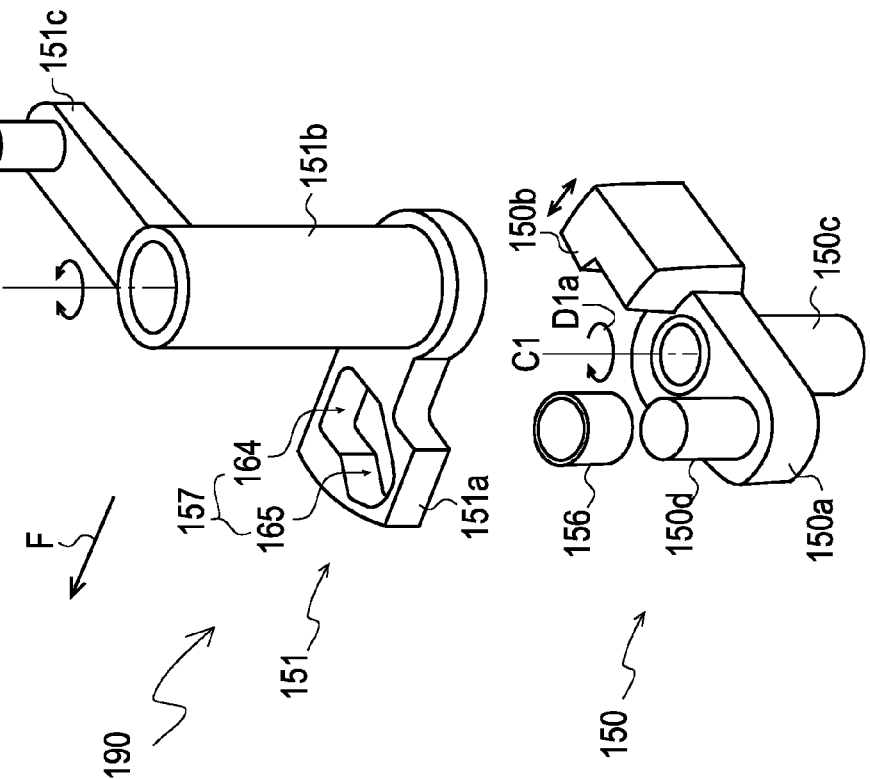
FIG. 22A is a perspective view of a brake operation system 190.

Referring to FIGS. 21 and 22, a clutch operation system 180 is disposed in clutch operation system housing 139c. Clutch operation system 180 includes a vertical clutch operation shaft 182, which is journalled by clutch operation system housing 139c and projects upward from a top of clutch operation system housing 139c. Vehicle 100 is equipped with a drive mode selection lever 187 serving as a manipulator for selecting either the 2WD or 4WD mode for traveling of vehicle 100. Drive mode selection lever 187 is operatively connected to clutch operation shaft 182 via a link 181 outside of clutch unit casing 139a. Link 181 may have any configuration. It may be a mechanical link, e.g., a wire and/or a rod, or an electric link, e.g., an electric actuator or combination of an electric actuator and gears.

In clutch unit casing 138, clutch operation system 180 includes a vertical clutch sleeve operation shaft 184 interlocking with clutch operation shaft 182 via an arm or the like. A bottom end of clutch sleeve operation shaft 184 is fitted into an annular groove 140b formed on clutch sleeve 140a. By operating drive mode selection lever 187, clutch operation shaft 182 rotates centered on its own vertical axis, so that clutch sleeve operation shaft 184 revolves centered on the vertical axis of clutch operation shaft 182. During the revolution of clutch sleeve operation shaft 184, clutch sleeve operation shaft 184 moves in the fore-and-aft direction so as to push clutch sleeve 140a forward or rearward between clutch-off position Pc11 and clutch-on position Pc12.

Referring to FIGS. 21 to 25, in brake chamber 139f, parking brake 141 is configured so as to brake clutch input shaft 138a. Parking brake 141 provided in clutch unit 139 attached to front transaxle 107 in vehicle 100 is configured to has such a compact cam mechanism (a later-discussed brake operation system 190) to solve the problem stated regarding the background art disclosed by JP 2004-082926 A.

Parking brake 141 includes a flange member 149, a brake arm member 150, and a cam arm member 151. In this regard, clutch input shaft 138a is formed on an outer peripheral surface thereof with splines in brake chamber 139f. Flange member 149, which is spline-fitted on clutch input shaft 138a axially slidably and unrotatably relative to clutch input shaft 138a. Flange member 149 is formed at a rear end thereof with a vertical surface 149a from which outer peripheral edges serving as pawls 149b are extended rearward. Pawls 149b are aligned in the peripheral direction of clutch input shaft 138a, preferably, at regular intervals (in this embodiment, four pawls 149b are formed to have four notches 149b at 90 degrees' intervals) when viewed in the axial direction of clutch input shaft 138a, so as to have notches 149c thereamong. In this regard, bottoms of notches 149b among pawls 149b are defined by vertical surface 149a of flange member 149.

Figure 24:
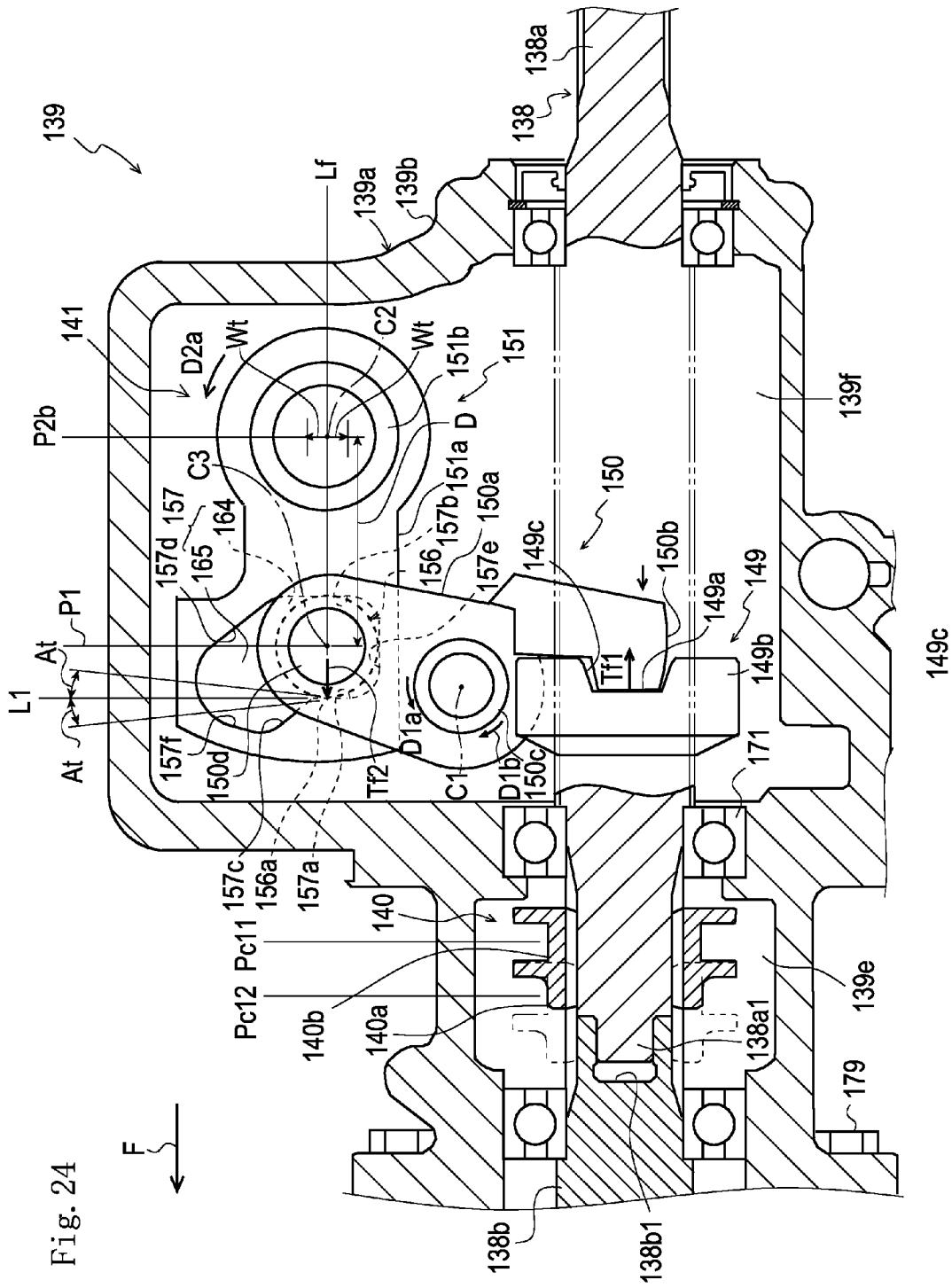
FIG. 24 is a bottom sectional view of the principal portion of clutch unit 139 showing parking brake 141 set in a braking state.
Figure 25:
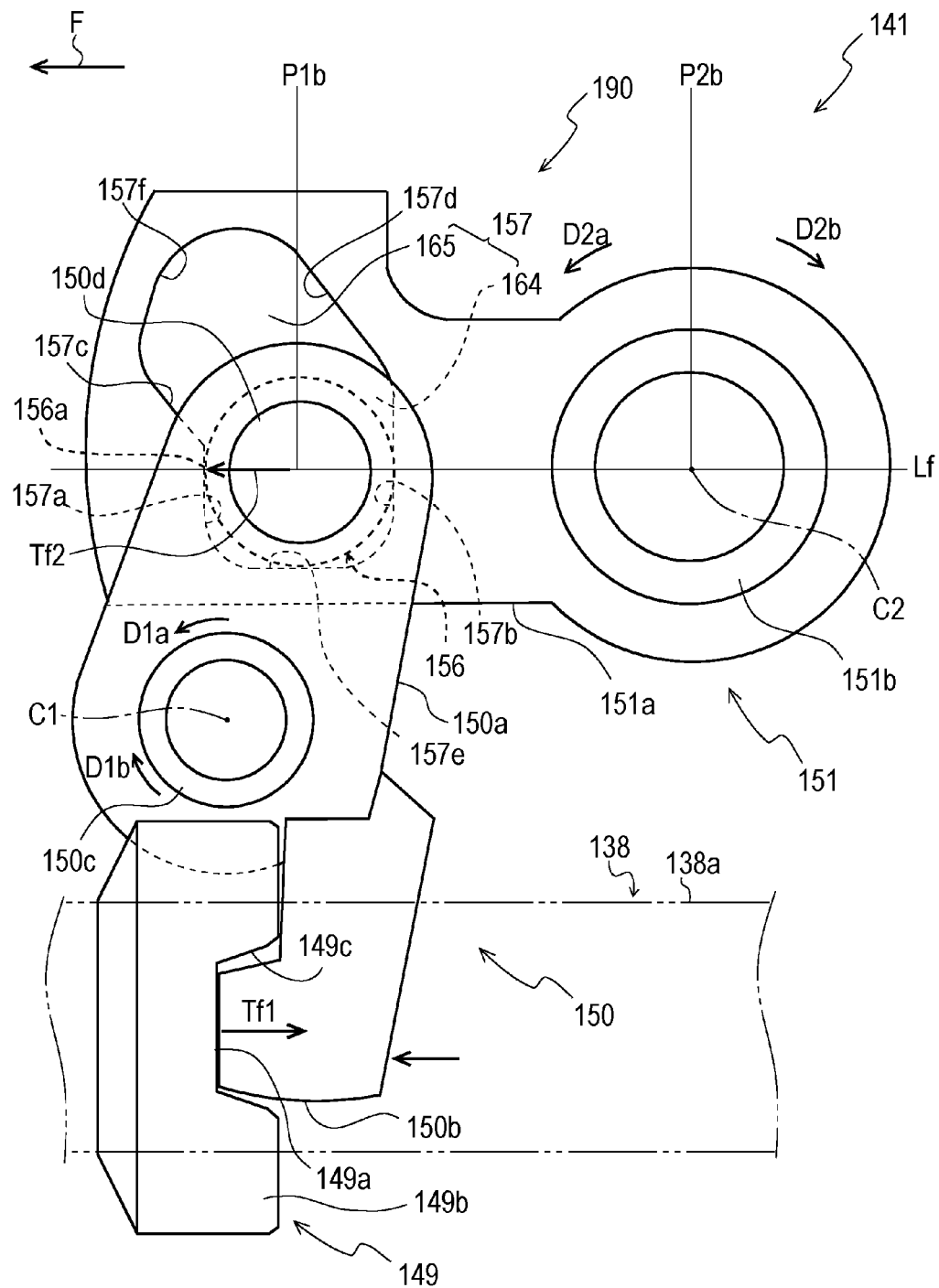
FIG. 25 is a bottom view of parking brake 141 set in the braking state.

Brake arm member 150 and cam arm member 151 will be described on the assumption that brake arm member 150 and cam arm member 151 are disposed leftward from cam input shaft 138a in brake chamber 139f as shown in FIGS. 23 to 25. Brake arm member 150 is integrally formed to include a horizontal plate-shaped arm 150a, a pawl 150b extended leftward from a right end portion of arm 150a, a boss 150c open at the right end portion of arm 150a and extended vertically downward from the right end portion of arm 150a, and a vertical cam pin 150d projecting upward from a left end portion of arm portion 150a. Cam arm member 151 is integrally formed to include a horizontal plate-shaped cam arm 151a, a boss 151b open at a rear end portion of cam arm 151a and extended upward from a rear end portion of cam arm 151a, and an arm 151c extended horizontally from an upper portion of boss 151b. Cam arm 151a is formed in a front end portion thereof with a cam hole 157 including a locking area 164 and an unlocking area 165. Locking area 164 and unlocking area 165 are angled from each other, and joined to each other so as to form cam hole 157 in a V-shape.

In brake chamber 139f, cam arm member 151 is disposed rearward from arm 150a of brake arm member 150. Vertical cam pin 150d of brake arm member 150 is provided on the outer peripheral surface thereof with a collar 156 and is inserted with collar 156 upward into cam hole 157 of arm 151a. Vertical pivot shafts (not shown) are provided in brake chamber 139f and are passed through respective bosses 150c and 151b, so that brake arm member 150 is rotatable centered on a vertical axis C1 of the pivot shaft passed through boss 150c, and cam arm member 151 is rotatable centered on a vertical axis C2 of the pivot shaft passed through boss 151b. In this way, brake arm member 150 and cam arm member 151 are assembled together to constitute brake operation system 190 shown in FIG. 21.

Referring to FIG. 21, the upper portion of boss 151b of cam arm member 151 formed with arm 151c projects upward from a top of brake operation system housing 139d. Vehicle 100 is equipped with a parking brake lever 189 serving as a manipulator for selecting either an unbraking or braking state of parking brake 141. Parking brake lever 189 is operatively connected to arm 151c via a link 188 outside of clutch unit casing 139. Link 188 may have any configuration. It may be a mechanical link, e.g., a wire and/or a rod, or an electric link, e.g., an electric actuator or combination of an electric actuator and gears.

According to rotational operation of parking brake lever 189, cam arm member 151 rotates centered on vertical axis C2. Accordingly, cam arm 151a of cam arm member 151 rotates to function as a cam to cam pin 150d of brake arm member 150 in cam hole 157 of cam arm 151a, so that cam pin 150d is switched between locking area 164 and unlocking area 165 of cam hole 157, thereby rotating brake arm member 150 centered on vertical axis C1 so as to switch pawl 150b between a braking position and unbraking position.

Referring to FIG. 23, pawl 150b set at the unbraking position is disposed away from notch 149c so as to disengage from flange member 149, thereby allowing rotation of clutch input shaft 138a driven by the output power of transmission output shaft 119 of power unit 101. In this state, if clutch sleeve 140a is set at clutch-on position Pc12, the rotation of clutch input shaft 138a is transmitted to front wheels 108 via clutch output shaft 138b and differential unit 143.

On the other hand, referring to FIG. 24, pawl 150b set at the braking position is fitted into notch 149c so as to engage with pawls 150b of flange member 149, thereby braking clutch input shaft 138a. The braking force applied onto clutch input shaft 138a is transmitted to transmission output shaft 119 of power unit 101, thereby braking rear wheels 106. In this state, if clutch sleeve 140a is set at clutch-on position Pc12, the braking force applied onto clutch input shaft 138a is transmitted to clutch output shaft 138b and differential unit 143, thereby braking front wheels 108.

The cam function of brake operation system 190 to switch pawl 150b of brake arm member 150 between the braking position and the unbraking position will be described in detail with reference to FIGS. 23, 24 and 25. In this regard, it should be noticed that FIGS. 23, 24 and 25 are bottom views so that the illustrated right-and-left direction of brake operation system 190 is opposite the actual right-and-left direction thereof. This thing is adapted to description of alternative embodiments with reference to FIG. 27.

The location of pawl 150b at the unlocking position depends on the rotation of brake arm member 150 in an unbraking direction D1a centered on axis C1. The rotation of brake arm member 150 in unbraking direction D1a is caused by shifting cam pin 150d with collar 156 thereon from a braking position P1b in braking area 164 of cam hole 157 to an unbraking position P1a in unbraking area 165 of cam hole 157. The shift of cam pin 150d from braking position P1b to unbraking position P1a is caused by rotating cam arm member 151 in an unbraking direction D2a from a braking rotational position P2b to an unbraking rotational angle P2a.

On the other hand, the location of pawl 150b at the locking position depends on the rotation of brake arm member 150 in a braking direction D1b centered on axis C1. The rotation of brake arm member 150 in braking direction D1b is caused by shifting cam pin 150d from unbraking position P1a in unbraking area 165 to braking position P1b in braking area 164. The shift of cam pin 150d from unbraking position P1a to braking position P1b is caused by rotating cam arm member 151 in a braking direction D2b from unbraking rotational angle P2a to braking rotational angle P2b.

Cam arm 151a of cam arm member 151 is formed with a right front edge 157a, a right rear edge 157b, and a right end edge 157e connecting a right end of right front edge 157a to a right end of right rear edge 157b, so that right front edge 157a, right rear edge 157b and right end edge 157e define braking area 164 as a right area of cam hole 157. On the other hand, cam arm 151a of cam arm member 151 is formed with a left front edge 157c, a left rear edge 157d, and a left end edge 157f connecting a left end of left front edge 157c to a left end of left rear edge 157d, so that left front edge 157c, left rear edge 157d and left end edge 157f define unbraking area 165 as a left area of cam hole 157.

When cam arm member 151 is disposed at braking rotational angle P2b and cam pin 150d is disposed at braking position P1b, as shown in FIGS. 24 and 25, right front edge 157a defining braking area 164 of cam hole 157 is extended exactly in the lateral direction perpendicular to the axial direction of clutch input shaft 138a. A lateral line L1 drawn in FIG. 24 defines this lateral direction. Left front edge 157c defining unbraking area 165 of cam hole 157 is extended forwardly leftward slantwise from a joint point of right and left front edges 157a and 157c. On the other hand, when cam arm member 151 is disposed at unbraking rotational angle P2a and cam pin 150d is disposed at unbraking position P1a, right front edge 157a is extended leftwardly forward slantwise with respect to lateral line L1, i.e., the exact lateral direction perpendicular to the axial direction of clutch input shaft 138a.

Further, when cam arm member 151 is disposed at braking position P2b and cam pin 150d is disposed at braking rotational angle P1b, as shown in FIGS. 24 and 15, axis C1 of cam pin 150d at braking position P1b is disposed forward from rotary axis C2 of cam arm 151a so that axes C1 and C2 are aligned in a fore-and-aft line parallel to the axial direction of clutch input shaft 138a. This fore-and-aft line is referred to a retaining force activation line Lf.

Pawl 150b disposed at the braking position is inserted forward into notch 149c so as to abut at a front end thereof against vertical surface 149a of flange member 149 as the bottom surface of notch 149c, thereby receiving a rearward counterforce Tf1. This rearward counterforce Tf1 onto pawl 150b functions as a rotational force in unbraking direction D1a to brake arm member 150, and this rotational force of brake arm member 150 in unbraking direction D1a functions as a forward thrusting force Tf2 pressing a front end portion 156a of collar 156 on cam pin 150d at braking position P1b in braking area 164 against right front edge 157a of cam arm 151a.

Forward thrusting force Tf2 is directed on retaining force activation line Lf, and right front edge 157a is extended along exact lateral line L1 as mentioned above, so that right front edge 157a receives full forward thrusting force Tf2 without diverting so as to surely retain cam pin 150d at braking position P1b. Therefore, counterforce Tf1 of flange member 149 just functions as resistance against rotation of cam arm member 151 centered on vertical axis C2. As a result, cam arm member 151 is stably held at braking rotational angle P2b so as to stably hold cam pin 150d at braking position P1b and the engagement of pawl 150b with flange member 149.

Incidentally, collar 156 may not be provided on cam pin 150d if an outer peripheral surface of cam pin 150d has a sufficient endurance. In this case, a front end portion of cam pin 150d directly abuts against right or left front edge 157a or 157c. A surface of collar 156 or cam pin 150d contacting right or left front edge 157a or 157c can have any area or any shape.

Further, axis C2 may be allowed to deviate within a tolerance width Wt rightward or leftward from the fore-and-aft line as retaining force activation line Lf extended rearward from axis C1 of cam pin 150b at braking position P1b. Preferably, tolerance width Wt is not more than 15% of a distance D between axes C1 and C2. Further, right front edge 157a of cam arm 150a defining braking area 164 of cam hole 157 may be allowed to slant within a tolerance angle At forward or rearward from lateral line L1. Preferably, tolerance angle At is not more than 10°. Such threshold width Wt and angle At are determined so as to prevent forward thrusting force Tf2 from activating as a force to thrust cam pin 150d in the lateral direction so as to unexpectedly guide cam pin 150d into unbraking area 165 of cam hole 157.

As understood from the above-mentioned description, to shift pawl 150b from the unbraking position to the braking position, cam arm member 151 is rotated in braking direction 167 from unbraking rotational angle 158 to braking rotational angle 159. During the rotation of cam arm member 151 from unbraking rotational angle 158 to braking rotational angle 159, the front portion of cam arm 151a at right front edge 157a, and then, at left front edge 157c, pushes cam pin 150b with collar 156 rearward, thereby rotating arm 150a in braking direction 170 centered on axis 152*a* of pivot shaft 152. Accordingly, cam pin 150*b* with collar 156 moves from unbraking area 165 of cam hole 157 into braking area 164 of cam hole 157. Collar 156 on cam pin 150*b* comes to abut against right front edge 157*a*, right rear edge 157*b* and right end edge 157*e* so that cam pin 150*b* is located at braking position P1*b*, whereby pawl 150*b* reaches its braking position, i.e., is fitted into notch 149*c* so as to engage with flange member 149. Afterward, pawl 150*b* receives rearward counterforce 161 from flange member 149, so that collar 156 on cam pin 150*d* at braking position P1*b* is pressed against right front edge 157*a* by forward thrusting force Tf2 caused by counter force Tf1 from flange member 149, so that brake arm member 150 and cam arm member 151 are surely held at their braking positions.

To shift pawl 150*b* from the braking position to the unbraking position, cam arm member 151 is rotated in unbraking direction D2*a* from braking rotational angle P2*b* to unbraking rotational angle P2*a*. During the rotation of cam arm member 151 from braking rotational angle P2*b* to unbraking rotational angle P2*a*, the front portion of cam arm 151*a* pushes cam pin 150*b* with collar 156 forward at right rear edge 157*b*, and then, at left rear edge 157*d*, thereby rotating arm 150*a* in unbraking direction D1*a* centered on axis C2. Accordingly, cam pin 150*b* with collar 156 moves from braking area 164 of cam hole 157 into unbraking area 165 of cam hole 157. Collar 156 on cam pin 150*b* comes to abut against left front edge 157*c*, left rear edge 157*d* and left end edge 157*f* so that cam pin 150*b* is located at unbraking position P1*a*, whereby pawl 150*b* reaches its unbraking position, i.e., is released from notch 149*c* so as to disengage from flange member 149.

Figure 26:
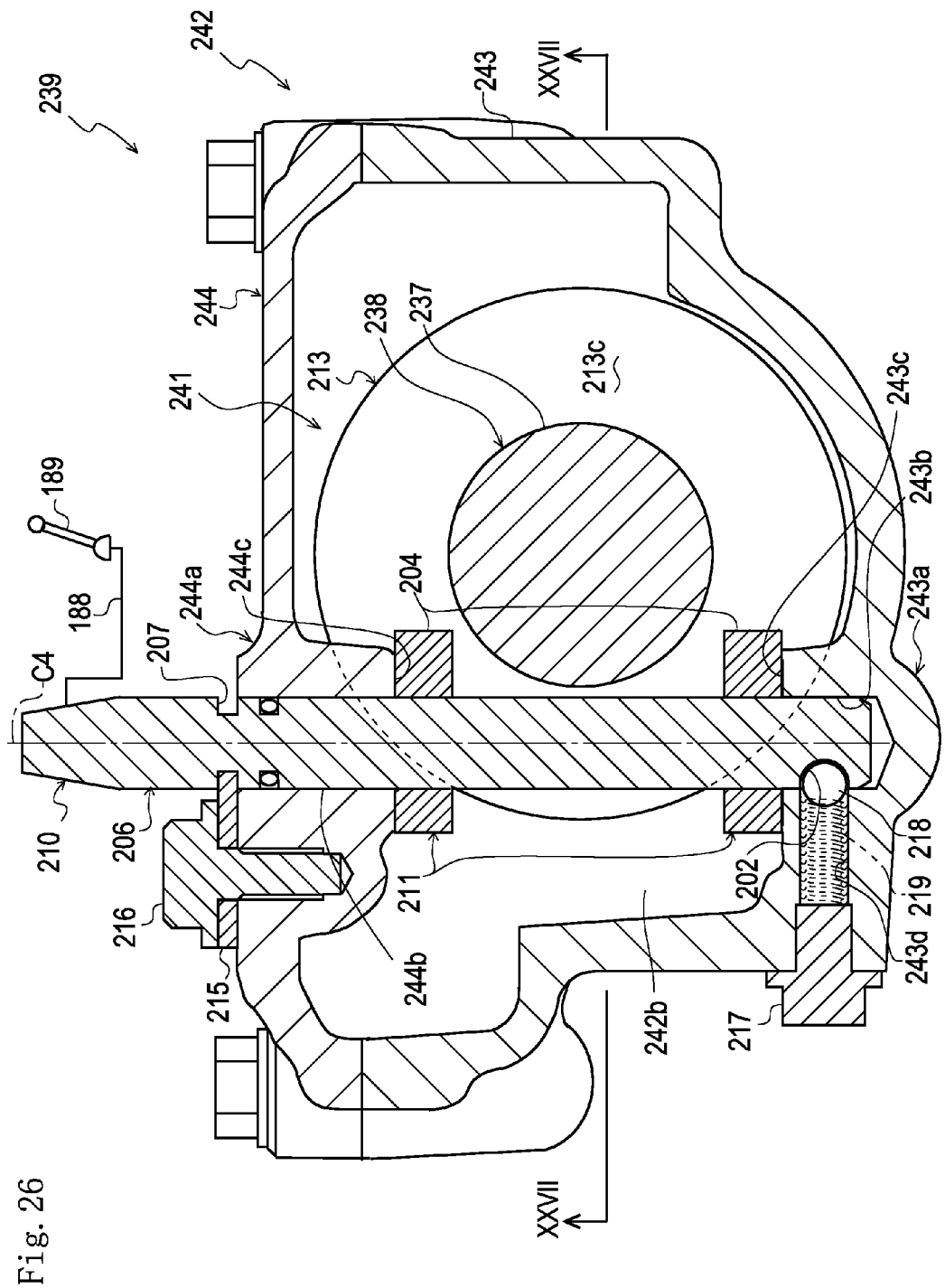
FIG. 26 is a sectional rear view of an alternative clutch unit 239.
Figure 27:
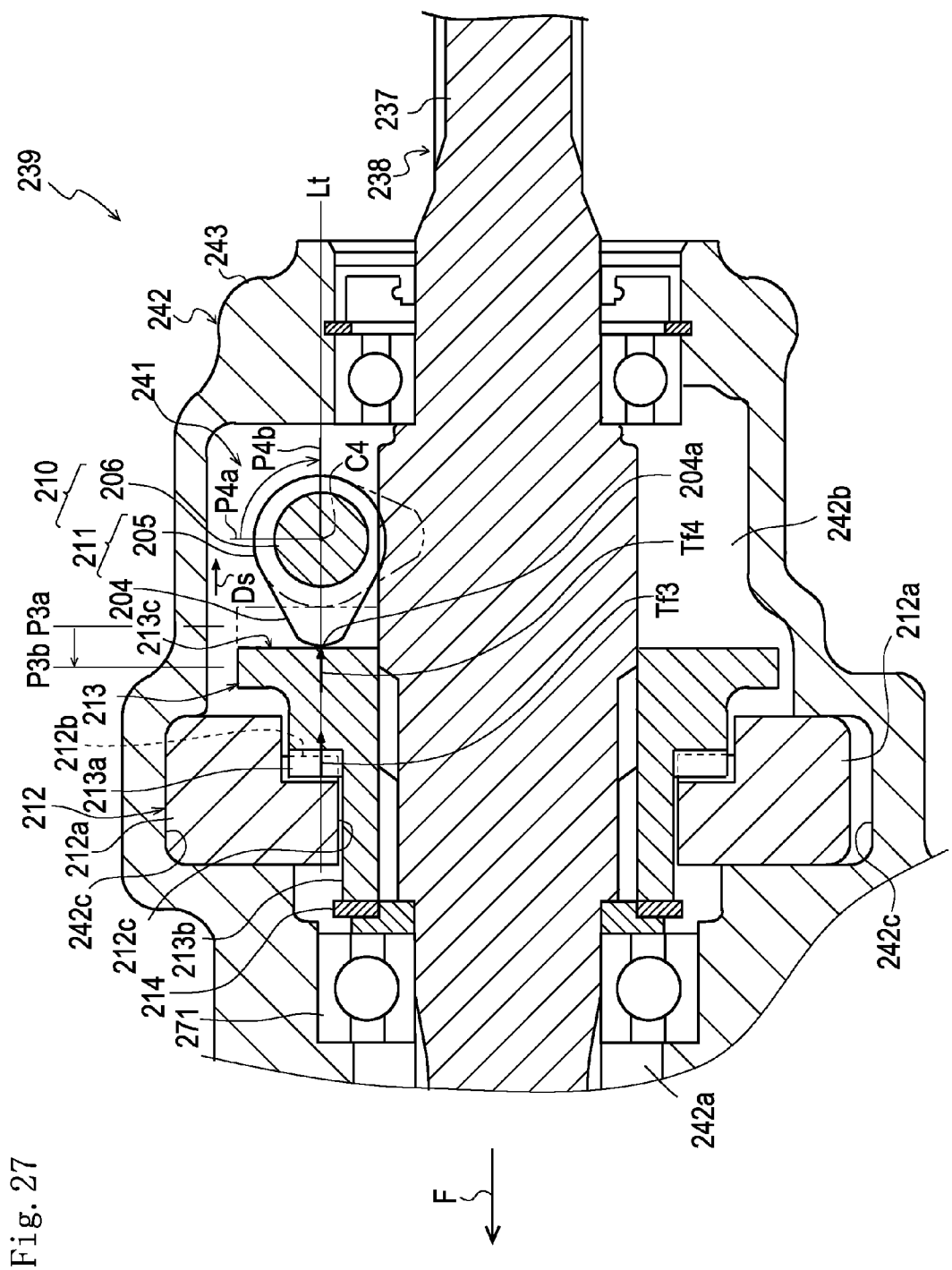
FIG. 27 is a cross sectional view of clutch unit 239 taken along XXVII-XXVII line of FIG. 26.

Referring to FIGS. 26 and 27, an alternative clutch unit 239 to be attached to front transaxle 107 is similar to clutch unit 139 except that clutch unit 239 is configured so as to incorporate an alternative parking brake 241. Clutch unit 239 includes a clutch unit casing 242. Clutch unit casing 242 includes a main housing 243, and an upper housing 244 joined to an upper portion of main housing 243. Main housing 243 journals input shaft 238, i.e., a clutch input shaft 237 and an unshown clutch output shaft coaxially joined to each other similarly to clutch input shafts 138*a* and 138*b*. Clutch unit casing 242 is formed therein with a front clutch chamber 242*a* and a rear brake chamber 242*b*, similar to clutch chamber 139*e* and brake chamber 139*f* in clutch unit casing 139*a*. In brake chamber 242*b*, an inner peripheral portion of main housing 243 of clutch unit casing 242 is formed with engagement recesses 242*c*.

Parking brake 241 includes a brake flange 212 and a brake shift sleeve 213, and is provided with a cam mechanism including a cam 210 for operating brake shift sleeve 213. Brake flange 212 is formed with engagement projections 212*a* radially centrifugally from an outer peripheral edge of brake flange 212. Engagement projections 212*a* are fitted into respective engagement recesses 242*c* so as to fix brake flange 212 to main housing 243 of clutch unit casing 242. In this regard, when viewed in the axial direction of input shaft 238, the engagement of engagement projections 212*a* to clutch unit casing 242 may be similar to the later-discussed engagement of engagement projections 349 of a brake flange 329 to a clutch unit casing 342, although FIG. 26 does not illustrate it.

An inner peripheral surface 212 *c* of brake flange 212 is spaced from the splined outer peripheral portion of clutch input shaft 237, so that an annular space is provided between inner peripheral surface 212*c* of brake flange 212 and the splined outer peripheral portion of clutch input shaft 237. A rear inner peripheral portion of brake flange 212 is stepped, and is formed with pawls 213*b*. Brake shift sleeve 213 is stepped at an axially (fore-and-aft) intermediate portion thereof so as to have a radially thin front portion and a radially thick rear portion. The axially intermediate portion of brake shift sleeve 213 is formed with pawls 213*a* adapted to engage with pawls 212*b* of brake flange 212.

The radially thin front portion of brake shift sleeve 213 is defined as a guide portion 213*b* whose inner peripheral portion is splined. Guide portion 213*b* of brake shift sleeve 213 is passed through the annular space defined by inner peripheral surface 212*c* of brake flange 212, and is spline-fitted onto the splined outer peripheral portion of clutch input shaft 237, so that brake shift sleeve 213 is axially (fore-and-aft) slidable and unrotatable relative to clutch input shaft 237. Pawls 213*a* of brake shift sleeve 213 are engaged with pawls 212*b* of brake flange 212 by sliding brake shift sleeve 213 forward, and are disengaged from pawls 212*b* of brake flange 212 by sliding brake shift sleeve 213 rearward.

A bearing 271 is fitted on clutch input shaft 237 so as to partition brake chamber 242*b* from clutch chamber 242*a*. A wave washer 214 is provided around clutch input shaft 237 between bearing 271 and a front end of guide portion 213*b* of brake shift sleeve 213. Wave washer 214 has an elastic force that biases brake shift sleeve 213 rearward, i.e., in an unbraking direction Ds.

The radial thick portion of brake shift sleeve 213 is further radially expanded at a rear end thereof in a flange-like shape so as to have a vertical rear end surface 213*c*. Cam 210 is disposed leftward from clutch input shaft 237 and rearward from rear end surface 213*c* of brake shift sleeve 213. Cam 210 includes upper and lower cam plates 211 and a vertical camshaft 206. Upper housing 244 is formed with an upper boss portion 244*a* having a vertical boss hole 244*b*, and main housing 243 is formed at a bottom portion thereof with a lower boss portion 243*a* having a vertical boss hole 243*b*. Vertical camshaft 206 is passed at an upper portion thereof through boss hole 244*b*, and at a lower portion thereof through boss hole 243*b*. Upper cam plate 211 is fixed on camshaft 206 adjacently to a horizontal flat lower end surface 244*c* of upper boss portion 244. Lower cam plate 211 is fixed on camshaft 206 adjacently to a horizontal flat upper end surface 243*c* of lower boss portion 243*a*. Therefore, upper and lower horizontal surfaces 244*c* and 243*c* hinder upper and lower cam plates 206 from moving upward or downward, thereby keeping cam 210 from deviating in the vertical direction.

Vertical camshaft 206 is supported by upper and lower boss portions 244*a* and 233*a* of clutch unit casing 242 so as to be slidably rotatable centered on its own vertical axis C4. While lower boss portion 243*a* is formed to close a bottom end of lower boss hole 243*b*, upper boss hole 244*b* is open at a top end surface of clutch unit casing 242 (i.e., upper housing 244), so that an upper portion of camshaft 206 projects upward from the top end surface of clutch unit casing 242, and is formed with an annular groove 207 adjacent to the top end surface of clutch unit casing 244. A retaining plate 215 is fastened onto the top end surface of upper housing 244 via at least one bolt 216, and is partly fitted into annular groove 207 so as to prevent camshaft 206 from upwardly escaping.

The upper portion of camshaft 206 is operatively connected to parking brake lever 189 via link 188, similar to those for parking brake 141. In this regard, by rotational operating parking brake lever 189, camshaft 206 is rotationally shiftable between an unbraking rotational angle P4*a* and a braking rotational angle P4*b*.

A bottom portion of clutch unit casing 242, i.e., main housing 243, is bored by a lateral horizontal hole 243d. One end of hole 243d is open at an outer side surface of clutch unit casing 242, and the other end of hole 243d is open at an inner peripheral surface of boss portion 243a defining boss hole 243b. The lower portion of camshaft 206 in boss hole 243b is formed with a hemispheric detent recess 202 open at an outer peripheral surface thereof. Detent recess 202 defines either unbraking rotational angle P4a or braking rotational angle P4b. In this regard, when rotated cam shaft 206 reaches either unbraking rotational angle P4a or braking rotational angle P4b, detent recess 202 coincides to hole 243d. Two detent recesses 202 may be formed in camshaft 206 so as to define respective unbraking and braking rotational angles P4a and P4b of camshaft 206.

The open end of hole 243d at the outer side surface of clutch unit casing 242 is plugged by a cap 217, which may be a bolt screwed into clutch unit casing 242. A detent ball 218 is disposed at the open end of hole 243d facing the outer peripheral surface of camshaft 206. A compressed spring 219 is disposed in hole 243d so as to be interposed between cap 217 and detent ball 218 so as to press detent ball 218 against the outer peripheral surface of camshaft 206. Therefore, as soon as detent recess 202 comes to coincide to hole 243d, detent ball 218 is thrust into detent recess 202, thereby retaining camshaft 206 at corresponding unbraking or braking rotational angle P4a or P4b.

Each of upper and lower cam plates 211 is formed as an orthodox pear shaped cam having a circular base portion 204 peripherally surrounding camshaft 206, and a triangular lobe portion 204 projecting horizontally from base portion 205. Upper and lower cam plates 211 are identical to each other in shape, and are arranged so as to completely overlap each other when viewed in the vertical axial direction of camshaft 206. Due to the rearward biasing force of wave washer 214, rear end surface 213c of brake shift sleeve 213 is constantly pressed against upper and lower cam plates 211 regardless of the rotational angle of camshaft 206.

When cam 210 is disposed at unbraking rotational angle P4a, circular portions 205 of upper and lower cam plates 211 abut against rear end surface 213c of brake shift sleeve 213. This position of brake shift sleeve 213 where rear end surface 213c abuts against circular base portions 205 of upper and lower cam plates 211 is defined as an unbraking position P3a of brake shift sleeve 213, which is the rearmost slide position of brake shift sleeve 213 along clutch input shaft 237, so that pawls 213a of brake shift sleeve 213 are disposed rearward away from pawls 212b of brake flange 212, whereby brake shift sleeve 213 disengages from brake flange 212, i.e., cam input shaft 237 spline-fitted to brake shift sleeve 213 is allowed to rotate freely from brake flange 212 fixed to clutch unit casing 242.

When cam 210 is disposed at braking rotational angle P4b, ends 204a of lobe portions 204 of upper and lower cam plates 211 abut against rear end surface 213c of brake shift sleeve 213. This position of brake shift sleeve 213 where rear end surface 213c abuts against ends 204a of lobe portions 204 of upper and lower cam plates 211 is defined as a braking position P3b of brake shift sleeve 213, which is the foremost slide position of brake shift sleeve 213 along clutch input shaft 237, so that pawls 213a of brake shift sleeve 213 mesh with pawls 212b of brake flange 212, whereby brake shift sleeve 213 engages with brake flange 212, i.e., cam input shaft 237 spline-fitted to brake shift sleeve 213 is braked by brake flange 212 fixed to clutch unit casing 242.

While pawls 213a mesh with pawls 212b, brake flange 212 applies a counterforce Tf3 onto brake shift sleeve 213. This counterforce Tf3 functions as a rearward thrusting force Tf4 to push brake shift sleeve 213 rearward in unbraking direction Ds. When viewed in plan (or bottom as shown in FIG. 27), the point on rear end surface 213c of brake shift sleeve 213 abutting against end 204a of lobe portion 204 of each cam plate 211 is aligned with axis C4 of camshaft 206 on a fore-and-aft force activation line Lt coinciding to a lube centerline of lube portion 204 of pear shaped cam plate 211. Rearward thrusting force Tf4 is activated along this line Lt. Therefore, ends 204a of lobe portions 204 of cam plates 211 receive rearward thrusting force Tf4 plump without diverting. In other words, rearward thrusting force Tf4 does not act to rotate cam plates 211 rightward or leftward, but acts to resist the rotation of camshaft 206 centered on axis C4, thereby stably retaining cam 210 at braking position 273.

Referring to FIGS. 28 and 29, an alternative clutch unit 339 is similar to clutch units 139 and 239 except that clutch unit 339 is configured so as to incorporate an alternative parking brake 341. Clutch unit 339 includes a clutch unit casing 342. Clutch unit casing 342 includes a main housing 343, and an upper housing 344 joined to an upper portion of main housing 343. Main housing 343 journals input shaft 338, i.e., a clutch input shaft 337 and an unshown clutch output shaft joined coaxially to each other similar to clutch input and output shafts 138a and 138b. Main housing 343 is formed therein with a front clutch chamber 342a and a rear brake chamber 342b, similar to clutch chamber 232a and brake chamber 232b in clutch unit casing 242.

Parking brake 341 includes a lock pin 328 and a brake flange 329, and is provided with a cam mechanism including a cam 311 for operating lock pin 328. Brake flange 329 is an approximately discoidal member having an outer peripheral surface. Brake flange 329 is formed with right and left rectangular engagement projections 349 radially centrifugally rightward and leftward from the outer peripheral surface of brake flange 329.

In this regard, main housing 343 is formed to have a laterally middle bottom arcuate portion, which is disposed along a lower portion of the outer peripheral surface of brake flange 329. Main housing 343 is formed at right and left portions thereof with respective rectangular bending portions 343a defining right and left recesses 350. Right engagement projection 349 is fitted into right recess 350 so that its front, rear, bottom and right end surfaces are disposed along front, rear, bottom and right walls of right rectangular bending portion 343a of main housing 343. Left engagement projection 349 is fitted into left recess 350 so that its front, rear, bottom and left end surfaces are disposed along front, rear, left and bottom walls of left rectangular bending portion 343a of main housing 343.

Further, upper housing 344 is formed with right and left support walls 344a extended downward in brake chamber 342a. Each of right and left support walls 344a has an arcuate shaped surface that is disposed along each of right and left upper portions of the outer peripheral edge of brake flange 329. Further, each of right and left support walls 344a has a horizontal surface that is disposed along each of upper surfaces of right and left engagement projections 349 so as to define an upper end of each of right and left recesses 350.

Therefore, brake flange 329 is retained at its outer peripheral surface by main housing 343 and upper housing 344, and is held at right and left engagement projections 349 in right and left recesses 350 defined by housings 343 and 344 so as to be hindered from moving in the peripheral direction and in the axial direction with respect to the fore-and-aft axis of clutch input shaft 337. In this way, brake flange 329 is fixed to clutch unit casing 342. Brake flange 329 has a center hole through which clutch input shaft 337 is passed so that clutch input shaft 337 is allowed to rotate relative to brake flange 329.

The portion of clutch input shaft 337 surrounded by the inner peripheral surface of brake flange 329 defining the center hole of brake flange 329 is formed with a plurality of (in this embodiment, four) hemispheric detent recesses 336, which are open at an outer peripheral surface of clutch input shaft 337 and are aligned in the peripheral direction of clutch input shaft 337. A laterally middle upper portion of brake flange 329 is formed as a boss portion 359 bored by a vertical guide hole 369. Guide hole 369 has an upper end open at a top portion of the outer peripheral surface of brake flange 329, and has a bottom end open at a top portion of the inner peripheral surface of brake flange 329. A vertical lock pin 328 is vertically slidably fitted in guide hole 369. A bottom portion of lock pin 328 is hemispheric shaped in correspondence to the hemispheric shape of each detent recess 336.

An upper portion of lock pin 328 projects upward from the top end of guide hole 369. A spring retaining plate 331 is vertically slidably fitted on the upper portion of lock pin 328, and retaining ring 333 is fixed on the upper portion of lock pin 328 so as to prevent spring retaining plate 331 from sliding further upward from the limit position defined by retaining ring 333. Right and left upper portions of brake flange 329 are squarely cut off, so as to form right and left end vertical surfaces of boss portion 359, and so as to form right and left shoulder surfaces 379 extended horizontally rightward and leftward from lower ends of the right and left end vertical surfaces of boss portion 359. A spring 332 is coiled around boss portion 359 of brake flange 329 between spring retainer plate 331 and right and left shoulder surfaces 379. Right and left support walls 344a of upper housing 344 are formed to define a spring chamber 351 that is extended upward from brake chamber 342b so as to incorporate the upper portion of lock pin 328, spring retaining plate 331, spring 332 and retaining ring 333.

An upper portion of upper housing 344 is formed to define a cam chamber 352 extended upward from spring chamber 351 so as to incorporate a cam plate 312 of cam 311. A laterally horizontal shaft hole 353 is formed in upper housing 344 so as to pass through cam chamber 352. A horizontal camshaft 313 is fitted in shaft hole 353 so as to be rotatable centered on its horizontal axis C5, and is fixedly provided thereon with cam plate 312 in cam chamber 352. An end of camshaft 313 projects outward from a right or left (in this embodiment, left) end surface of upper housing 344, i.e., clutch unit casing 342, so as to be operatively connected to parking brake lever 189 via link 188. A retaining plate 335 is fastened onto the top end surface of upper housing 244 by a bolt or the like (not shown), and is partly fitted into annular groove 317 so as to prevent camshaft 313 from laterally escaping from upper housing 344.

Cam plate 312 is formed as an orthodox pear shaped cam having a circular base portion 314 peripherally surrounding camshaft 313, and a triangular lobe portion 315 projecting horizontally from base portion 314. A hemispheric head 348 of lock pin 328 is pressed against cam plate 312 above lock pin 328 by a biasing force of spring 332.

When cam 311 is disposed at unbraking rotational angle P6a, lobe portion 315 of cam plate 312 is extended horizontally so that circular base portion 314 of cam plate 312 abuts against head 348 of lock pin 328. This position of head 348 of lock pin 328 is defined as an unbraking position P5a of lock pin 328, which is the uppermost slide position of lock pin 328 along guide hole 369, so that the bottom portion of lock pin 328 is disposed upward away from the outer peripheral surface of clutch input shaft 337, thereby allowing clutch input shaft 337 to rotate free from lock pin 328.

When cam 311 is rotated to braking rotational angle P6b, cam plate 312 is rotated to extend lobe portion 315 downward. Due to the downward extension of lobe portion 315 of cam plate 312, spring 332 is compressed so as to press the bottom portion of lock pin 328 against the outer peripheral surface of clutch input shaft 337. Therefore, as soon as clutch input shaft 337 is located in its rotational direction so that the bottom end of guide hole 369 coincides to one of detent recesses 336, the bottom portion of lock pin 328 is fitted into detent recess 336, thereby braking clutch input shaft 337. The position of head 348 of lock pin 328, where the bottom of lock pin 328 is fitted in detent recess 336, is defined as a braking position P5b of lock pin 328, which is the lowermost slide position of lock pin 328 along guide hole 369. Therefore, cam 311 completely reaches braking rotational angle P6b.

While lock pin 328 is disposed at braking position P5b, lobe portion 315 of cam plate 312 is extended exactly vertically downward, so that a tip end of lobe portion 315 abuts against a top end 334 of head 348 of lock pin 328, whereby cam plate 312 abutting against lock pin 328 is balanced so as not to tend to rotate from braking position P6b. In this state, clutch input shaft 337 applies a counterforce Tf5 onto a bottom end of lock pin 328. This counterforce Tf5 functions as an upward thrusting force Tf6 to push lock pin 328 upward in an unbraking direction Dt. Top end 334 of head 348 of lock pin 328 and the bottom end of lock pin 328 are aligned on a vertical force activation line Lu coinciding to a lube centerline of lube portion 315 of pear shaped cam plate 312. Upward thrusting force Tf6 is activated along this line Lu. Therefore, the end of lobe portion 315 of cam plate 312 receives upward thrusting force Tf6 plump without diverting. In other words, upward thrusting force Tf6 does not act to rotate cam plate 312 rightward or leftward, but acts to resist the rotation of camshaft 313 centered on axis C5, thereby stably retaining cam 311 at braking position P6b.

It is further understood by those skilled in the art that the foregoing description is a preferred embodiment of the disclosed device and that various changes and modifications may be made in the invention without departing from the scope thereof defined by the following claims.

What is claimed is:

1. A brake mechanism for braking a target rotary member, the brake mechanism comprising:
   a lock member shiftable between a lock position, where the lock member engages with the target rotary member to brake the target rotary member, and an unlock position, where the lock member disengages from the target rotary member to unbrake the target rotary member; and
   a cam member rotatable centered on an axis so as to be shiftable between a brake operation position to locate the lock member at the lock position and an unbrake operation position to locate the lock member at the unlock position,
   wherein, when the cam member is disposed at the brake operation position, the lock member and the cam member contact each other at a contact point on a force activation line extending from the axis of the cam member, and
   wherein a direction of the force activation line coincides to a direction of a counterforce of the target rotary member against the lock member engaging with the target rotary member, so that a rotational force of the cam member is not applied to the lock member at the contact point.

2. The brake mechanism according to claim 1,
wherein the lock member is rotatable between the lock position and the unlock position,
wherein the cam member has a cam hole surrounded by an edge surface of the cam member;
wherein the lock member has a contact portion disposed in the cam hole to contact the edge surface of the cam member,
wherein the cam hole is bent to have a braking area and an unbraking area,
wherein, when the cam member is disposed at the unbrake operation position, the contact portion of the lock member is disposed in the unbraking area of the cam hole so as to locate the lock member at the lock position, and
wherein, when the cam member is disposed at the brake operation position, the contact portion of the lock member contacts the edge surface of the cam member in the braking area of the cam hole at the contact point so as to hold the lock member at the unlock position.

3. The brake mechanism according to claim 1,
wherein the lock member is slidable along an axis of the target rotary member between the lock position and the unlock position,
wherein the cam member has a protrusion extended in a radial direction from the axis of the cam member,
wherein, when the cam member is disposed at the brake operation position, the protrusion of the cam member contacts a surface of the lock member at the contact point so as to hold the lock member at the lock position, and
wherein, when the cam member is disposed at the unbrake operation position, the protrusion of the cam member does not contact the lock member so that the lock member is located at the unlock position.

4. The brake mechanism according to claim 1,
wherein the lock member is slidable in a radial direction of the target rotary member between the lock position and the unlock position,
wherein the cam member has a protrusion extended in a radial direction from the axis of the cam member,
wherein, when the cam member is disposed at the brake operation position, the protrusion of the cam member contacts a surface of the lock member at the contact point so as to hold the lock member at the lock position, and
wherein, when the cam member is disposed at the unbrake operation position, the protrusion of the cam member does not contact the lock member so that the lock member is located at the unlock position.

* * * * *